United States Patent [19]

Ono et al.

[11] Patent Number: 5,012,169

[45] Date of Patent: Apr. 30, 1991

[54] MOTOR DRIVE SYSTEM

[75] Inventors: Yutaka Ono; Yasuhiko Muramatsu; Hideo Banzai; Yoichi Kikukawa; Shigeru Hashida; Shotaro Shindo; Haruo Higuchi; Hiroyuki Shinomiya; Mitsuhiro Nikaido; Koichi Sato, all of Tokyo, Japan

[73] Assignee: Yokogawa Electric Corporation, Tokyo, Japan

[21] Appl. No.: 376,323

[22] Filed: Jul. 6, 1989

[30] Foreign Application Priority Data

Jul. 20, 1988 [JP] Japan .............................. 88/96180[U]
Jul. 26, 1988 [JP] Japan .............................. 88/98879[U]
Aug. 29, 1988 [JP] Japan ............................. 88/112928[U]
Apr. 4, 1989 [JP] Japan .............................. 89/84614[U]

[51] Int. Cl.$^5$ ........................................... G05B 19/405
[52] U.S. Cl. .................... 318/568; 318/568.2; 318/569; 318/631; 318/599
[58] Field of Search .............. 318/568.22, 568.2, 569, 318/631, 599

[56] References Cited

U.S. PATENT DOCUMENTS 4,868,474 9/1989 Lancraft et al. ............... 318/568.2
4,876,494 10/1989 Daggett et al. ............... 318/568.22

Primary Examiner—William M. Shoop, Jr.
Assistant Examiner—Saul M. Bergmann
Attorney, Agent, or Firm—Moonray Kojima

[57] ABSTRACT

A motor drive system used with industrial robots, processing machines, and the like comprising an external interface part ready for connecting a plurality of kinds of host controllers generating a command signal; a sensor interface part to which a motor rotation detecting sensor is connected; a main control part operating for feedback control of a motor according to signals provided by way of the interfaces; and a power amplification part for feeding a current to motor coils according to a control signal from the main control part and wherein the external interface part, the sensor interface part, the main control part, and the power amplification part are separate and modularized as cards. Advantageously, the various controllers, sensors and power systems are changeable to flexibly meet different user requirements.

23 Claims, 50 Drawing Sheets

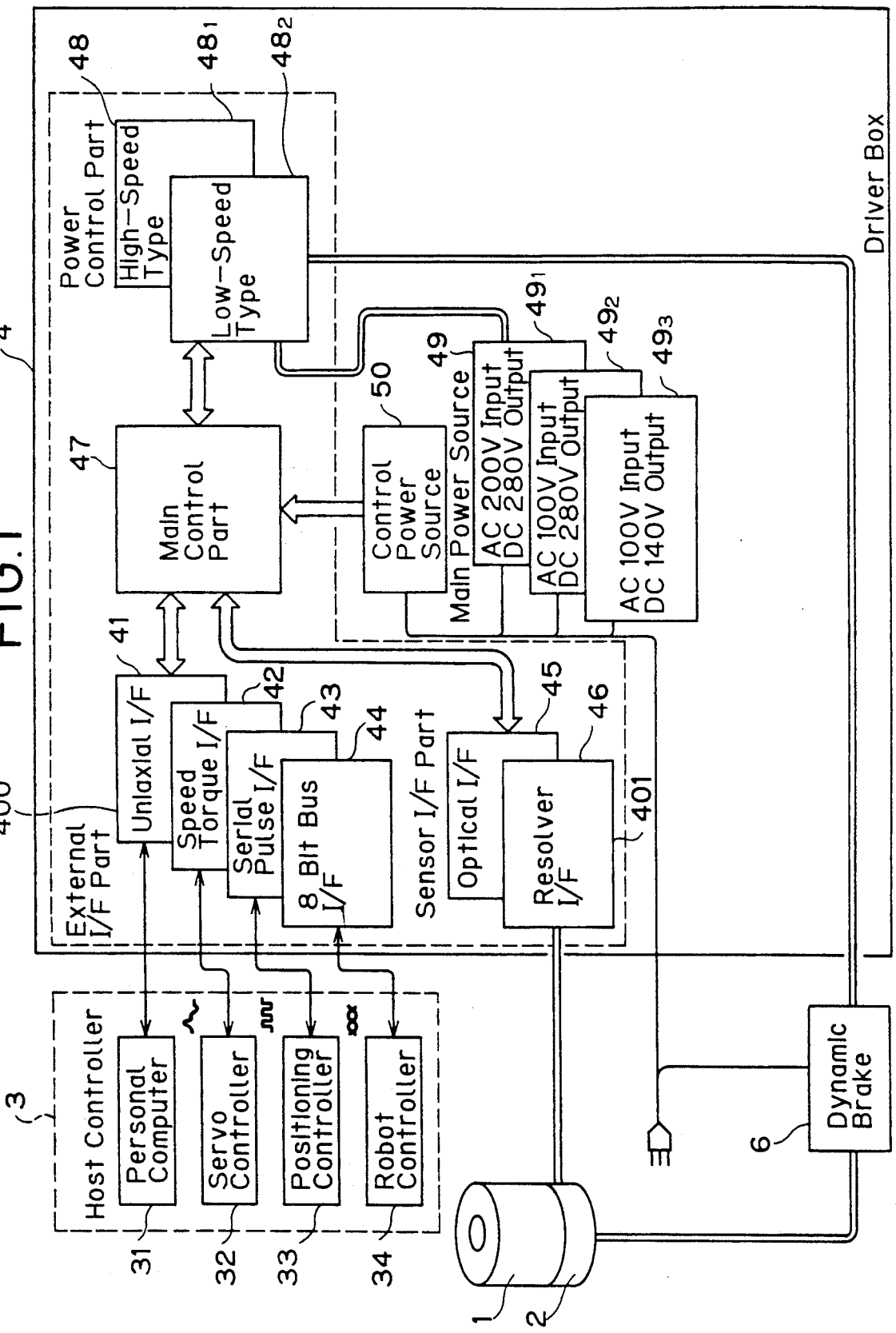

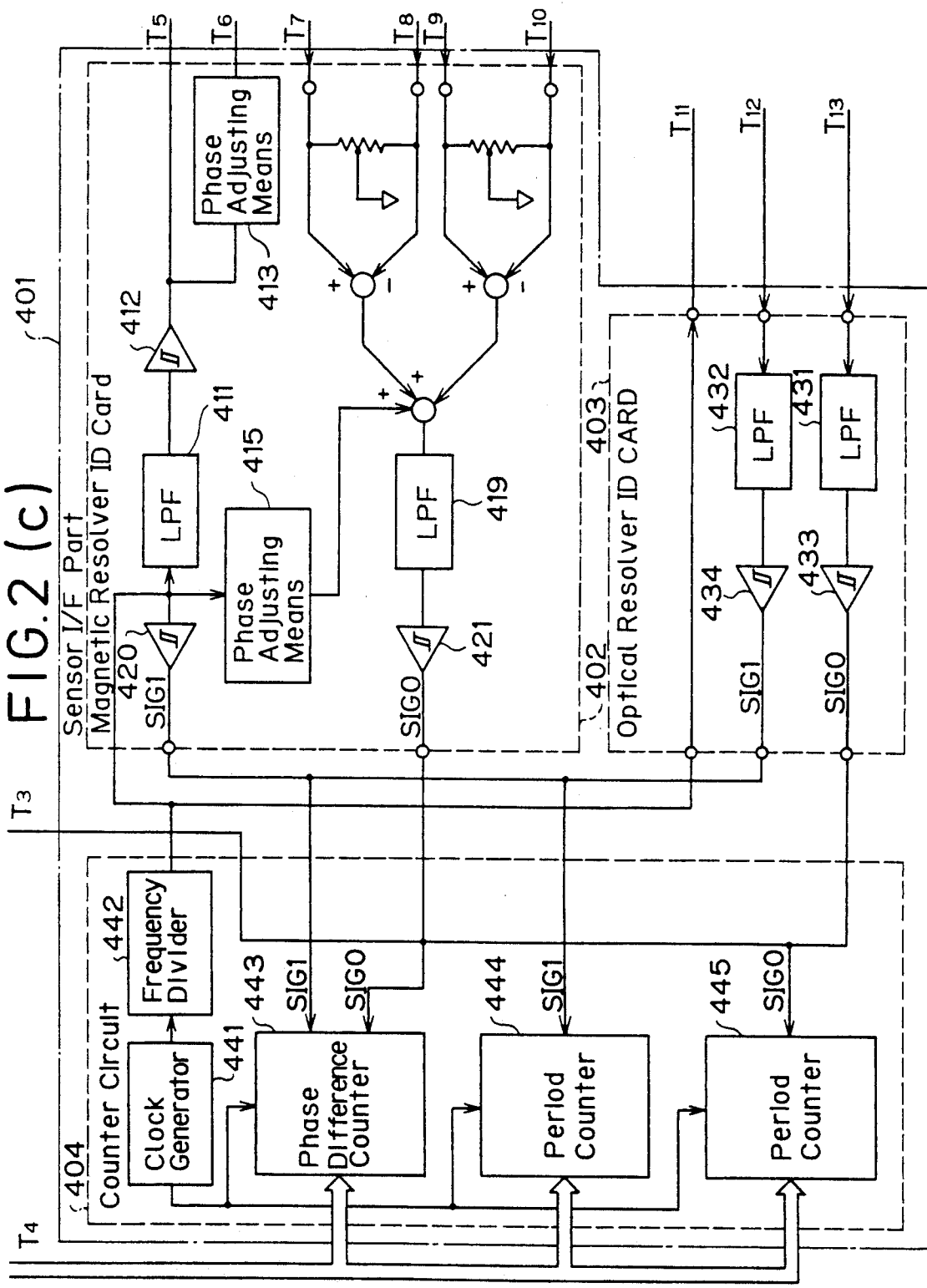

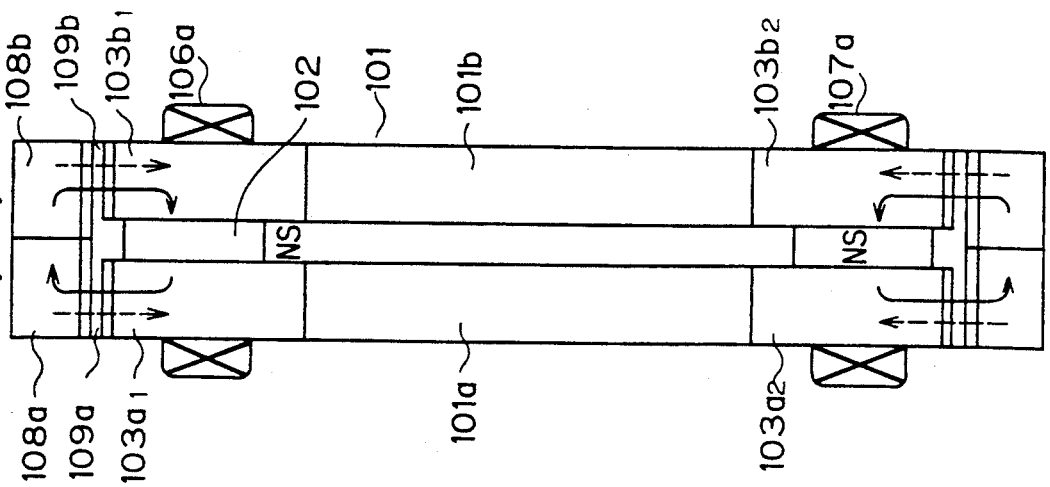
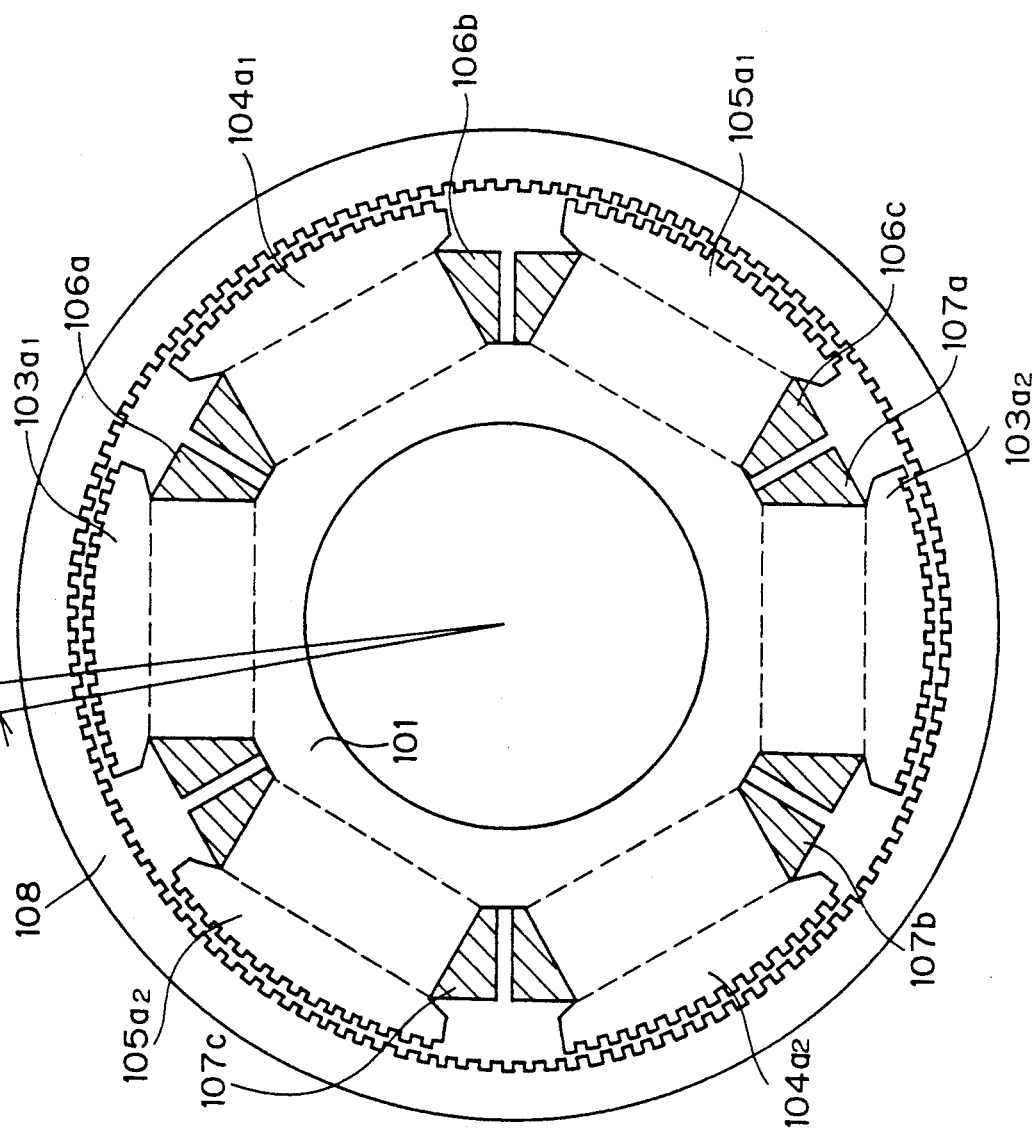

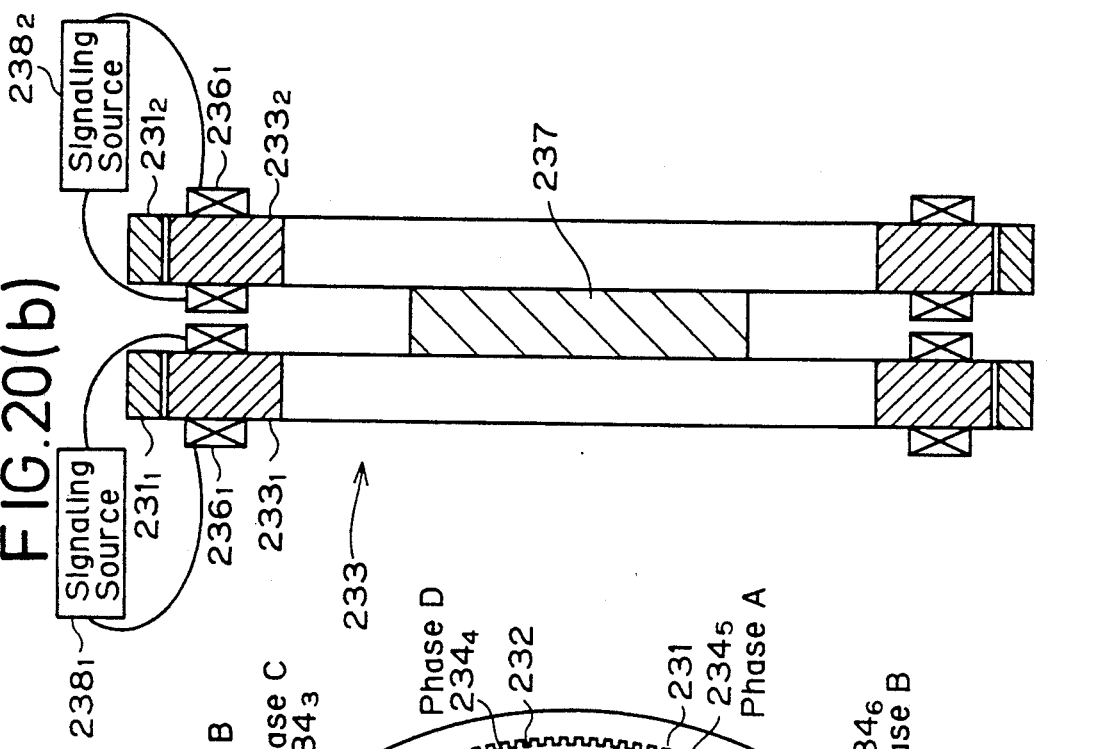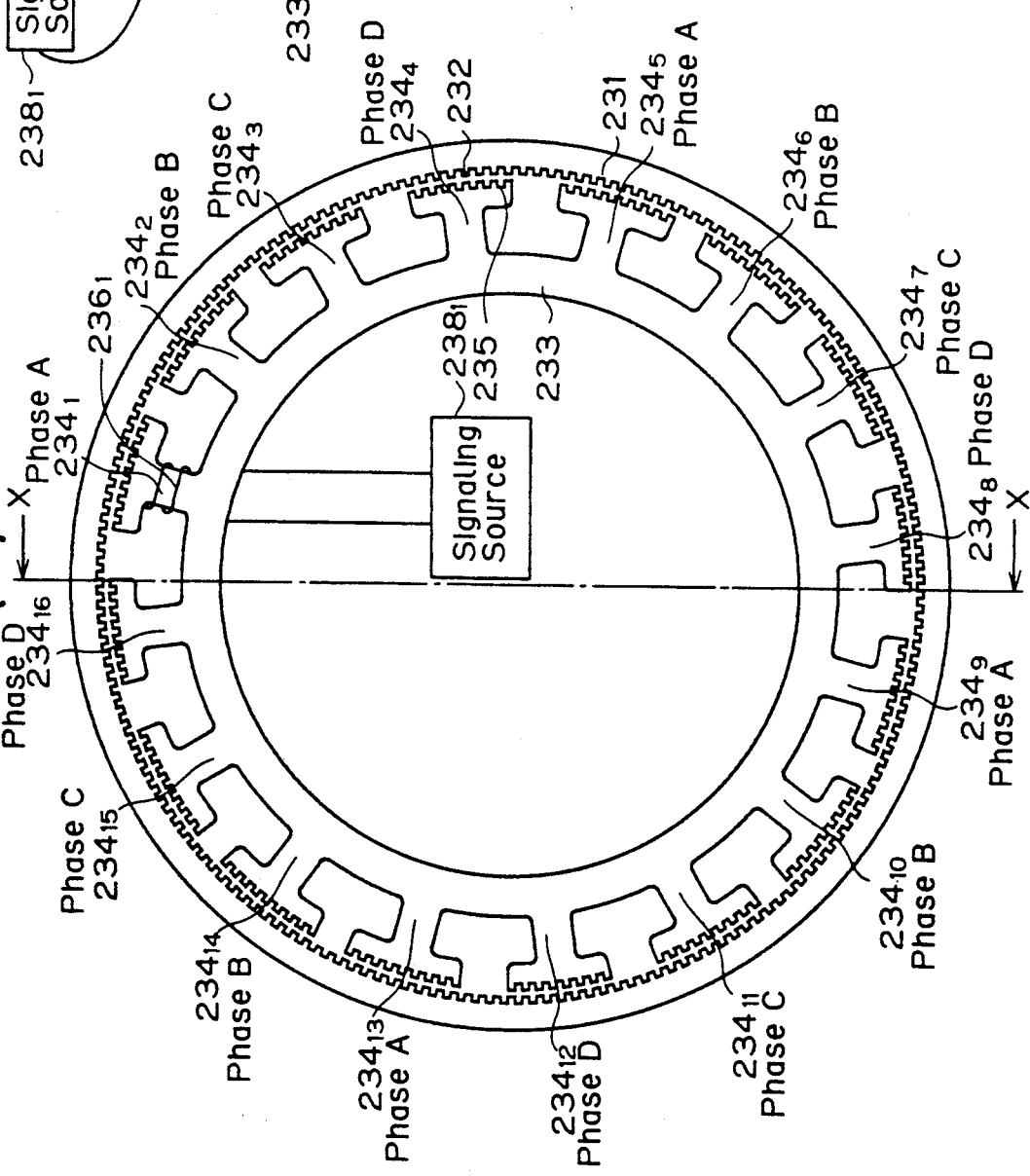

FIG. 27

| Pulse Number | Origin Number | Phase Difference (Deg.) |
|---|---|---|
| 0 | 1 | 0 |
| 1000 | 2 | 36 |
| 2000 | 3 | 72 |
| 3000 | 4 | 108 |
| 4000 | 5 | 144 |
| 5000 | 6 | 180 |
| 6000 | 7 | 216 |
| 7000 | 8 | 252 |
| 8000 | 9 | 288 |
| 9000 | 10 | 324 |

| $f_n$ | $G_{DC}$ | ILIM | Control Parameter | | | |
|---|---|---|---|---|---|---|
| $f_{n1}$ | $G_{DC1}$ | ILIM1 | $X_{11}$ | $X_{12}$ | $X_{13}$ | ----- |
| $f_{n2}$ | $G_{DC2}$ | ILIM2 | $X_{21}$ | $X_{22}$ | $X_{23}$ | ----- |
| | | | | | | |

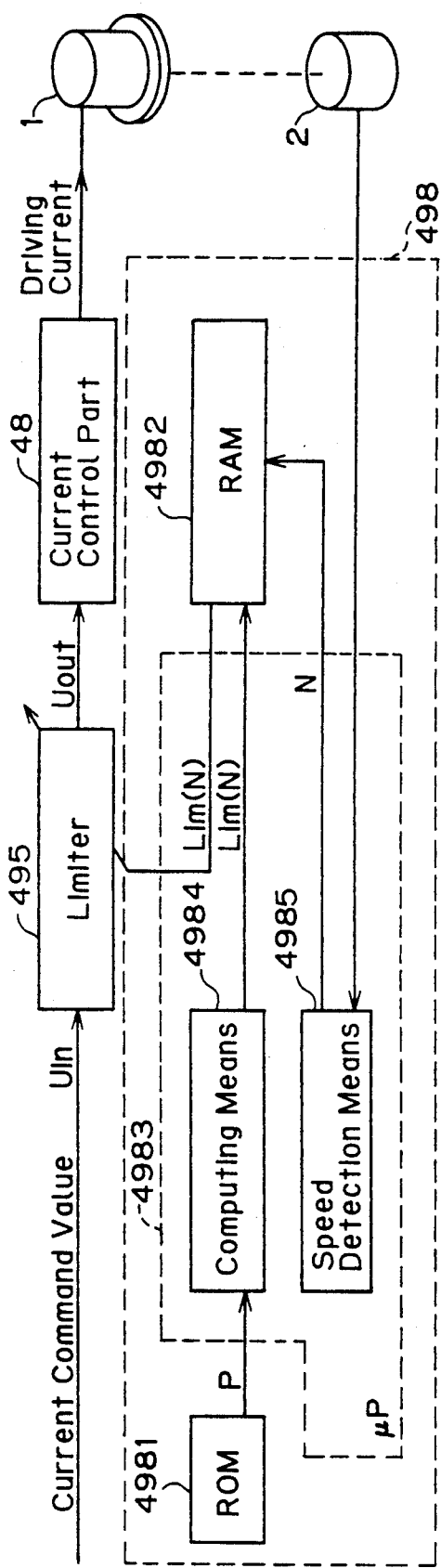
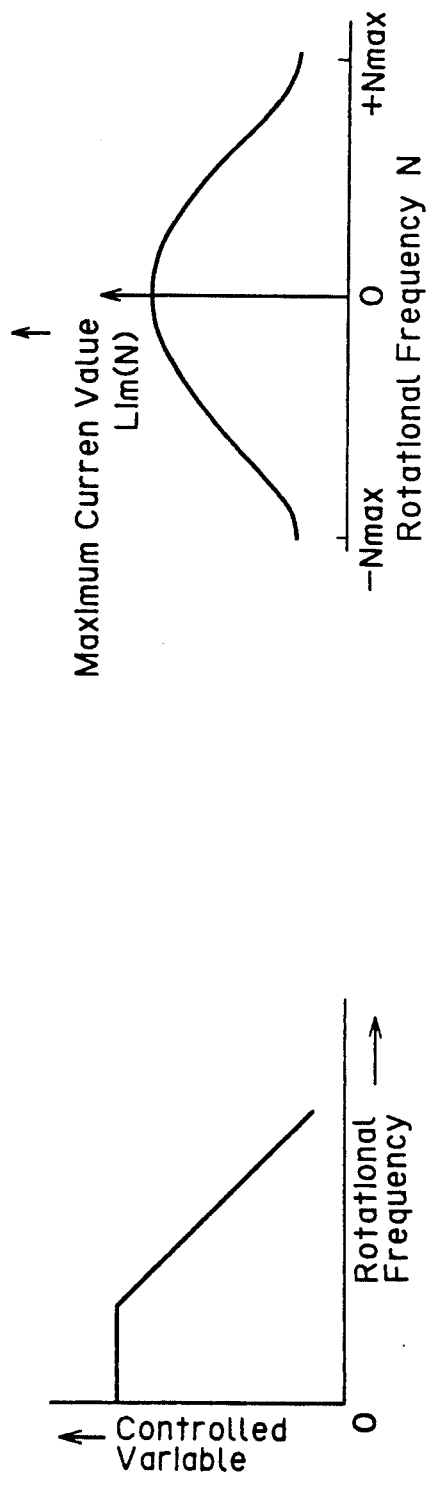
FIG. 48
FIG. 49
FIG. 50

MOTOR DRIVE SYSTEM

BACKGROUND OF THE INVENTION

1. Field of the Invention

This invention relates to a motor drive system used with industrial robots, processing machines, and the like.

2. Description of the Prior Art

Conventional motor drive systems use sensors to detect the rotation of a motor, and with the detection signals from the sensors as feedback signals a host controller generates a command signal to control the rotational position and speed of the motor based on the feedback signals. A drive object, such as a robot arm or the like, is shifted to a target position, at a desired speed, by the motor being subjected to the above feedback control.

In such a system, it is desirable that the characteristics of the motor driving circuit, power source, etc, be modifiable to cope with the user's various requirements.

The host controller, which provides commands to the system, includes various types of controllers or controller functions, such as providing command values in the form of digital signals, providing command values in the form of analog signals, etc. It is, therefore, desirable that the motor drive system be connectable to these various host controllers.

The sensor for detecting motor revolutions may be an optical resolver or a magnetic resolver. Generally, the optical resolver is of high precision and high resolution, but, is expensive. On the other hand, the magnetic resolver is relatively inexpensive, but is inferior in precision and resolution as compared to the optical resolver. Because of the differences in characteristics, the optical resolver and the magnetic resolver are usually used selectively according to whether precision or cost is most desired.

Also, a different motor drive system is used for the optical resolver and the magnetic resolver.

According to the embodiment, the motor drive system to be used with the sensor must be selected properly each time so as to cope with the particular sensor to be used therewith. The motor drive system is originally expensive. Thus, if the entire motor drive system has to be replaced to handle different applications, the costs will be disadvantageously expensive.

For driving a robot arm on the motor drive system, there may occur a case where the absolute rotational position of the motor must be identified so as to ensure the position of the arm, etc. However, an absolute type sensor is expensive to install originally. Accordingly it is desired to have a system which is inexpensive and readily usable for detecting the absolute rotational position.

On the other hand, in case an incremental type sensor is used, the origin of the rotational position will be required. An origin detection means which is moderate in cost and high in precision is preferable.

As mentioned, the motor drive system has many desired requirements However, no motor drive system satisfying all of the desired requirements concurrently has yet been realized.

SUMMARY OF THE INVENTION

This invention satisfies the aforementioned requirements concurrently, and its object is to realize a motor drive system which operates effectively with different kinds of host controllers, sensors, and power systems, and thus is capable of flexibly satisfying a user's various requirements.

The foregoing and other objects are attained by the invention which encompasses a motor drive system for feedback control of a motor. The drive system comprises an external interface part comprising a plurality of interfaces according to kind of host controller used, for generating command signals; a sensor interface part comprising an interface part of a sensor, for detecting rotations of the motor; a main control part for generating a control signal so that the motor is subjected to feedback control according to the command signals received from the external interface part and the detection signals received from the sensor interface part; and a power control part for amplifying a current according to the control signal and for feeding the amplified current to a coil of the motor.

Advantageously, the external interface part, the sensor interface part, the main control part, and the power control part are separate and modularized as cards.

Moreover, the foregoing invention satisfies concurrently the abovementioned requirements.

BRIEF DESCRIPTION OF THE DRAWINGS

FIG. 1 depicts an illustrative embodiment of the invention.

FIGS. 2(A), 2(B) and 2(C) depict further details of the illustrative embodiment.

FIGS. 3(A) and 3(B) depict a motor structure, with FIG. 3(A) being a front view and FIG. 3(B) being a sectional view.

FIGS. 20(A) an 20(B) depict a magnetic resolver used as a sensor, wherein FIG. 20(A) is a plan view and FIG. 20(B) is a sectional view along line X—X.

FIG. 27 depicts a table of pulse number, origin number and phase difference usable for the resolver of FIG. 26.

FIG. 48 depicts a device for limiting current fed to the coil of the motor.

FIG. 49 is a graph of the controlled variable in relation to the rotational frequency.

FIG. 50 is a graph of the rotational frequency in relation to maximum current value.

DETAILED DESCRIPTION OF THE PREFERRED EMBODIMENTS

Figure 2A:
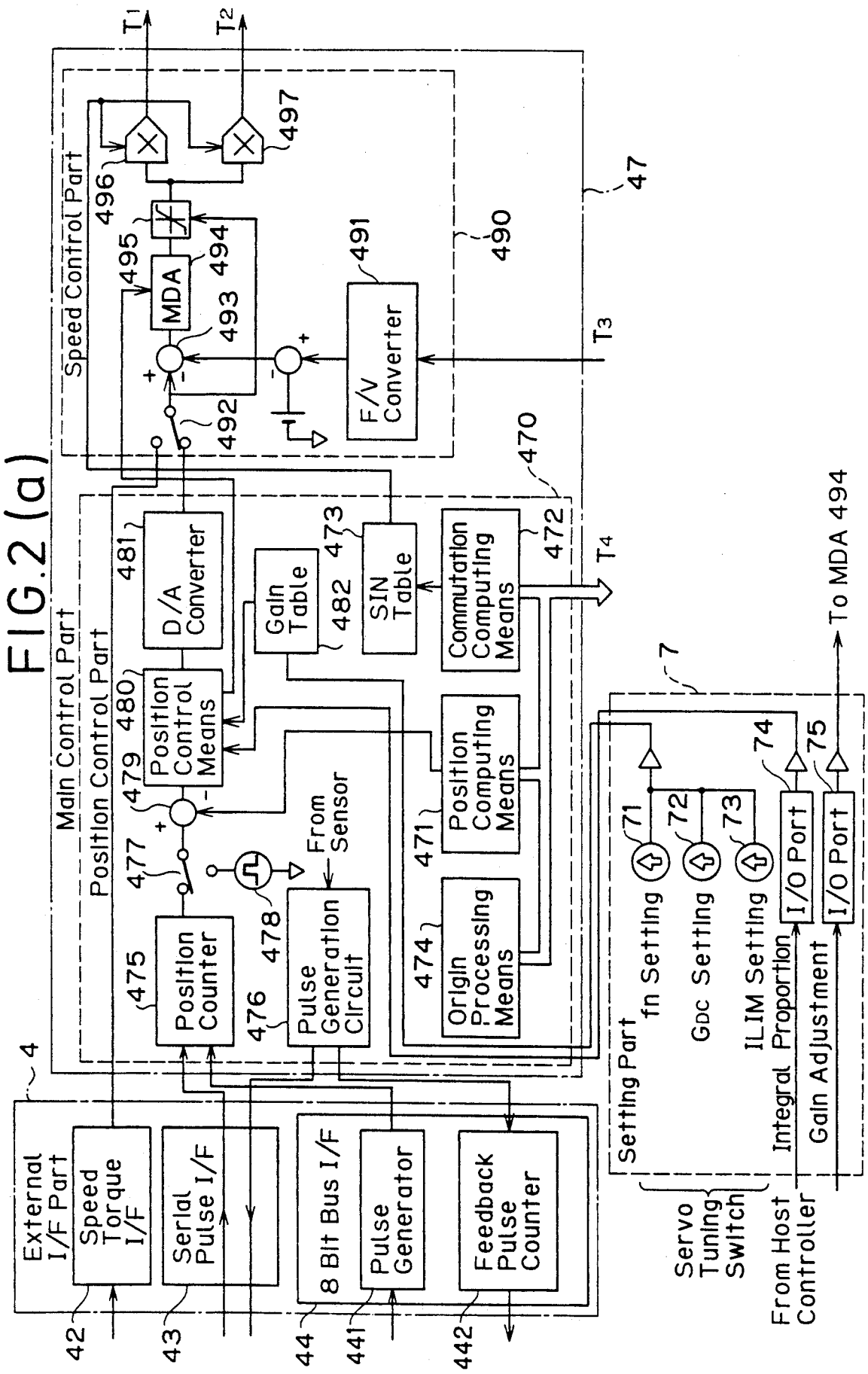

FIG. 1 depicts an illustrative embodiment of the invention comprising a motor 1; a sensor 2 for detecting rotations of motor 1; a host controller 3 for generating a command signal for feedback control; a driver box 4 for subjecting motor 1 to feedback control according to command signals from host controller 3 and signal fed back from sensor and a dynamic brake 6 for braking motor 1.

Sensor 2 is of a phase modulation type, for which an optical resolver or a magnetic resolver may be used.

Host controller 3 comprises a personal computer 31 for sending commands to start up and shut down motor 1 through a communication line, e.g. an RS232C; a servo controller 32 for generating an analog command signal and for subjecting motor 1 to feedback control for rotational speed; a positioning controller 33 for generating a serial pulse command signal; a robot controller 34 for sending a command signal to an 8-bit bus 44. As can be seen, host controller 3 is provided with various control systems.

Driver box 4 comprises a uni-axial interface 41 (the word interface is abbreviated herein as "I/F"); a speed/torque I/F 42; a serial pulse I/F 43; an 8-bit microcomputer bus I/F 44, each respectively connecting personal computer 31, servo controller 32, positioning controller 33 and robot controller 34 to driver box 4.

Driver box 4 further comprises an optical I/F 45 and a resolver I/F 46, each respectively connecting sensor 2 to driver box 4. When an optical resolver is used for sensor 2, I/F 45 is used. When a magnetic resolver is used for sensor 2, I/F 46 is used. I/F 45 generates output signals which are processed from the detection signal from the optical resolver. I/F 46 similarly generates output signals which are processed from the detection signal from the magnetic resolver.

The driver box further comprises a main control part 47 for controlling rotational position, rotational speed and generated torque of the motor through feedback control according to command signals from I/F's 41 to 44, and detection signals from I/F's 45, or 46. Main control part 47 outputs control signals comprising pulse width modulation (PWM) signals. Main control part 47 also functions to commutate and control motor 1.

Further provided in driver box 4 is a power control part 48, which is an inverter type motor driving circuit for amplifying power according to PWM signals from main control part 47. Power control part 48 is provided with a high speed type control $48_1$ and a low speed type control $48_2$.

Main power source 49 is provided in driver box 4 for generating a DC voltage converted from a fed AC voltage and comprises three power sources $49_1$, $49_2$ and $49_3$ according to desired supply voltages and output voltages. High speed control circuit $48_1$ and low speed control circuit $48_2$, are used according to the appropriate power source $49_1$, $49_2$ and $49_3$.

A control power source 50 generates a driving voltage for main control part 47 from an output from main power source 49.

A minimum system comprises an external part I/F 400 comprising I/F's 41 to 44; a sensor I/F part 401 comprising I/F's 45,46; main control part 47; and power control part 48. Such a system can be of a modular structure.

Figure 2B:
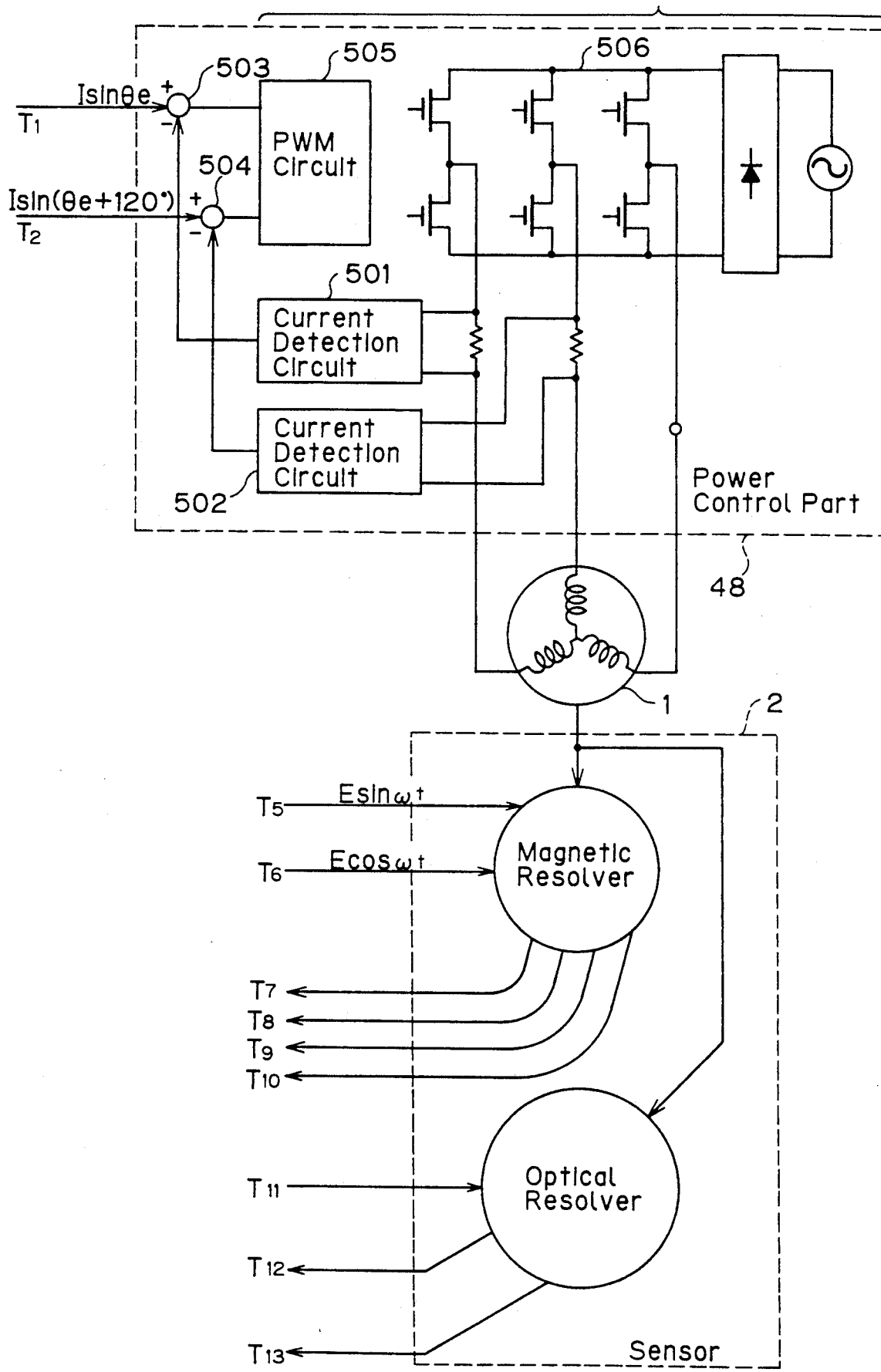

FIGS. 2(A), 2(B) and 2(C) are block diagrams depicting details of the motor drive system of the invention, with like reference symbols representing like parts of FIG. 1, and with signal lines $T_1$ to $T_{13}$ connecting FIGS. 2(A), 2(B) and 2(C) together.

External I/F part 400 comprises a plurality (e.g. 3) of kinds of I/Fs. Sensor I/F part 401 comprises a magnetic resolver ID card 402 and an optical resolver ID card 403, to which a magnetic resolver and an optical resolver are connected, respectively. A counter circuit 404 is provided for counting the pulse number of the signal taken out by resolver cards 402,403.

Main control part 47 comprises a position control part 470 and a speed control part 490 for controlling the rotational position and the rotational speed of motor 1 through feedback control.

A setting part 7 operates various settings on a switch or host controller.

Each component of the system of FIGS. 2(A)–2(C) will next be described in terms of the structural and constructional details, and as set forth with subheadings for sake of clarity of description.

1. Motor

FIGS. 3(A) and 3(B) describe details of a motor 1, wherein a rotor is disposed outside and a stator inside, and a stationary magnet is disposed on the stator side, thereby keeping the rotor large in the radial dimension.

An inside stator 101 is shown comprising two magnetic materials 101a, 101b and a stationary magnet (such as a permanent magnet, an electromagnet, or the like) 102 for connecting the two magnetic materials 101a, 101b, and an excitation coil described hereinafter. Magnetic materials 101a and 101b are provided with six salient poles $103a_1$ to $105a_1$, $103a_2$ to $105a_2$ and also $103b_1$ to $105b_1$, $103b_2$ to $105b_2$, respectively. Each salient pole has teeth with pitch P on the tip thereof. The teeth of adjacent salient poles $103a_1$ and $104a_2$, for example, are provided with a ⅓ pitch (P/3) phase shift with respect to each other, and the salient poles $103a_1$ and $103b_1$, for example, with the two magnetic materials 101a and 101b opposite each other are of the same phase. Excitation coils 106a to 106c and 107a to 107c are provided on each salient pole portion with each set of coils 106a and 107a, 106b and 107b, 106c and 107c being connected in series. A rotor 108 is formed of a magnetic material and is provided with teeth of pitch P inside. Rotor 108 comprises teeth 108a and 108b which are shifted by ½ pitch each.

Motor 1, depicted in FIGS. 3(A) and 3(B), rotates from carrying a current (which may be of a sine wave, pulse wave, or the like), with a phase shifted 120° with respect to each other, in excitation coils 106a and 107a, 106b and 107b, 106c and 107c. The direction of rotation can be changed by changing the lead and lag of the phases. The magnetic flux generated by stationary magnet 102 and the magnetic flux generated by the excitation coil 106a are added or subtracted alternately in gaps 109a and 109b, thereby rotating the pulse motor at high resolution.

The magnetic flux generated by stationary magnet 102 is half of the magnetic flux which is necessary for rotation. Thus, power consumption is minimized, and efficiency is further enhanced. The permanent magnet, used as a stationary magnet, is provided on the stator side because the surface magnetic flux density of the magnet is small (1 Tesla at most) and appropriate dimensions are thus usable. On the other hand, if the magnet is disposed on the rotor side, the dimension will be thick radially. The number of salient poles may be selected arbitrarily subject to being a multiple of 3, other than 6.

As compared with motors having the same outside diameter and shaft diameter, the motor of the construction shown in FIGS. 3(A) and 3(B) generates a further large torque.

An example of a double core structure, wherein two magnetic materials are provided on each of the rotor and stator, is shown in FIGS. 3(A) and 3(B). However, the invention is not necessarily limited thereto. For example, a single core structure wherein one magnetic material is provided on each of the rotor and stator is acceptable.

Figure 4:
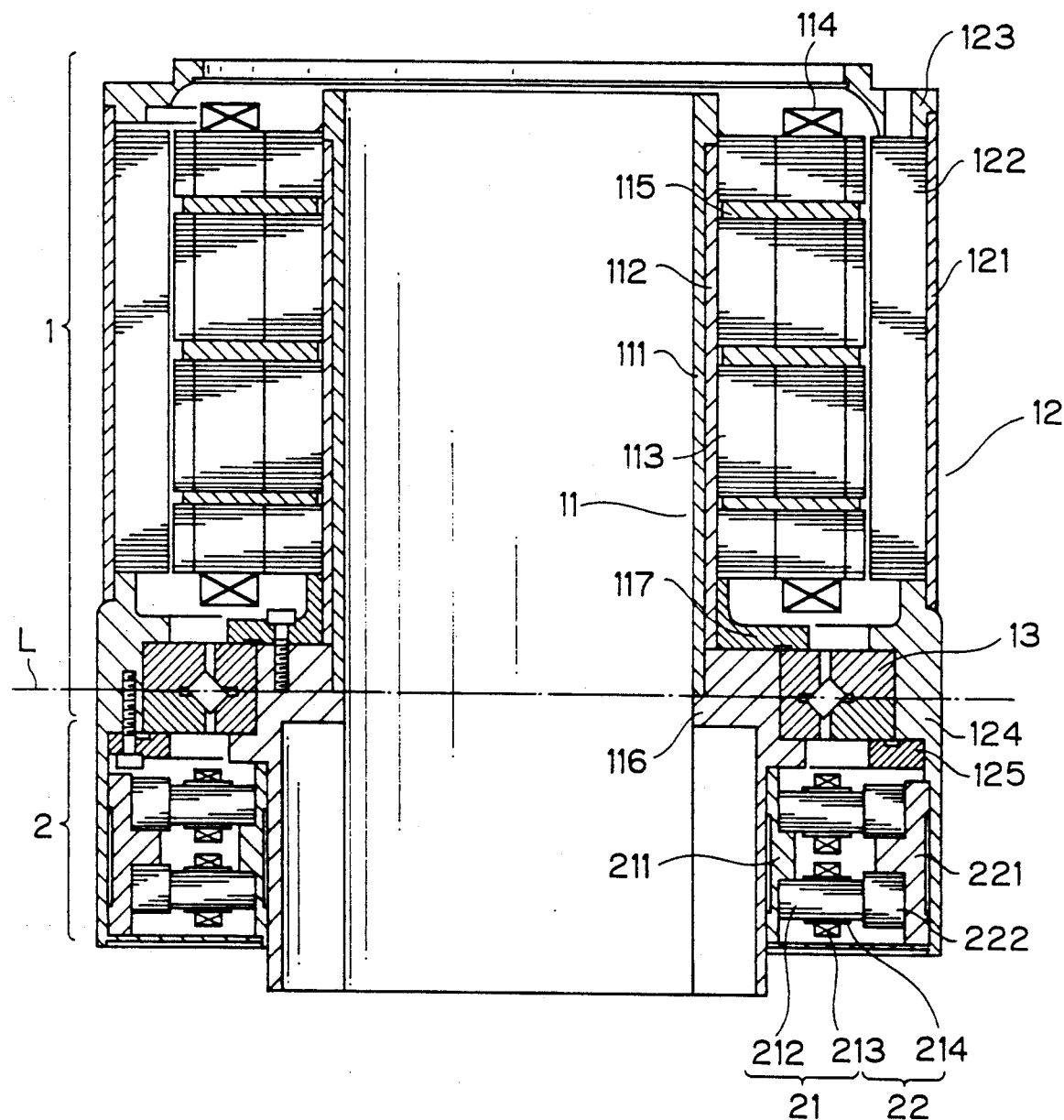
FIG. 4 depicts another example of a motor.

Another example of a motor 1 which can be used in the invention is shown in FIG. 4, wherein the motor is depicted in a state wherein the motor 1 is coupled to the magnetic resolver 2 to work as an actuator. The motor 1 is an outer rotor type direct drive motor (a direct drive motor is herein referred to as "DD motor") and is coupled to a magnetic resolver 2 for detecting rotations of motor 1. Motor 1 comprises a stator 11, a rotor 12, and a bearing 13 for bearing rotor 12 rotatively on stator 11.

Stator 11 comprises a cylindrical stator flange 111, a shield ring 112 formed of a nonmagnetic material and fixed on an outer peripheral surface of stator flange 111, and a stator core 113 fixed on an outer peripheral surface of shield ring 112. Stator core 113 is formed of a laminated steel plate and is provided with a salient pole having a constant pitch of teeth formed on the tip thereof. A coil 114 is wound on stator core 113, and a permanent magnet 115 is sandwiched between stacks of stator core 113. Stator core 113 constitutes a magnetic circuit of a field generated by coil 114 and permanent magnet 115. A lower flange 116 has stator flange 111 fixed thereon. A clamp 117 is provided for jamming bearing 13 at one end.

Rotor 12 comprises a cylindrical rotor flange 121, a rotor core 122 fixed on an inner peripheral surface of rotor flange 121 and constituting a magnetic circuit of the rotor, an upper flange 123 and a support flange 124 fixed to opposite ends of rotor flange 121, and a clamp 125 for jamming bearing 13 at one end. Rotor core 122 is constituted of a laminated steel plate with a constant pitch of teeth formed at positions opposite to the teeth of stator core 113.

The stator core 113 and the rotor core 122 are fixed, for example, by welding.

Magnetic resolver 2 comprises a stator part 21 and a rotor part 22 fixed integrally with stator 11 and rotor 12, respectively, of motor 1.

Stator part 21 comprises a nonmagnetic ring 211, a core 212 with magnetic materials built thereon, a coil 213 wound on core 212 through an insulating material 214. Nonmagnetic ring 211 and core 212 are fixed mutually, for example, with an adhesive. Core 212 is provided with a salient pole having teeth formed at a constant pitch on the tip thereof.

Rotor part 22 comprises a nonmagnetic ring 221, a core 222 with magnetic materials built thereon, both being fixed, for example, with an adhesive, as in the case of the stator part 21. Teeth are formed on core 222 at a constant pitch at positions opposite to the teeth of the stator core 212. Both the rotor part 22 and the stator part 21 are processed so as to have the core nose and the nonmagnetic ring on a concentric circle.

Bearing 13 is of a cross roller type, and supports a rotor of motor 1 and a rotor of magnetic resolver 2, both at one side thereof.

Figure 5:
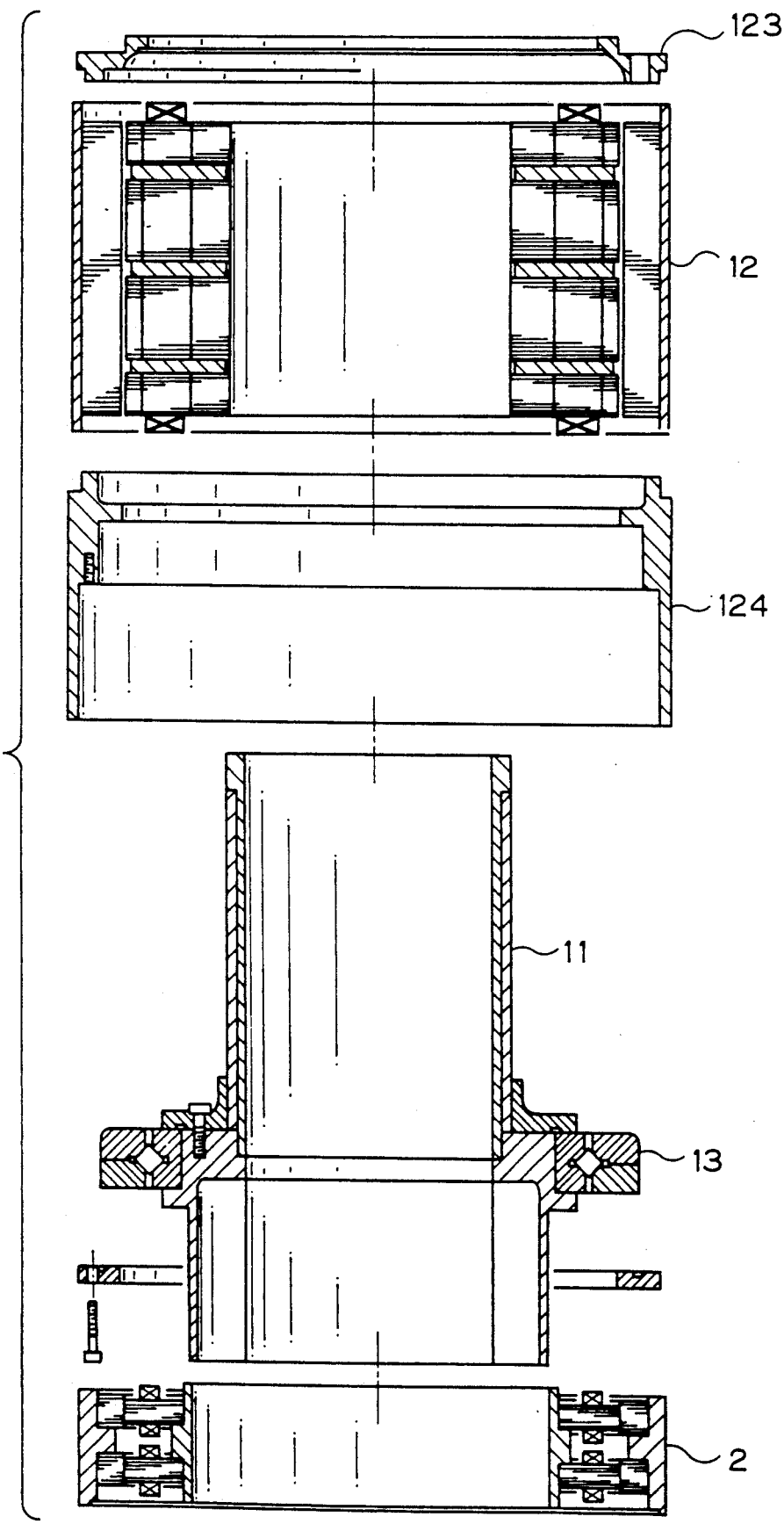
FIG. 5 is an exploded view of the motor of FIG. 4.

FIG. 5 is an exploded view depicting the motor part 1 of FIG. 4, wherein each exploded element constitutes a module. Advantageously, with this construction, the modularized upper flange 123, lower flange 116 and support flange 124 are modifiable according to the user's specifications. For example, if rotor flange 121 and stator flange 111 are long, a motor with a long core part may be constructed through upper flange 123, lower flange 116, and support flange 124, in common with each other.

The motor may be assembled, for example, by fixing each module by welding.

Advantageously, each component of the motor is modularized. Thus, sub-assemblies of the motor part can also be modularized completely for every predetermined group of components, and then the entire motor part can be fabricated from the sub-assembly modules. Also, the entire motor part can be assembled from each component.

Figure 6:
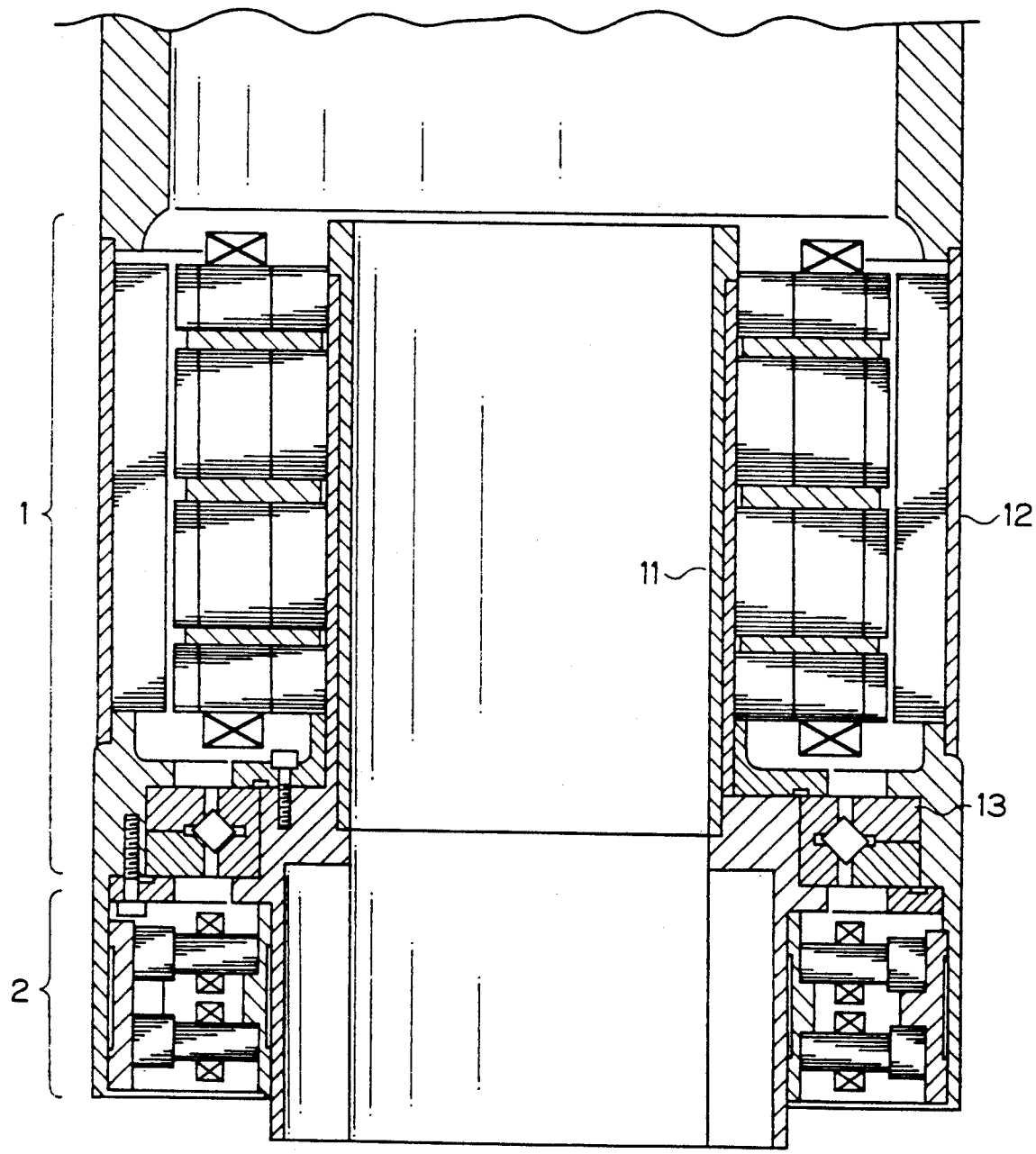
FIG. 6 depicts a motor module having an upper flange 123 formed cylindrically.
Figure 7:
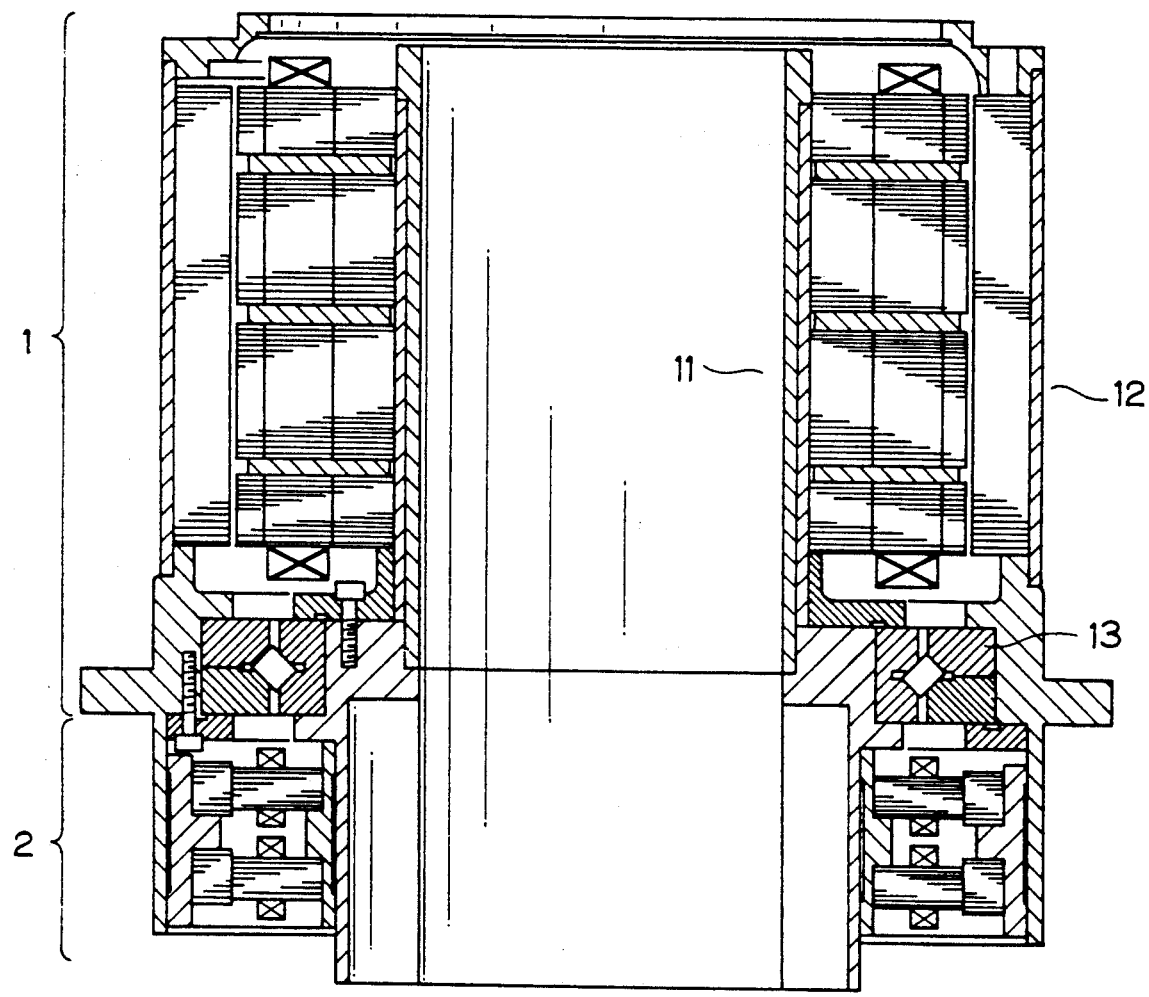
FIG. 7 is a motor module having a flanged support flange 124.
Figure 8:
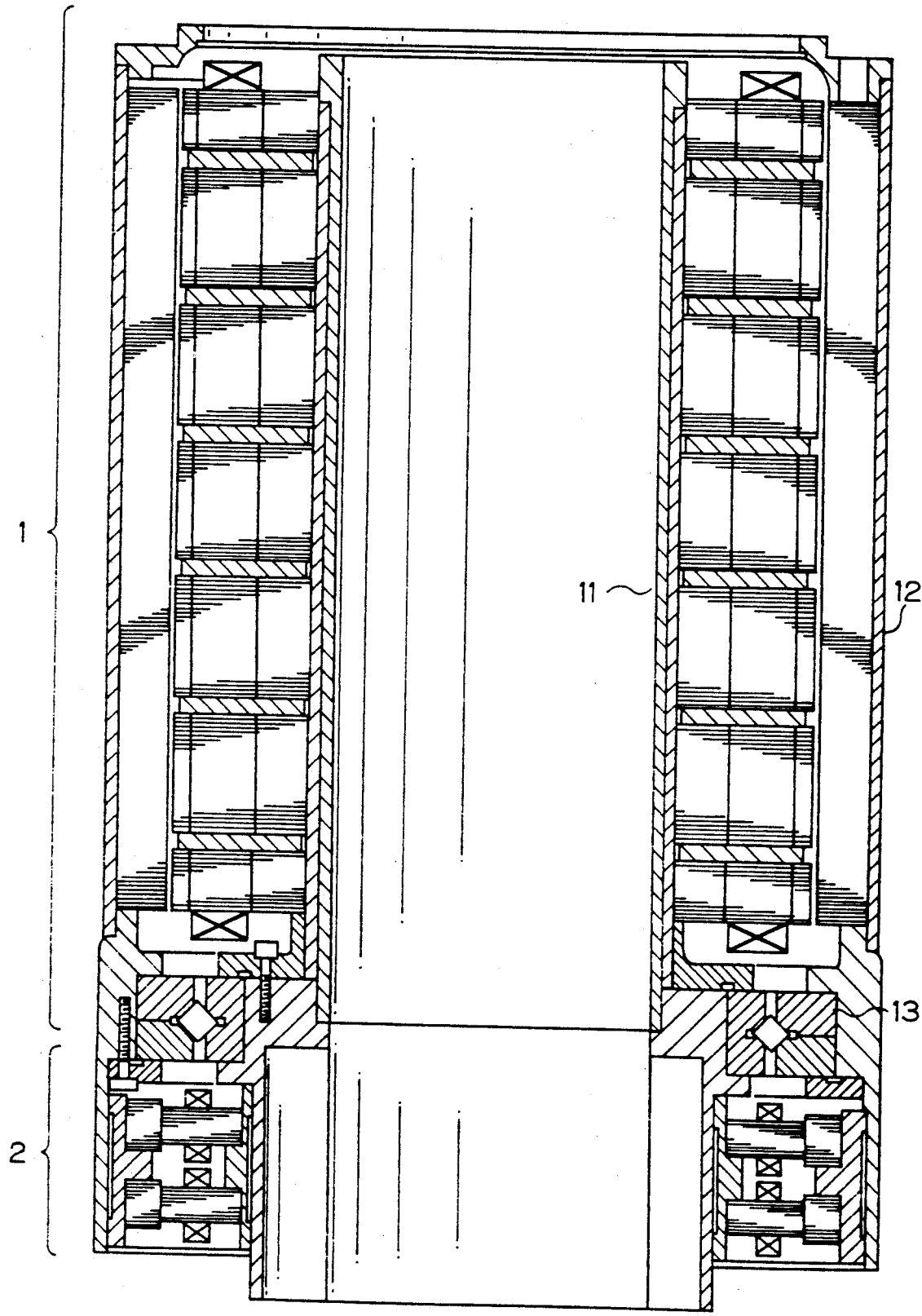
FIG. 8 is a motor module having rotor flange 121 and stator flange 111 extended as the core part.
Figure 9:
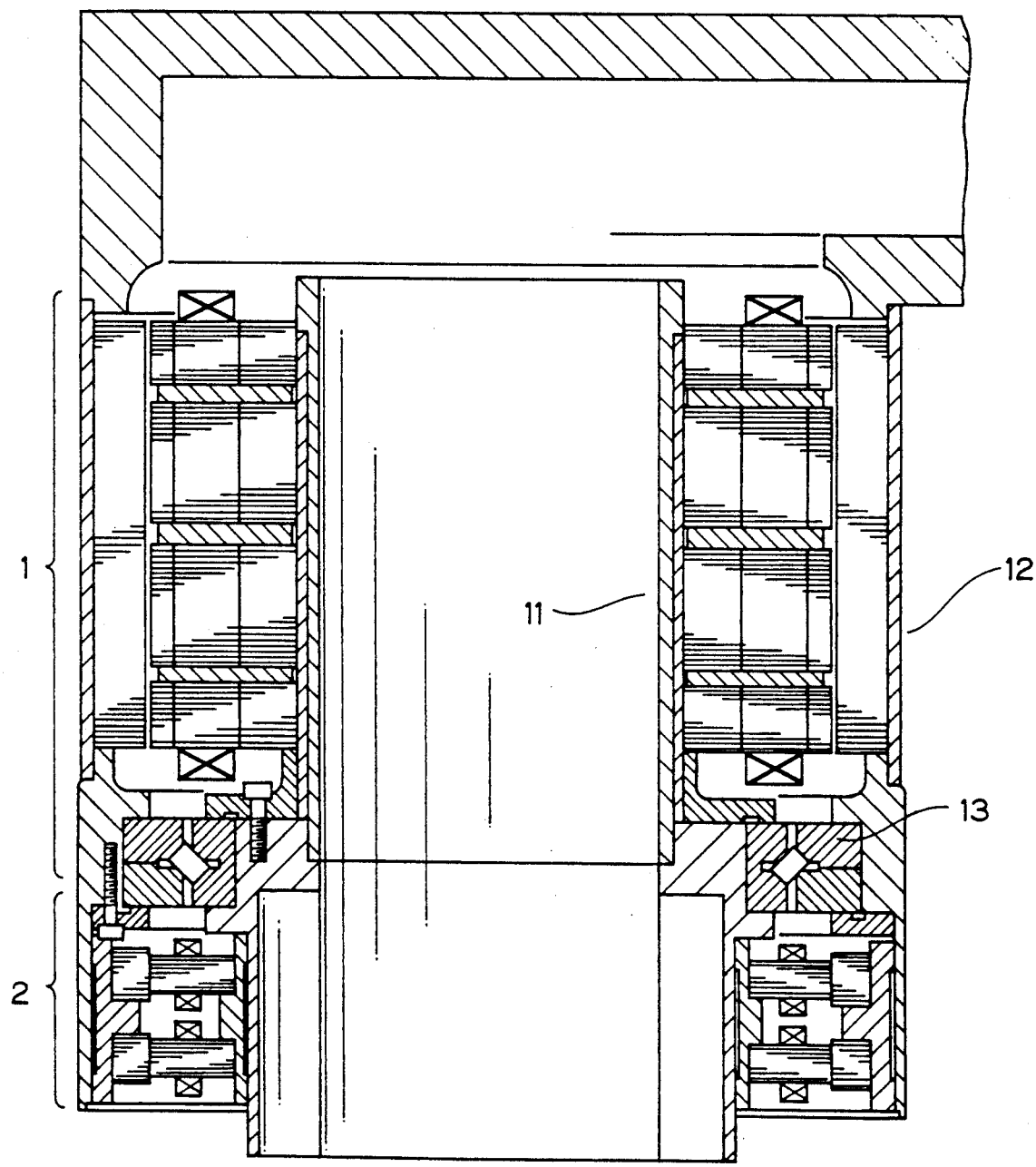
FIG. 9 is a motor module having a robot arm mounted on the upper flange.

Next, a working example of the motor utilizing such modular construction will now be described with reference to FIGS. 6, 7, 8 and 9, wherein FIG. 6 depicts a cylindrical upper flange 123; FIG. 7 depicts a flanged support flange 124; FIG. 8 depicts a rotor flange 121 and stator flange 111 forming an extended core part; and FIG. 9 depicts a robot arm mounted on upper flange 123.

By modularizing the components of the motor, the user is capable of constructing the modularized flange according to his own desired specifications. A coupling structure of the motor is used which is flexible and can be adjusted to suit different requirements. Since the rotor components of the motor are ready for coupling externally, a reduction of the number of parts and a reduction of costs are realized.

Figure 10:
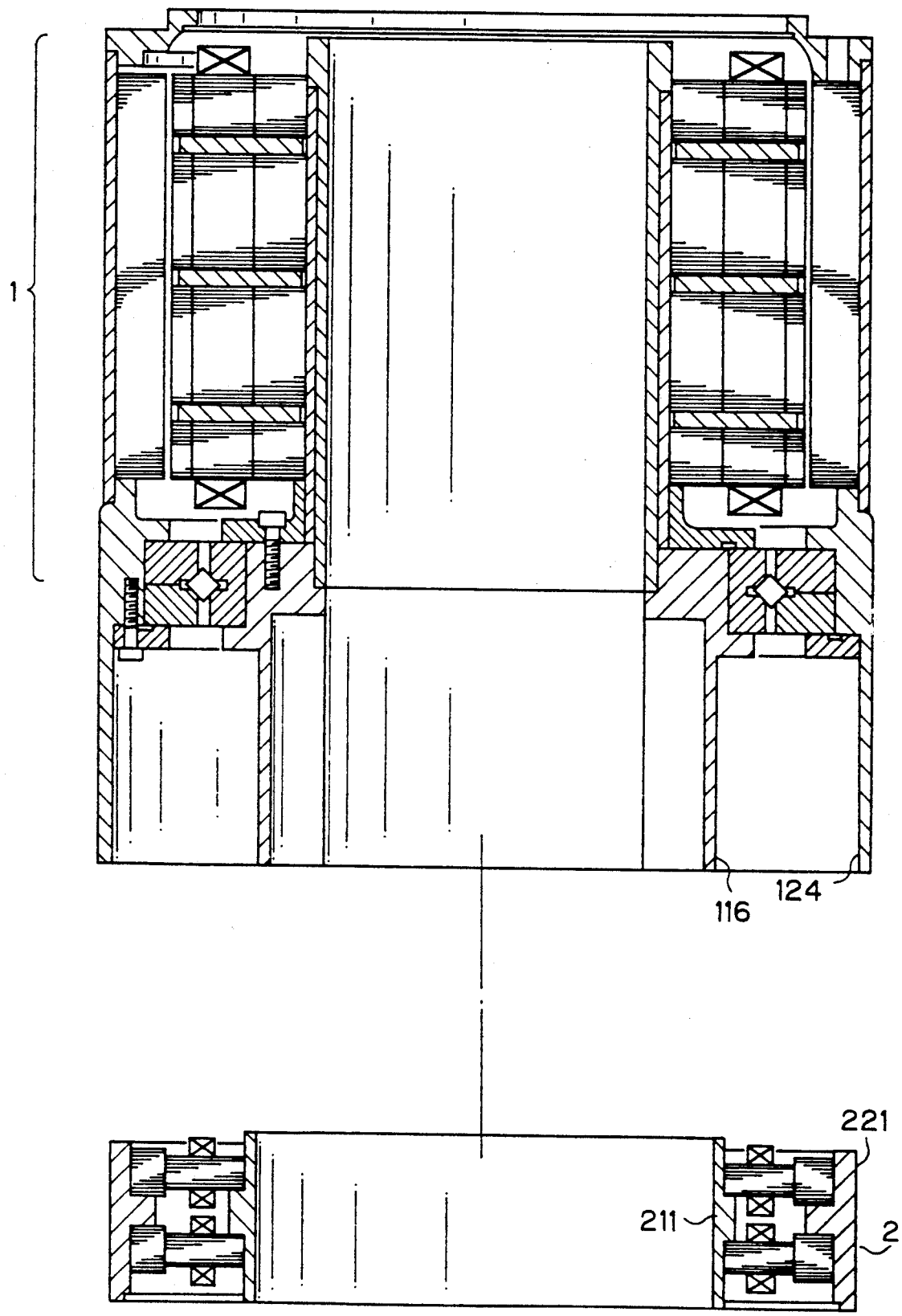
FIG. 10 is a motor having a modularized magnetic resolver incorporated in an actuator.

Then, upon completion of the motor 1, as shown in FIG. 10, the modularized magnetic resolver 2 may be incorporated in the actuator. For the incorporation, a nonmagnetic ring 211 is fitted in flange 116, and a nonmagnetic ring 221 is fitted in flange 124 and furthermore bonded, such as by use of adhesive, welding, etc.

Magnetic resolver 2 is not completely resistant to external stress. Thus, magnetic resolver 2 is fixed through fitting and bonding at the same time.

Figure 11:
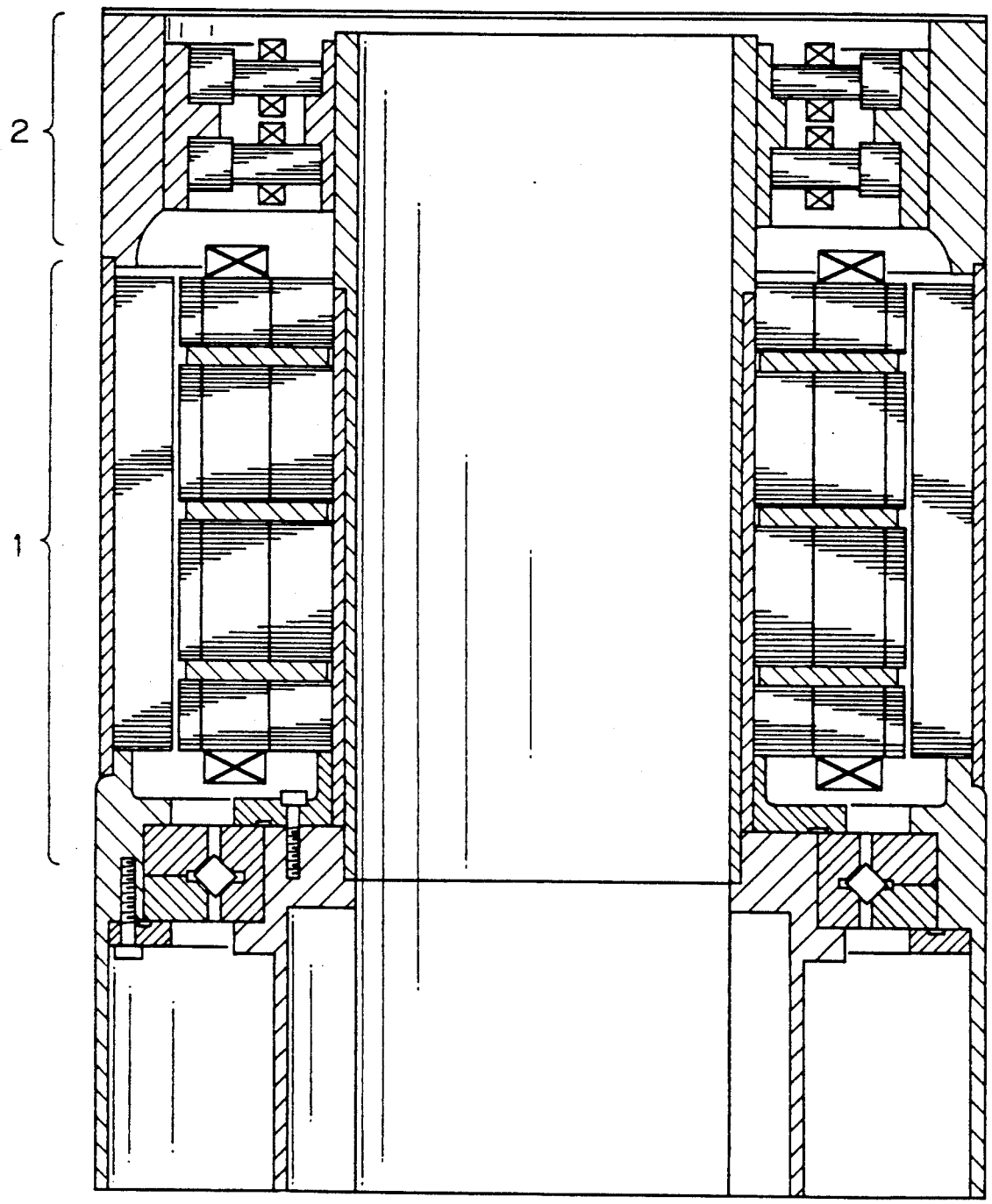
FIG. 11 depicts another example of a motor.

FIG. 11 depicts another example of a motor usable in the invention, wherein motor 1 has the rotor and stator flanges extended upward, and magnetic resolver 2 is fixed on this extended portion. By use of such a construction, either an upper portion of the motor or a bottom portion of the motor can be selected for use a the position where the magnetic resolver is to be fixed. Thus, advantageously, this construction expands the alternative specifications which are available to the user.

Figure 12:
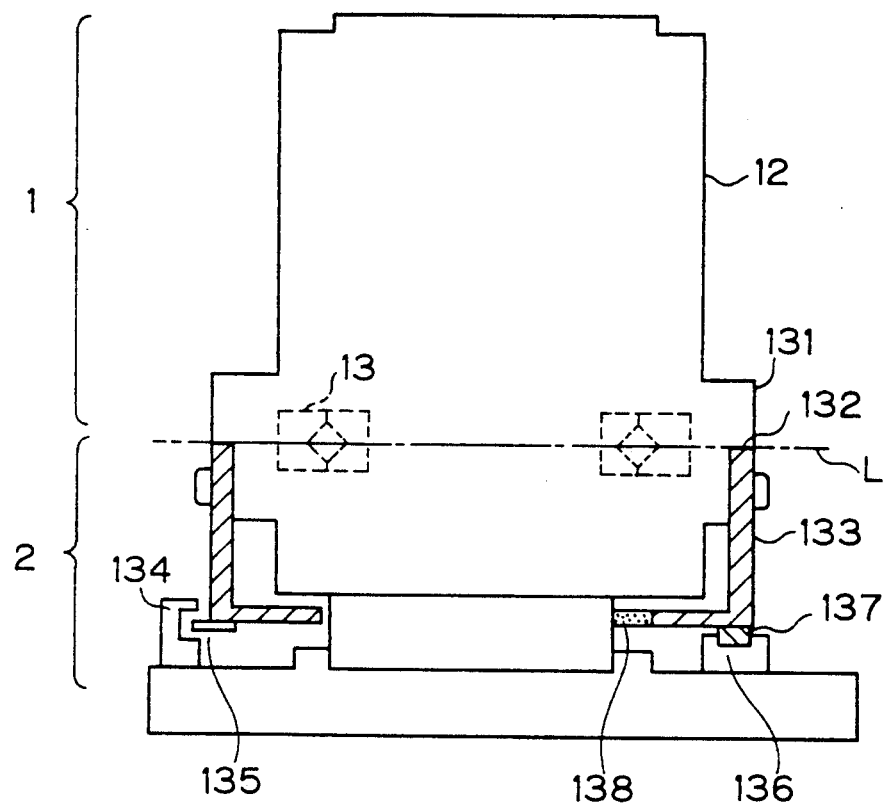
FIG. 12 depicts a further example of a motor.

FIG. 12 depicts another example of a motor used in the invention, wherein an actuator 130 is depicted having the internal construction shown in FIG. 4. A flange 131 is formed on an outer peripheral surface of actuator 130 and is positioned around a center line L longitudinal of the bearing 13 in the actuator. Center line L is also shown in FIG. 4. Since center line L and its vicinity come between the motor 1 and the magnetic resolver 2, the variation of magnetic resistance is minimized, even with the flange 131 being formed on this portion. Furthermore, the rotor is particularly thick at this portion. Hence, the rotor has high strength. Accordingly, this portion is an optimal location for formation of the flange.

A stepped portion 132 is formed on flange 131, and a ring case 133, which is L shaped in section, is screwed and fixed on stepped portion 132.

A photocoupler 134 is mounted on a fixed portion, and a douser member 135 is provided on ring case 133 for intercepting light from photocoupler 134 when the rotational position of the actuator comes to an origin point. An origin sensor comprises photocoupler 134 and douser member 135.

A member 136 is mounted on the fixed portion, and a member 137 is mounted on ring case 133 for regulating the rotational range of the actuator from coming in contact with member 136. A stopper is constituted of members 136 and 137.

A dust seal 138 is present on a nose of ring case 133 and is brought into contact with the stator by a magnetic field.

Although a ring case is used to mount peripheral equipment, such as the origin sensor, stopper, or the like, to the flange, an O-type ring member can also be used. In this case, a plurality of threaded holes are provided on the ring member, and by selecting the threaded hole to mount the peripheral equipment therethrough, the operating range of the peripheral equipment may be set arbitrarily. Also, the peripheral equipment may be directly mounted to the flange.

Figure 13:
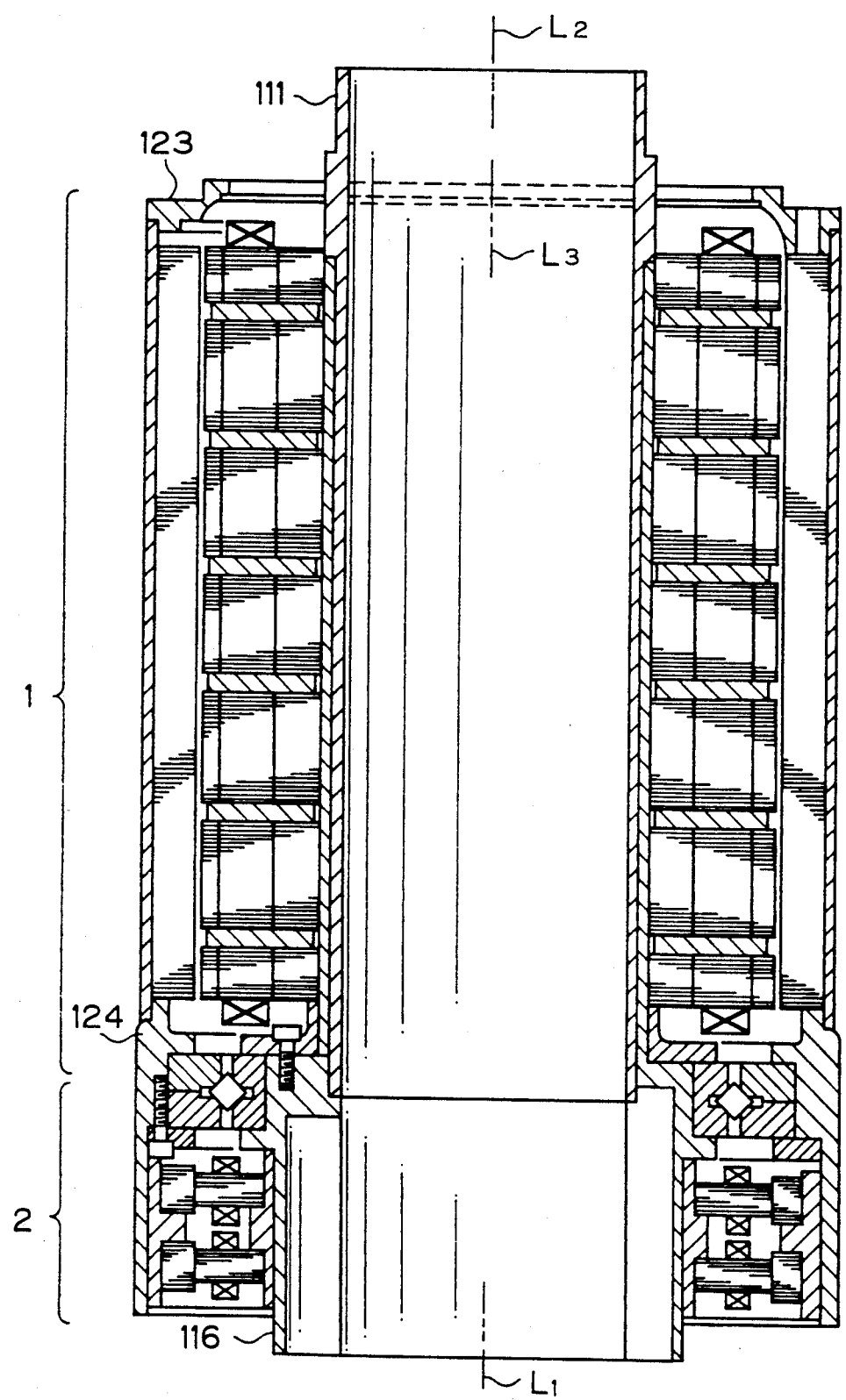
FIG. 13 depicts another example of a motor.

Another example of a motor is shown in FIG. 13, wherein lower flange 116 and stator flange 111 both project partly from rotor 12. When assembling the motor, a central axis $L_1$ of lower flange 116, a central axis $L_2$ of stator flange 111 and a central axis $L_3$ of upper flange 123, are aligned at the same time. Thus, upper flange 123 and lower flange 116 disposed counter to each other are aligned concurrently. A central axis of support flange 124 may be added to the above alignment.

In the motor of FIG. 13, a satisfactory out of concentricity is obtainable between the upper flange of the rotor and the lower flange of the stator which are disposed counter to each other. Thus, deviation of driving objects fixed on the rotor can be decreased.

Figure 14:
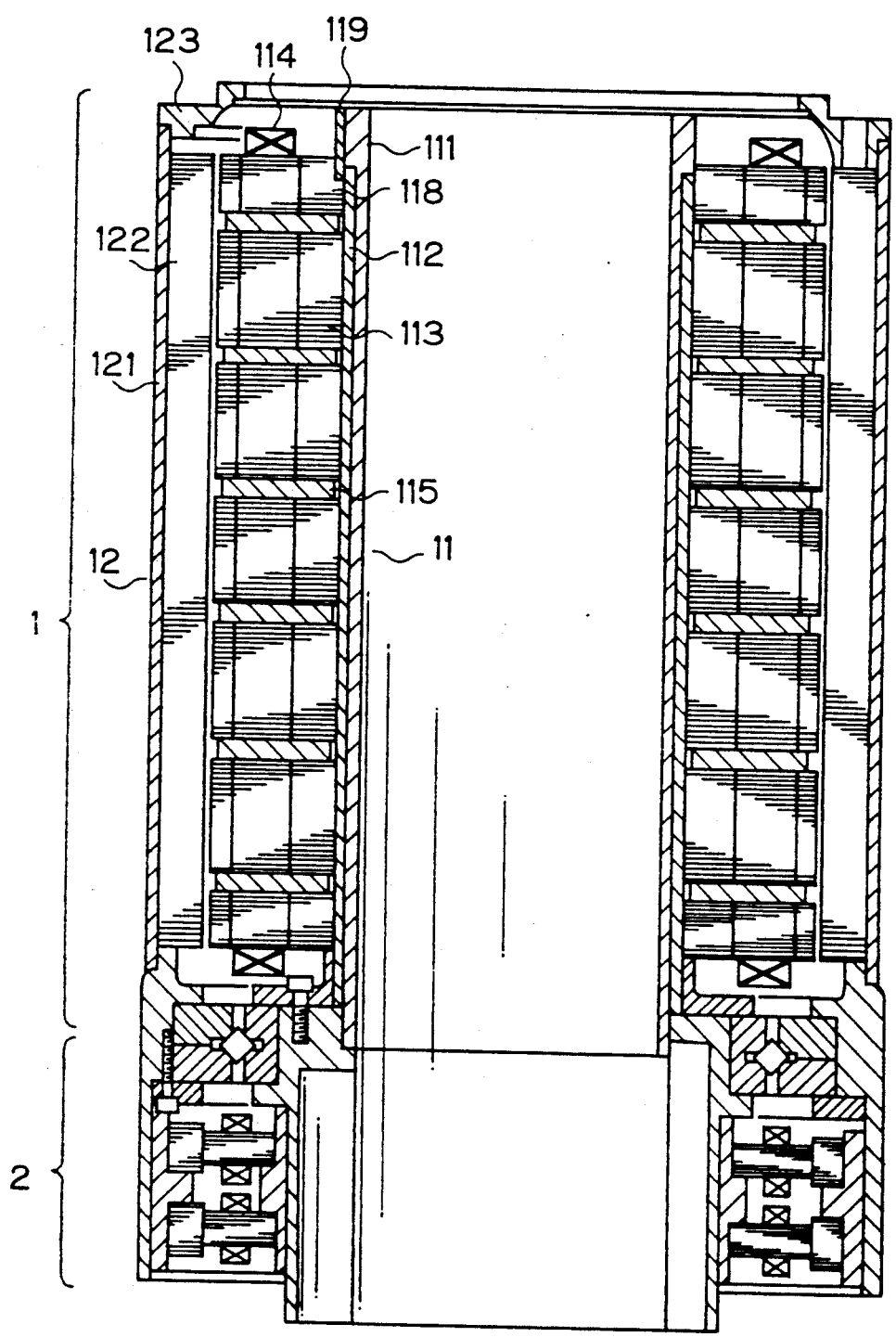
FIG. 14 depicts a still further example of a motor.

A still further example of a motor is shown in FIG. 14, wherein a notch, for phasing the teeth of the stator, is formed on each of the laminated steel plates constituting stator core 113. The steel plates are laminated with the notches being coincident to each other so that a groove 118 is formed by the notches when the plates form stator core 113. The motor of FIG. 14 utilizes groove 118.

Figure 15:
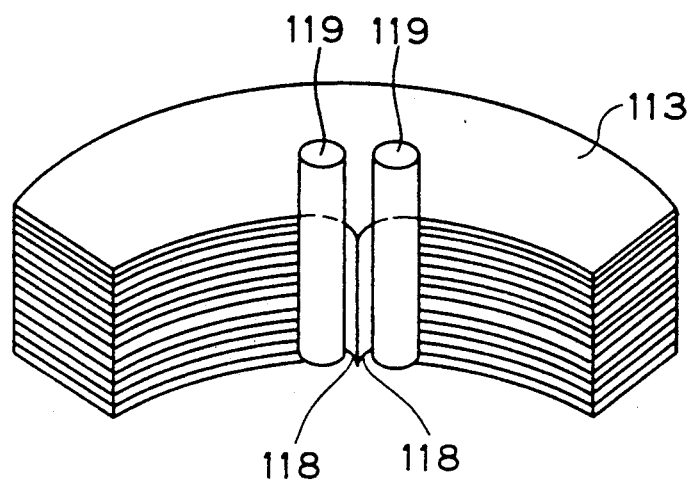
FIG. 15 depicts details of projection 119 fixed in groove 118 of the motor of FIG. 14.
Figure 16:
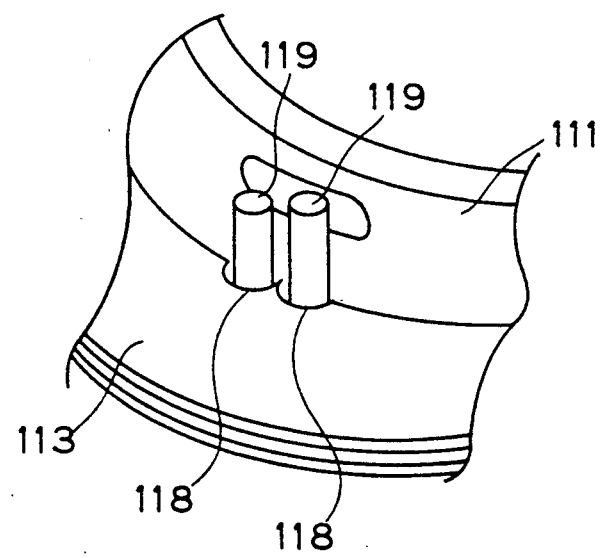
FIG. 16 depicts the fixed state of stator core 113 on stator flange 111.

A projection member 119 is formed like a shaft by a magnetic material or, for example, iron group material. As shown in FIGS. 15 and 16, projection member 119 has one end portion thereof fixed in groove 118, for example, by welding, and the other end portion thereof, fixed on stator flange 111, for example, by welding. Stator core 113 is thus fixed on stator flange 111. A fixed state is shown in FIG. 16.

Projection member 119 is of sufficient length so as to keep a welding torch from being bent by a field from permanent magnet 115 when the other end portion of the projection member 119 is welded. TIG welding, for example, is used in this case.

Figure 17:
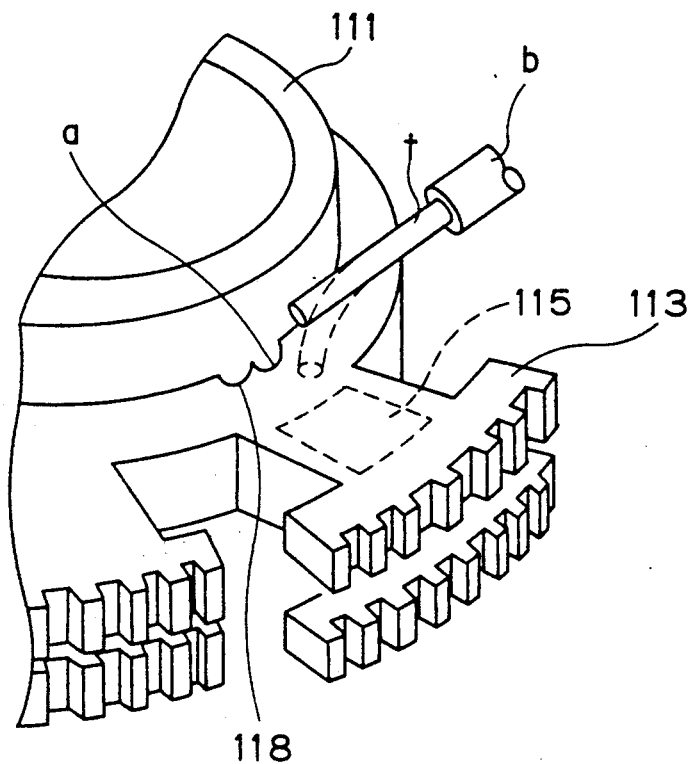
FIG. 17 depicts a welding problem.

As shown in FIG. 17, in case stator core 113 is welded and fixed on stator flange 111 at a portion a without using projection member 119, a torch t will be bent, as indicated by the broken line, by a magnetic field produced by the permanent magnet, since torch t coming out of welding rod b is not sufficiently distanced from permanent magnet 115. Thus, it is difficult to obtain a weld at portion a.

Figure 18:
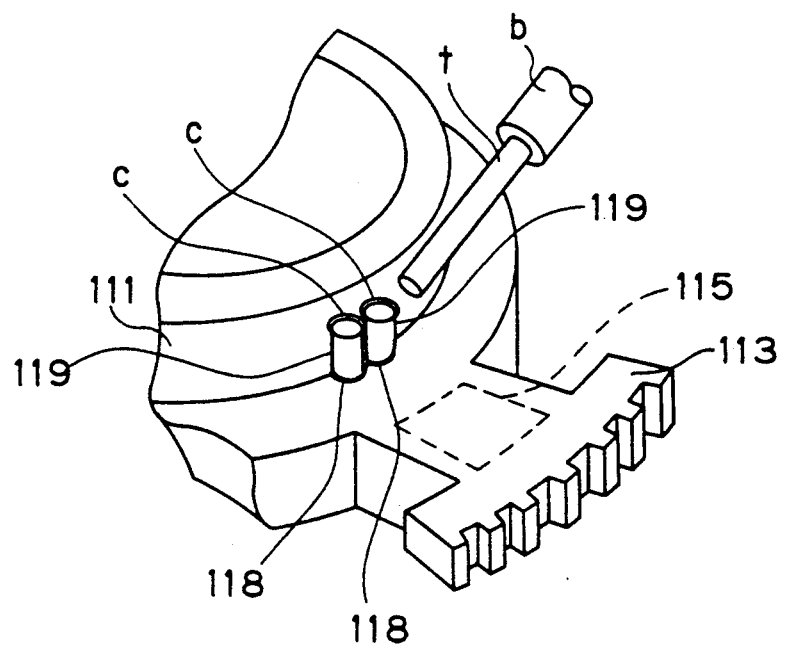
FIG. 18 depicts an improved welding procedure.

On the other hand, as shown in FIG. 18, torch t is disposed at a distance from permanent magnet 115 according to the length of projection member 119. Hence, welding can be carried out at a portion c without torch t being bent by influence of the magnetic field. Accordingly, using the invention, welding is facilitated. Since projection member 119 is fixed by the positioning notices 118 of the laminated steel plate, projection member 119 can be fixed without increasing the number of processsing steps, which is advantageous from the viewpoint of cost reduction. Also, projection member 119 may be obtained by bending a magnetic plate instead of using a pin.

Figure 19:
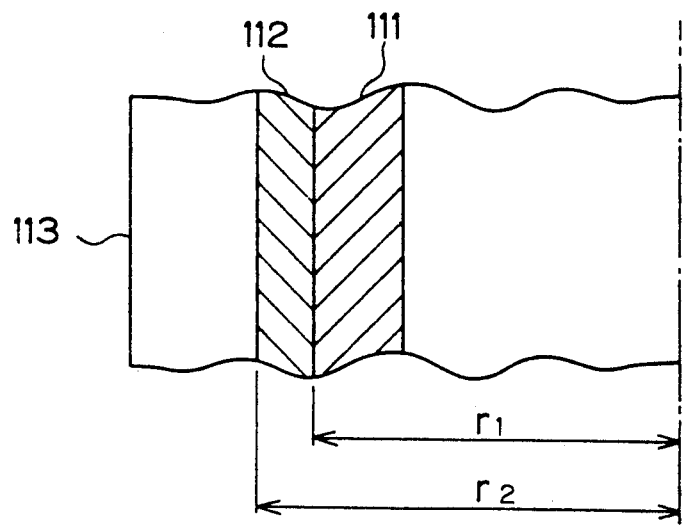
FIG. 19 a sandwiched shield structure.

The coefficient of thermal expansion of the sandwich structural portion wherein opposite sides of shield ring 112 are sandwiched by stator flange 111 and stator core 113 will now be described with reference to FIG. 19.

In the below equation (1), the symbols are as follows. $\alpha_1$ is coefficient of thermal expansion of stator flange 111; $\alpha_2$ is coefficient of thermal expansion of shield ring 112; $\alpha_3$ is coefficient of thermal expansion of stator core 113; $r_1$ is the inside diameter of shield ring 112, which is equal to the outside diameter of stator flange 111; $r_2$ is the outside diameter of shield ring 112, which is equal to the inside diameter of stator core 113.

To keep the shield ring 112 from separating from the members on both sides despite a change in temperature, the coefficient of thermal expansion of shield ring 112 is set as follows.

$$\alpha_3 r_2 \Delta T - \alpha_1 r_1 \Delta T = \alpha_2 (r_2 - r_1) \Delta T \quad (1)$$

$$\alpha_3 r_2 - \alpha_1 r_1 = \alpha_2 (r_2 - r_1)$$

$$\alpha_2 = (\alpha_3 r_2 - \alpha_1 r_1)/(r_2 - r_1)$$

By satisfying equation (1), a simple construction realizes a sandwich structure which is sufficiently effective to prevent a clearance from arising due to a temperature change between the stator core and the shield ring which are of different materials.

2. Sensor

2-1 The Sensor is a Magnetic Resolver

FIGS. 20(A) and 20(B) depict an example of a magnetic resolver used as a sensor, wherein a cylindrical rotor 231 is provided with a constant pitch $P_r$ of teeth 232 on the inner periphery, with rotors $231_1$ and $231_2$ being provided one above the other.

A stator 233 is disposed on an inside of rotor 231. Stator 233 is provided with 4N (N being an integer), for example 16, number of salient poles $234_1$ to $234_{16}$. Teeth 235 disposed opposite to teeth 232 are provided on the tips of the salient poles. The coils $236_1$ to $236_{16}$ are wound on each salient pole. While only coil $236_1$ is shown wound on salient pole $234_1$, it is to be understood that coils are wound on the other salient poles.

Stator 233 comprises stators $233_1$ and $233_2$, one above the other, through an insulating member 237.

Rotor 231 and stator 233 are constructed, for example, by laminating steel plates.

Signaling sources $238_1$ and $238_2$ provide AC voltages $Ec = V \cos \omega t$ and $Ex = V \sin \omega t$ (wherein V is voltage amplitude) to coils $236_1$ of the stators 233, and $233_2$.

Figure 21:
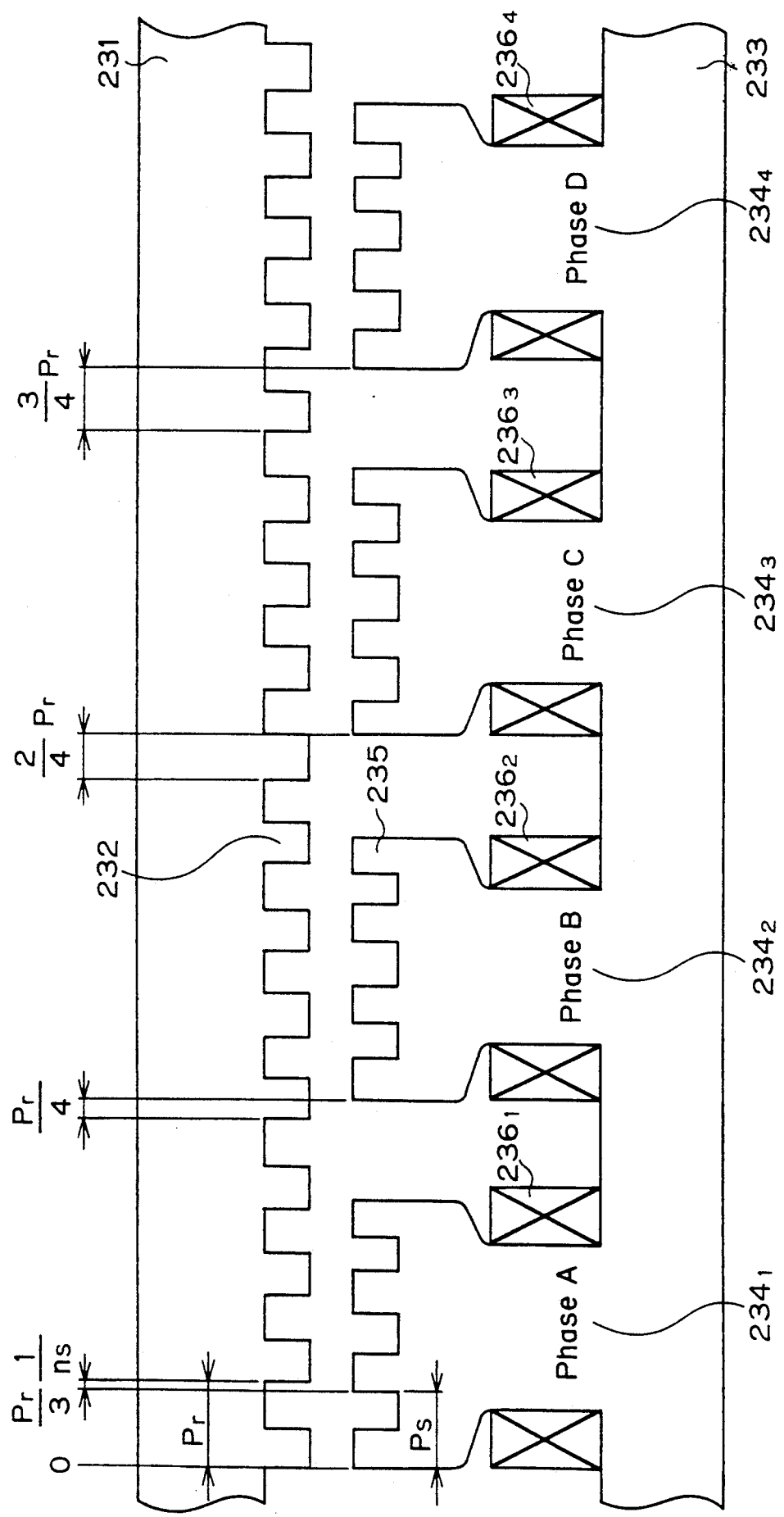
FIG. 21 details of the rotor and stator of FIG. 20.

Details of the rotor and stator are depicted in FIG. 21 which shows development of the rotor and stator, and wherein ns number of teeth are formed in one salient pole (ns = 4 as illustrated). Salient poles $234_1$, $234_2$, $234_3$ and $234_4$ have the phases shifted by 0, (1/4)Pr, (2/4)Pr, (3/4)Pr to teeth 232 of rotor 231.

The salient poles has provided 16 teeth, and the salient poles of one phase are provided with 4 teeth each. The coils which are wound on the salient poles are of one phase and form one phase. The coils wound on the salient poles with the phase shifted by 0, (1/4)Pr, (2/4)Pr, and (3/4)Pr, are called those of phase A, phase B, phase C and phase D, respectively.

The pitch Ps of the salient pole teeth 235 is $$Ps = Pr - (Pr/3ns)$$

Thus, the salient pole teeth 235 have the phase shifted by Pr/3ns, in the direction where they are arrayed. The teeth may be used accordingly as a vernier.

The rotors $231_1$ and $231_2$ are placed one over the other with teeth 232 being in phase. The stators $233_1$ and $233_2$ are also placed one over the other but with teeth 235 shifted in phase by Pr/4.

Figure 22:
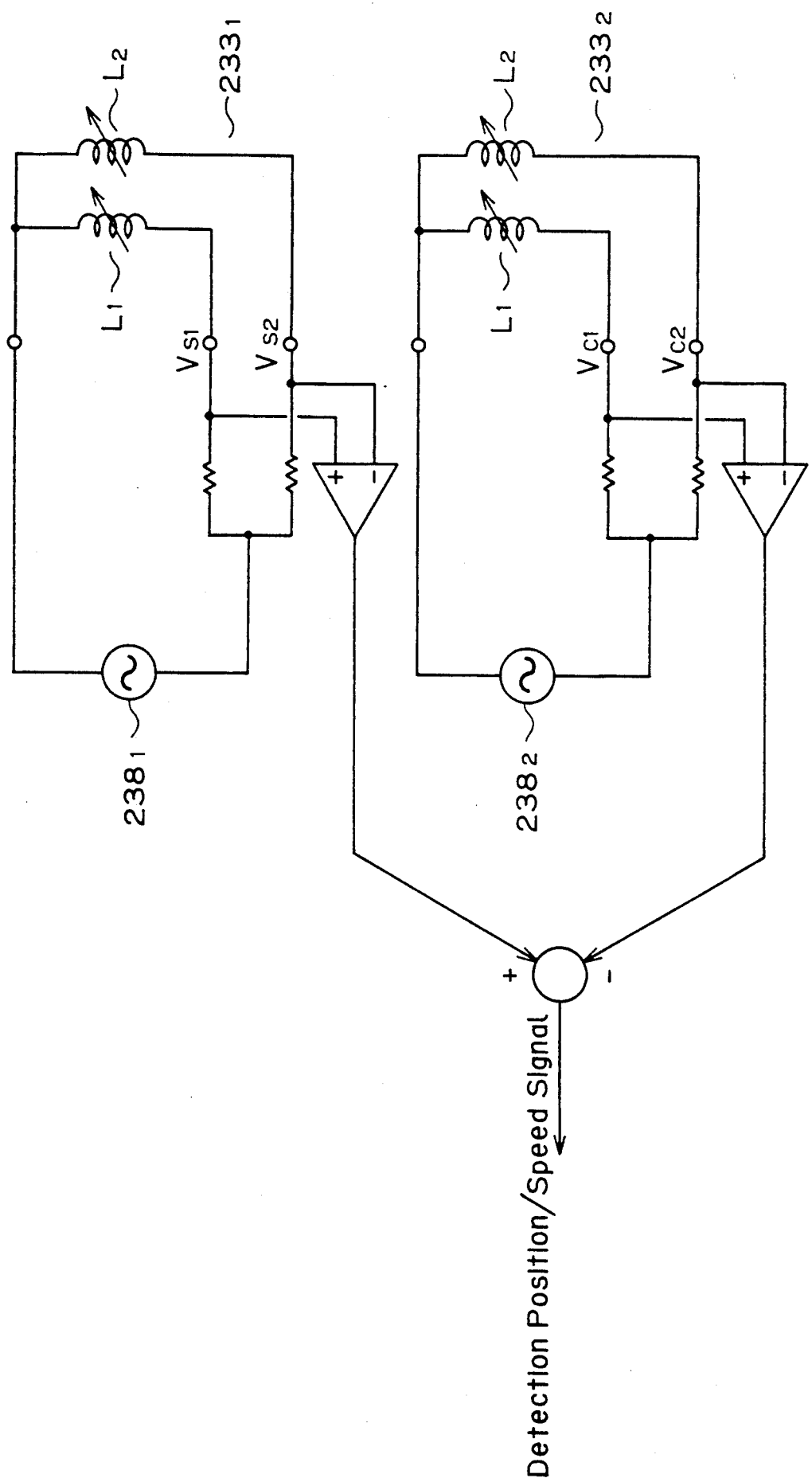
FIG. 22 depicts the connection of the coils of FIG. 20.

FIG. 22 depicts the connection of each coil of the stator, wherein a coil $L_1$ comprises coils of phase A and phase B connected in series, and a coil $L_2$ comprising coils of phase C and phase D connected in series A voltage $V \cos \omega t$ is impressed on the coils of stator $233_1$ and a voltage $V \sin \omega t$ is impressed on the coils of the stator $233_2$. Voltages generated on the coils are detected through a resistance, an amplifier, and a subtractor (unnumbered).

Operation of the apparatus of FIG. 22 will now be described. Voltages $S_1$, $S_2$, $S_3$, and $S_4$, generated on the coils of phase A, phase B, phase C and phase D, are as follows.

$$S_1 = E \sum_{l=0}^{n_s-1} \left\{ 1 + m_1 \sin\left(\theta + \frac{Pr}{3} \frac{l}{n_s}\right) + \right. \quad (2)$$

$$\left. m_2 \sin 2\left(\theta + \frac{Pr}{3} \frac{l}{n_s}\right) + \ldots + m_n \sin n\left(\theta + \frac{Pr}{3} \frac{l}{n_s}\right) \right\}$$

$$S_2 = E \sum_{l=0}^{n_s-1} \left\{ 1 + m_1 \sin\left(\theta + \frac{\pi}{2} + \frac{Pr}{3} \frac{l}{n_s}\right) + \right. \quad (3)$$

$$m_2 \sin 2\left(\theta + \frac{\pi}{2} + \frac{Pr}{3} \frac{l}{n_s}\right) \ldots +$$

$$\left. m_n \sin n\left(\theta + \frac{\pi}{2} + \frac{Pr}{3} \frac{l}{n_s}\right) \right\}$$

$$S_3 = E \sum_{l=0}^{n_s-1} \left\{ 1 + m_1 \sin\left(\theta + \pi + \frac{Pr}{3} \frac{l}{n_s}\right) + \right. \quad (4)$$

$$m_2 \sin 2\left(\theta + \pi + \frac{Pr}{3} \frac{l}{n_s}\right) \ldots +$$

$$\left. m_n \sin n\left(\theta + \pi + \frac{Pr}{3} \frac{l}{n_s}\right) \right\}$$

$$S_4 = E \sum_{l=0}^{n_s-1} \left\{ 1 + m_1 \sin\left(\theta + \frac{3\pi}{2} + \frac{Pr}{3} \frac{l}{n_s}\right) + \right. \quad (5)$$

$$m_2 sn 2\left(\theta + \frac{3\pi}{2} + \frac{Pr}{3} \frac{l}{n_s}\right) \ldots +$$

$$\left. m_n \sin n\left(\theta + \frac{3\pi}{2} + \frac{Pr}{3} \frac{l}{n_s}\right) \right\}$$

wherein l is the order of the teeth, E is the amplitude voltage, $m_1$, $m_2$ ... $m_n$ are constants.

A voltage obtained through adding and subtracting these voltages, that is $S_1 + S_2 - S_3 - S_4$, is as follows.

$$S_1 + S_2 - S_3 - S_4 = E \times \left[ 2 \sum_{l=0}^{n_s-1} \left\{ m_1 \sin\left(\theta + \frac{Pr}{3} \frac{l}{n_s}\right) + m_5 \sin 5\left(\theta + \frac{Pr}{3} \frac{l}{n_s}\right) + \ldots \right\} + \right.$$

$$2 \sum_{l=0}^{n_s-1} \left\{ m_1 \sin\left(\theta + \frac{\pi}{2} + \frac{Pr}{3} \frac{l}{n_s}\right) + m_5 \sin 5\left(\theta + \frac{\pi}{2} + \frac{Pr}{3} \frac{l}{n_s}\right) + \ldots \right\} +$$

$$2 \sum_{l=0}^{n_s-1} \left\{ m_1 \sin\left(\theta + \pi + \frac{Pr}{3} \frac{l}{n_s}\right) + m_5 \sin 5\left(\theta + \pi + \frac{Pr}{3} \frac{l}{n_s}\right) + \ldots \right\} +$$

$$2 \sum_{l=0}^{n_s-1} \left\{ m_1 \sin\left(\theta + \frac{3\pi}{2} + \frac{Pr}{3} \frac{l}{n_s}\right) + m_5 \sin 5\left(\theta + \frac{3\pi}{2} + \frac{Pr}{3} \frac{l}{n_s}\right) + \ldots \right\}$$

$$= 2\sqrt{2} \, E \sum_{l=0}^{n_s-1} \left\{ m_1 \sin\left(\theta + \frac{\pi}{4} + \frac{Pr}{3} \frac{l}{n_s}\right) + m_5 \sin 5\left(\theta + \frac{Pr}{3} \frac{l}{n_s}\right) + \ldots \right\} \quad (6)$$

The $2n_1$ th and the $2n_2$ th ($n_1$ and $n_2$ being integers) harmonic components are suppressed from equation (6). Being less influential, the fifth higher harmonic and above may be neglected. The detection voltage is as follows. $S_1 + S_2 - S_3 - S_4 = A_o \sin(\theta + \gamma)$, wherein $A_o$ is a constant, and $\gamma$ is an initial phase corresponding to $$\sum_{l=0}^{n_s-1} \left( \frac{\pi}{4} + \frac{Pr}{3} \frac{l}{n_s} \right) \text{ of equation (6)}.$$

Figure 23:
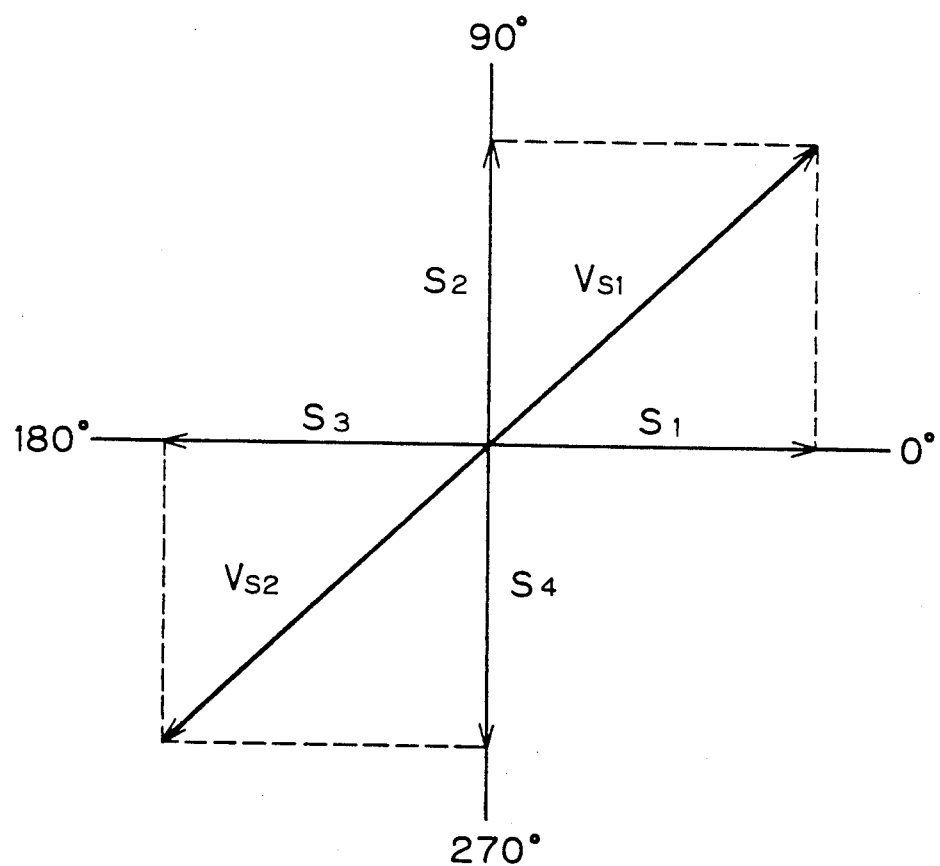
FIG. 23 is a vector diagram of the voltage applied to the coils of FIG. 20.

FIG. 23 is a vector diagram of the voltages $S_1$ to $S_4$, wherein the secondary harmonic component is suppressed by the difference between the composite vector of the voltages $S_1$ and $S_2$ and the composite vector of the voltages $S_3$ and $S_4$, and the tertiary harmonic component is suppressed with the teeth provided on the salient poles used as a vernier.

Thus, the voltage detected on stator $233_1$ is $$V_s = E_c (S_1 + S_2 - S_3 - S_4)$$
$$= V\cos\omega t \cdot A\sin(\theta + \phi)$$

The detection signals $V_{s1}$ and $V_{s2}$ of FIG. 22 correspond to $S_1 + S_2$ and $S_3 + S_4$, respectively.

Then, the voltage detected on stator $233_2$ is $$V_s = E_s (S_1 + S_2 - S_3 - S_4)$$
$$= V\sin\omega t \cdot A\cos(\theta + \phi)$$

The detection signals $V_{c1}$ and $V_{c2}$ of FIG. 22 correspond to $S_1 + S_2$ and $S_3 + S_4$, respectively.

Thus, the signal detected on the circuit of FIG. 22 is $$V_T = V_s - V_c$$
$$= V\cos\omega t \cdot A\sin(\theta + \phi) = V\sin\omega t \cdot A\cos(\theta + \phi)$$
$$= AV\sin(\theta + \phi - \omega t)$$

and the phase of the detection signal is modified according to the rotational angle $\theta$ of the rotor. Consequently, the rotational angle can be detected by reading the phase.

The case where a 4-phase coil is used has been described in the embodiment. However, the phase number of the coil is not necessarily limited thereto. For example, if a 3-phase coil is used, the phases of the teeth of adjacent salient poles are shifted by $Pr/3$ to suppress the tertiary harmonic component, and the teeth of the salient poles are shifted by $Pr/2ns$ to a pitch of the rotor for use as a vernier, thereby suppressing the secondary harmonic component.

The case where the signal $S_1 + S_2 - S_3 - S_4$ is detected by both the stators $233_1$ and $233_2$ to suppress the harmonic component has just been described. However, the harmonic component may be suppressed by other additions and subtractions. For example, the harmonic component may be suppressed by $S_1 + S_2 - S_3 - S_4$ on the stator $233_1$, and the higher harmonics may be suppressed by $S_2 + S_3 - S_4 - S_1$ on stator $233_2$. In this case, the stator $233_2$ has coils of phase B and phase C connected in series and the coils of phase A and phase D connected in series.

Also, the tooth pitch of the salient pole is not necessarily limited to $Pr = (Pr/3ns)$. It may be, for example, $Pr + (Pr/3ns)$. Furthermore, the teeth of the salient poles of stator $233_2$ may be of the same phase as the teeth of the salient poles of stator $233_1$.

Advantageously, in the magnetic resolver of FIGS. 20(A) and 20(B), a secondary higher harmonic and a tertiary higher harmonic generated on detection voltage of the coils are suppressed by means of polyphase coils and the teeth of the salient poles disposed as a vernier to the teeth of the stator; errors of detection signal are minimized; and linearity of angle detection is enhanced.

Figure 24:
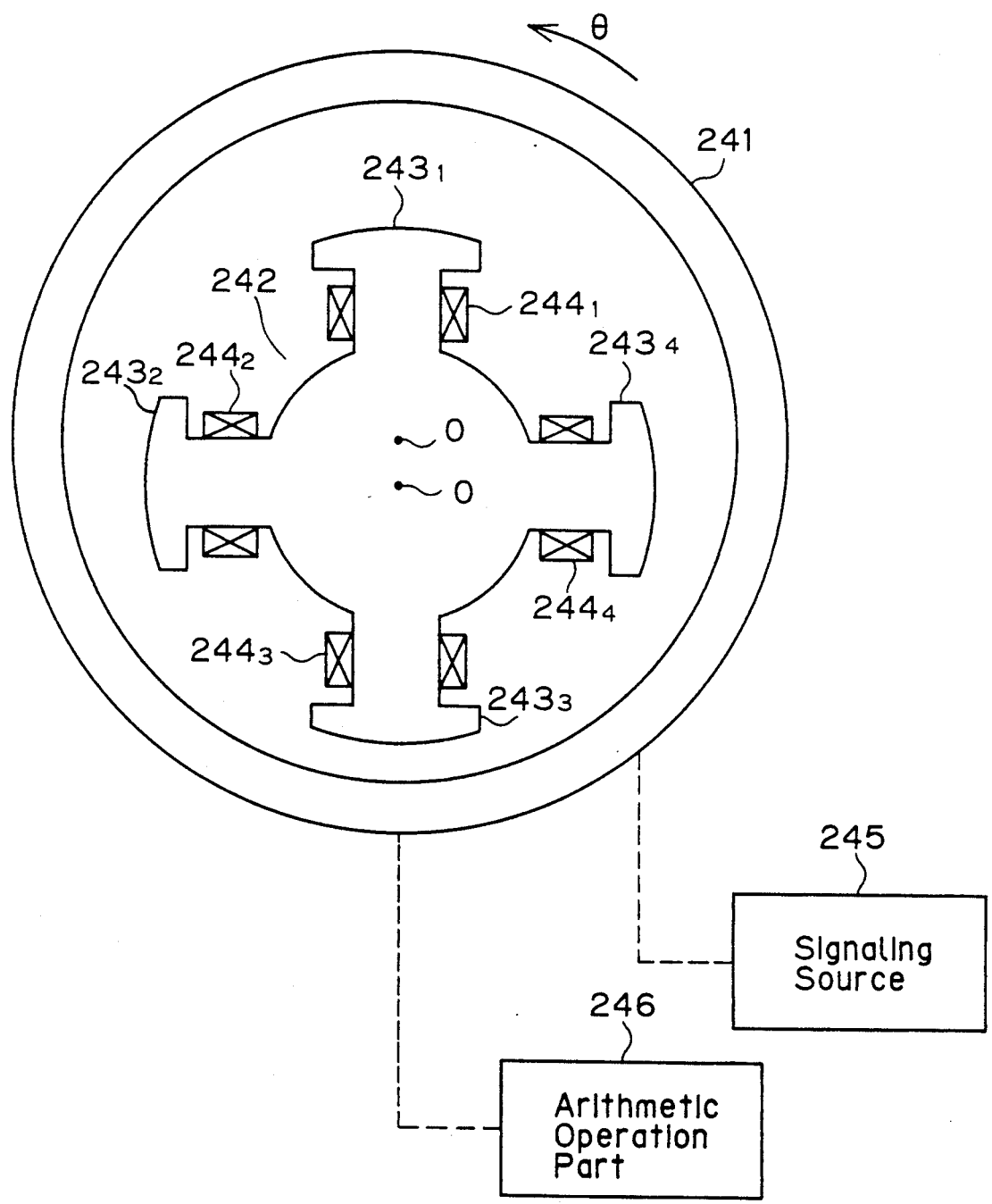
FIG. 24 depicts another magnetic resolver.

Another example of a magnetic resolver is depicted in FIG. 24, wherein a stator 242 is disposed within a cylindrical rotor 241, which rotor 241 rotates round a center O of the cylinder. A center $O_1$ of stator 242 is disposed shifted by $\delta$ from the center O of the rotor 241. Salient poles $243_1$ to $243_4$ are formed on stator 242 at every position at intervals of 90° angle. A tip of each salient pole faces on an inner peripheral surface of rotor 241. According to such disposition, a gap between the salient pole tip and the rotor inner peripheral surface changes after a rotational angle of the rotor.

In this magnetic resolver, teeth are not formed on the rotor and salient poles.

Coils $244_1$ to $244_4$ are wound on salient poles $243_1$ to $243_4$.

A signaling source 245 drives a pair of coils $244_1$ and $244_3$ positioned opposite to each other with an AC signal $A\sin\omega t$ (wherein A is the amplitude of voltage or current, $\omega$ is the angular frequency, and t is the time) and drives another pair of coils $244_2$ and $244_4$ with an AC signal $A\cos\omega t$.

Figure 25:
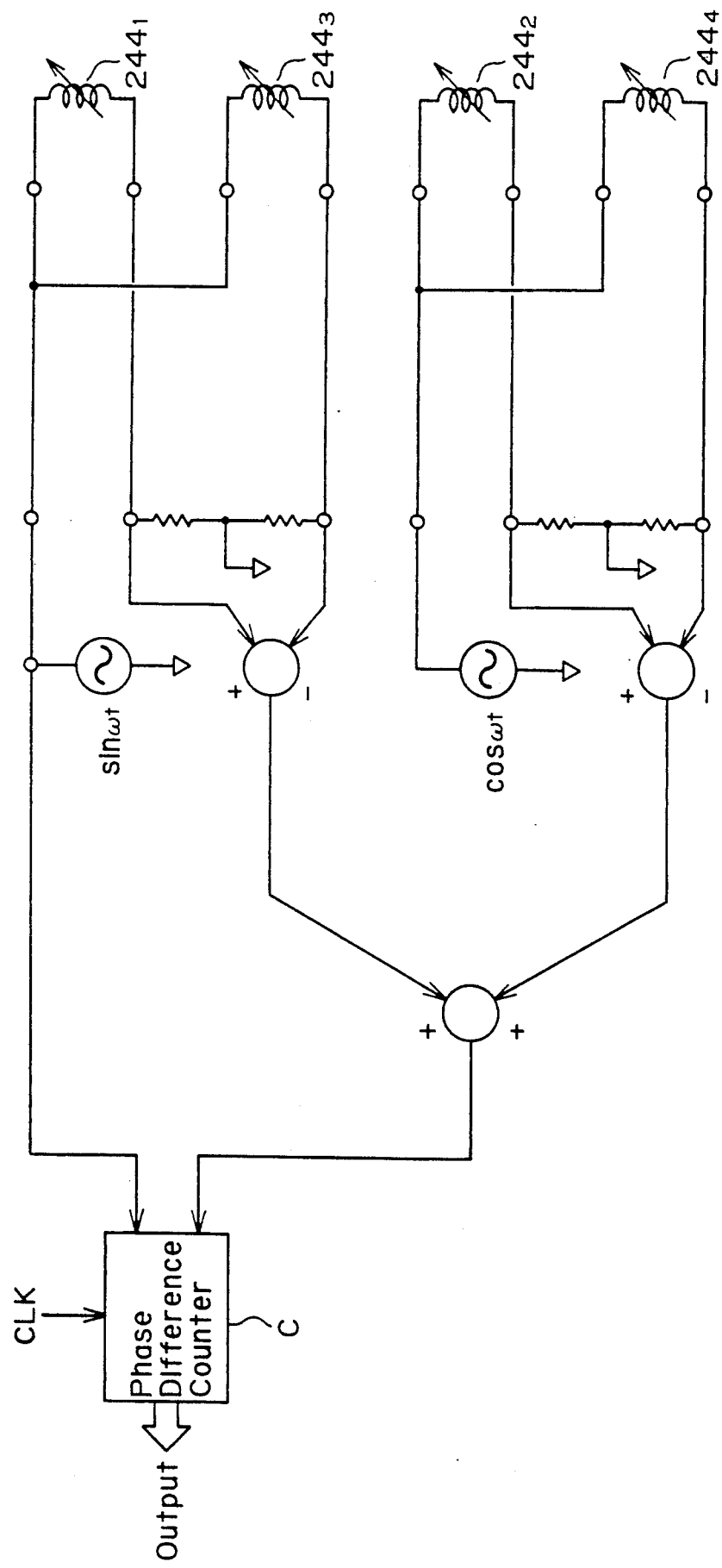
FIG. 25 depicts circuitry of the arithmetic operation part 246 of FIG. 24.

An arithmetic operation part 246 computes a rotational detection signal of the rotor according to the current flowing in each coil. An example of the circuit configuration of the arithmetic operation part 246 is shown in FIG. 25.

Operation of the magnetic resolver of FIG. 24 is as follows. Since the center of stator 242 is disposed eccentrically to the center of rotation of the rotor 241, inductances $L_1$ to $L_4$ of coils $244_1$ to $244_4$ are as follows.

$$L_1 = L_o(1 + m \sin \theta)$$

$$L_2 = L_o\{1 + m \sin (\theta + 90°)\}$$

$$L_3 = L_o(1 - m \sin \theta)$$

$$L_4 = L_o\{1 + m \sin (\theta - 90°)\}$$

wherein $L_o$, and m are constants, and $\theta$ is the rotational angle.

Since coils $244_1$ and $244_3$ are driven by signal $A\sin\omega t$ and coils $244_2$ and $244_4$ are driven by signal $A\cos\omega t$, currents $I_1$ to $I_4$ flowing to coils $244_1$ to $244_4$ are as follows.

$$I_1 = K(1 + m \sin \theta) \sin \omega t$$

$$I_2 = K(1 + m \cos \theta) \cos \omega t$$

$$I_3 = K(1 - m \sin \theta) \sin \omega t$$

$$I_4 = K(1 - m \cos \theta) \cos \omega t$$

wherein K is a constant.

From these currents, arithmetic operation part 246 carries out the following operation.

$$(I_1 - I_3) + (I_2 - I_4) \quad (7)$$
$$= 2mK \sin \theta \sin\omega t + 2mK \cos \theta \cos\omega t$$
$$= 2mK \sin (\omega t - \theta + 90°)$$

The signal given by Equation (7) has the phase modulated 360° whenever the rotor rotates one time. Thus, an absolute angle per rotation can be detected by measuring the phase difference with the driving signal using the phase difference counter C of FIG. 25. Also, the rotational speed can be detected by measuring the varying speed of the phase.

The case where 4 salient poles are provided has been just described. However, any number of salient poles may be used provided there are 4n number of salient poles (wherein n is an integer). For example, a plurality of stator members of the FIG. 24 embodiment may be disposed one upon another. A magnetic resolver constructed in such a manner has the following advantageous effects.

1. Since no special manner is required for winding the coil, the coil winding can be automated, and thus, cost can be reduced.

2. The rotational position and the rotational speed are detected from the phase difference between the signal computed by the arithmetic operation part and the driving signal from the signaling source. Thus, the S/N ratio is satisfactory for use in or with a digital interface.

3. The magnetic resolver of the invention is usable in combination with an increment type high resolution magnetic resolver having a plurality of origins of the rotational position so that an origin is detected through an origin reset operation specified by the inventive magnetic resolver, and any dislocation from the specified origin to the rotational position is precisely detected by the high resolution magnetic resolver. In this manner, a high precision absolute type position detecting unit is realized.

4. A stator core and a circuit part can be used in common with those of an nX type magnetic resolver (the phase of the detection signal changes at n periods per rotation of the rotor).

Figure 26:
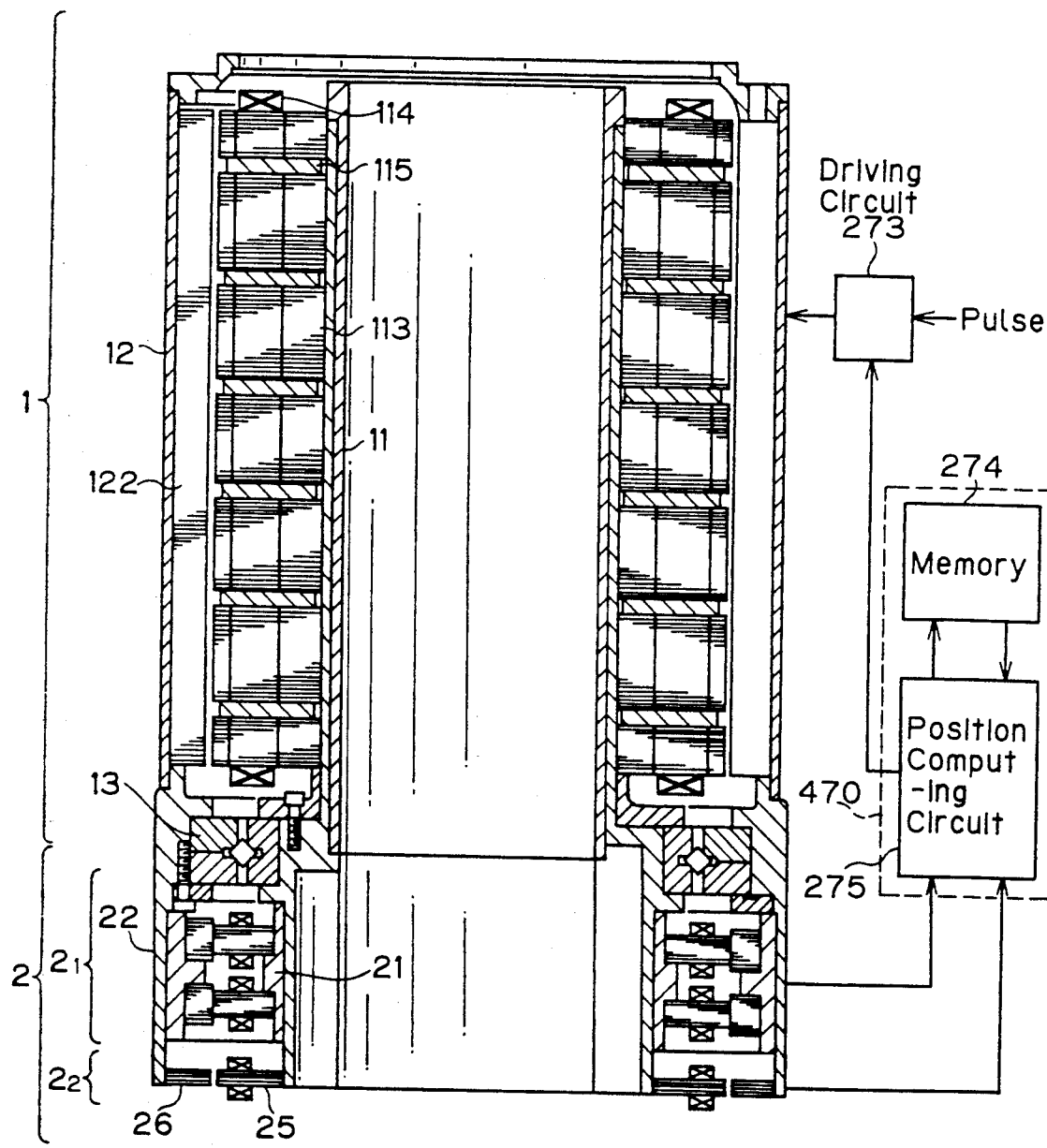
FIG. 26 depicts a further example of a motor.

A still further example of a magnetic resolver is depicted in FIG. 26, wherein motor 1 varies in the number of stator cores being stacked one on top of another. However, the basic construction is the same as the motor of FIG. 4. The magnetic resolver 2 comprises a high resolution magnetic resolver $2_1$ (e.g. multipolar resolver) and a magnetic resolver $2_2$ (e.g. unipolar resolver) with the detection resolution being smaller than the magnetic resolver $2_1$.

In this embodiment, the more the number of pulses which are generated by the magnetic resolver for each rotation of the motor, the higher the detection resolution.

The resolver 2 comprises stators 21 and 25 and rotors 22 and 26. Stators 21 and 25 are coupled to stator 11 of motor 1, and rotors 22 and 26 are coupled to rotor 12 of motor 1. Rotors 22 and 26 are supported on one side by bearing 13.

Magnetic resolver $2_1$ takes a plurality of rotational positions as each origin position. The magnetic resolver $2_2$ identifies the source detected by magnetic resolver $2_1$ for the position order.

A driving circuit 273 drives motor 1 according to an externally provided pulse.

A memory 274 stores data (as shown in FIG. 27) of the pulse number given to the motor for positioning the origin number, the phase difference from a reference position of the origin (referred to herein as the "absolute position data"), and the rotational position to the origin, for the plurality of origins mentioned above. One of the plurality of origins is selected as the reference position.

A position computing circuit 275 obtains a pulse number from the data stored in memory 274 according to the absolute position data detected by magnetic resolver 2, when an origin is detected. With the pulse number as a reference, an absolute rotational position is obtained according to the increase or decrease of number of pulses.

Driving circuit 273 is provided on magnetic resolver ID card 402 of FIG. 2. Memory 274 and position detection circuit 275 are provided on position control part 470.

Operation of the FIG. 26 embodiment is as follows. Assuming that the number of the origin is 10 and the number of pulses given for rotation of motor 1, one time, is 10,000, the origins are provided at every 36°, and the motor rotates by the interval of origins on the 10,000 pulses given therefor.

After applying a power source, the origin is reset, and motor 1 detects the origin and stops when rotated 36° at a maximum. In this case, magnetic resolver $2_2$ detects an absolute position data of the detected origin. If the absolute position data indicates 180°, then position computing circuit 275 detects that the detected origin comes sixth, that is, the motor 1 has stopped at the position where 5,000 pulses are given according to the data shown in FIG. 27.

Accordingly, the absolute rotational position of the motor 1 is detected thereafter according to the increase or decrease of the number of pulses, with the position where 5,000 pulses are given used as a reference.

Driving circuit 273 determines the rotational position of motor 1 from the detected absolute rotational position through feedback control.

According to the embodiment of FIG. 26, high resolution and low resolution position detection means are provided with the rotational position of the motor being detected by the high resolution position detection means, and with discrimination of the origin number being detected by the low resolution position detection means. Advantageously, the origin can be provided plurally. Also, since the rotational angle of the motor comes in intervals of the origin at a maximum, the time required for the origin reset operation can be reduced.

Figure 28A:
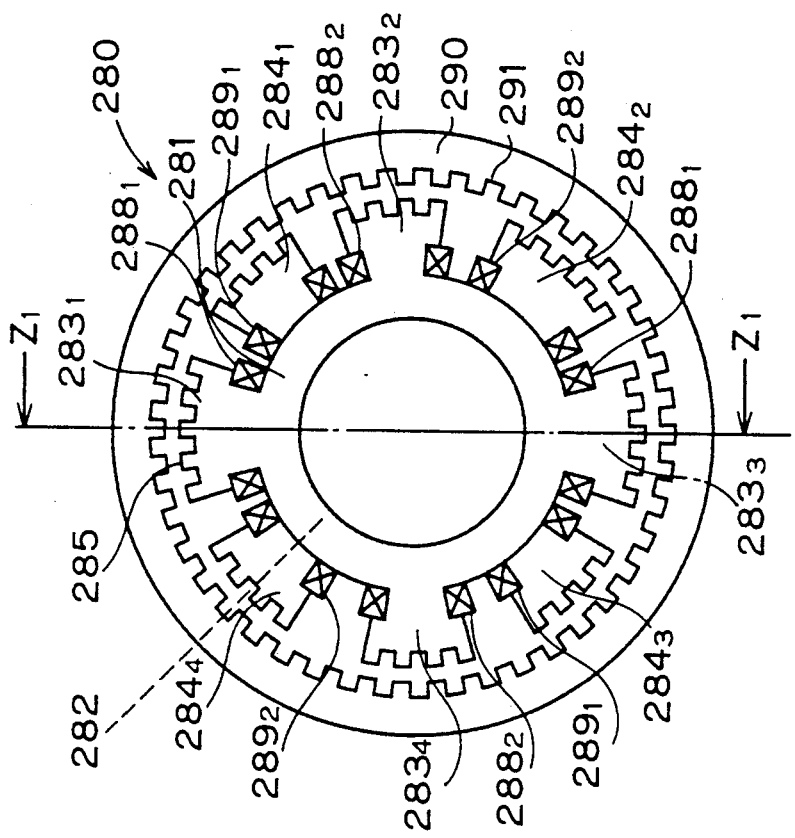
FIGS. 28(A) and 28(B) depict a still further example of a resolver with FIG. 28(A) being a front view and FIG. 28(B) being a section view take along line $Z_1-Z_1$.
Figure 28B:
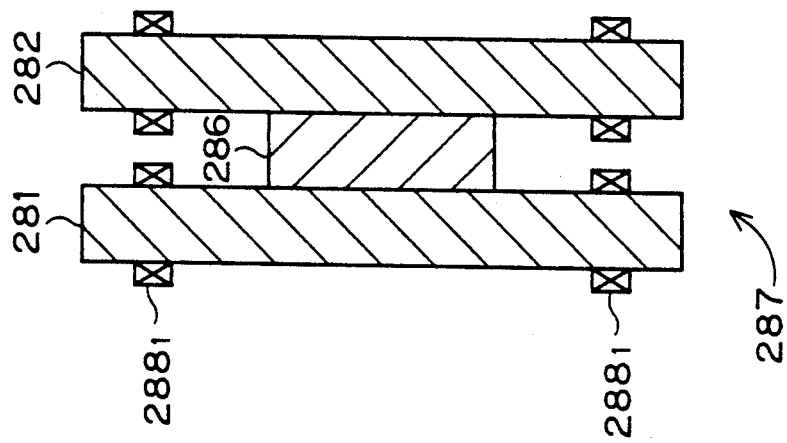

A still further example of a magnetic resolver is shown in FIGS. 28(A) and 28(B), wherein two disk stator members 281, 282, which are of magnetic material, are depicted. Salient poles $283_1$ to $283_4$ and $284_1$ to $284_4$ are formed on stator members 281, 282 at each position separated by 90° rotational angle. Teeth 285 are formed on the tips of the salient poles at a constant pitch Pb.

The phases of the teeth of adjacent salient poles in the same member are shifted by $(\frac{1}{2})$Pb.

Stator members 281 and 282 have a nonmagnetic member 286 sandwiched therebetween to form the stator 287. The phases of the teeth of adjacent salient poles are shifted by $(\frac{1}{4})$Pb. For example, the phases of the teeth of salient poles $283_1$ and $284_1$ are shifted by $(\frac{1}{4})$Pb.

A coil $288_1$ is wound on salient poles $283_1$ and $283_2$, and a coil $288_2$ is wound on salient poles $283_2$ and $283_4$. Coils $288_1$ and $288_2$ constitute a single phase coil. Coils $289_1$ and $289_2$ are likewise also wound on stator member 282.

A rotor 290 is disposed on the outside of stator members 281,282. Teeth 291 found on rotor 290 face teeth 285 found on stator 287 and have the same pitch.

Figure 29:
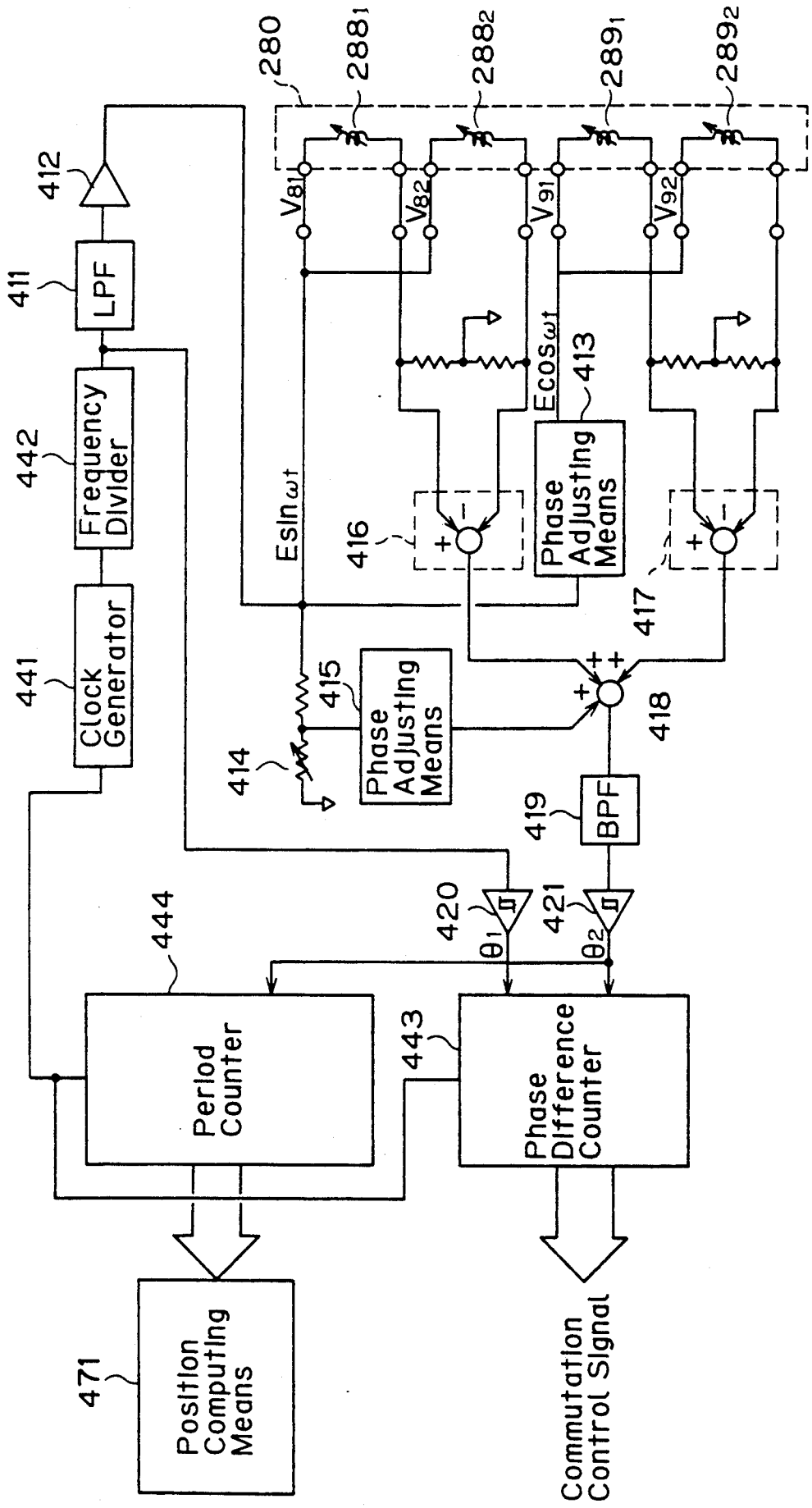
FIG. 29 is a sensor interface part connectable to a magnetic resolver.

An example of a sensor interface part, to which the inventive magnetic resolver is connected, is shown in FIG. 29, wherein the magnetic resolver portion 280 of FIG. 28, is shown in abbreviated form. The sensor comprises a clock generator 441 which operates as a driving signal source for the coils of the magnetic resolver 280; a frequency divider 442 for dividing a generated clock of clock generator 441; a low pass filter 411 (herein referred to as "LPF") for extracting low frequency components from the divided clock; and a comparator 412 for shaping the extracted signal. The shaped signal develops into an AC voltage Esinωt (wherein E is the voltaged amplitude, and ω is the angular velocity, and t is the time) and drives coils $288_1$ and $288_2$.

A phase adjusting means 413 shifts the phase of the AC voltage Esinωt by 90° to an AC voltage Ecosωt, and corrects electrically any mechanical errors of mounting positions of the stator members 281 and 282 (sin core and cos core). Coils $289_1$ and $289_2$ are excited by the AC voltage Ecosωt.

An amplitude adjusting means 414 and a phase adjusting means 415 are provided for adjusting the amplitude and the phase of the AC voltage Esinωt. A carrier component of the AC voltage Esinωt is cancelled through such adjustments.

A subtractor 416 takes the difference between the currents flowing to the coils $288_1$ and $288_2$ and generates a voltage proportional to such difference. A subtractor 417 takes the difference between the currents flowing to the coils $289_1$ and $289_2$ and generates a voltage which is proportional to the difference.

An adder 418 adds the subtracted values taken from subtractors 416 and 417, adds a signal having passed through the phase adjusting means 415 to the added signal to obtain correction. The added signal thus corrected is a signal Ksin (ωt+θ), wherein K is a constant, having the phase modulated by rotational angle θ of the rotor of the magnetic resolver.

A band pass filter 419 (herein referred to as "BPF") is provided for extracting a specified frequency component from the correction signal of adder 418. Comparators 420 and 421 are provided for shaping the outputs of frequency divider 442 and BPF 419. A phase difference counter 443 counts the phase difference of the signal shaped by comparators 420 and 421 on a clock from clock generator 441. A period counter 444 measures the period of the shaping signal from comparator 421 on a clock from clock generator 441. A position computing means 471 computes the rotational position of the rotor 290 during one rotation according to the period measured by the period counter 444.

In the foregoing embodiment, advantageously, components 411 to 420 are provided on resolver ID card 402 of FIG. 2, and components 441 to 444 are provided on counter circuit 404 and component 471 is provided on position control part 470.

Operation of the just described magnetic resolver is as follows. Since an error of relative electrical angle is included between the AC signals Esinωt and Ecosωt, coils $288_1$, $288_2$, and coils $289_1$, $289_2$ are driven by AC voltages Esin (ωt+$\Delta_A$) and Ecosωt, wherein $\Delta_A$ is an error of electrical angle.

When rotor 290 rotates by an angle θ, currents $I_{81}$, $I_{82}$, $I_{91}$, $I_{92}$ flowing to coils $288_1$, $288_2$, $289_1$, $289_2$ are as follows.

$$I_{81} = I_0\{1 + m \cos(\theta + \delta_A)\} \times \sin(\omega t + \Delta_A) \quad (8)$$

$$I_{82} = I_0\{1 - m \cos(\theta + \delta_A)\} \times \sin(\omega t + \Delta_A) \quad (9)$$

$$I_{91} = I_0(1 + m \sin \theta) \cos \omega t \quad (10)$$

$$I_{92} = I_0(1 - m \sin \theta) \cos \omega t \quad (11)$$

wherein m is a constant, and $\delta_A$ indicates a relative mechanical error of the mounting position of sin core and cos core.

The following computed value $V_1$ is obtained from carrying out an arithmetic operation of equations (8)−Equation (9)+Equation (10) −Equations (11) on subtractors 416, and 417 and adder 418.

$$V_1 = m\{\sin(\omega t + \theta + \delta_A + \Delta_A) + \sin(\omega t + \theta)\} + \quad (12)$$

$$2 \sin\left(\frac{\delta_A - \Delta_A}{2}\right)\cos\left(\omega t - \theta + \frac{\Delta_A - \delta_A}{2}\right) + \theta \sin\omega t$$

wherein e sin ωt is a carrier component included in the AC voltage Esinωt.

From adjusting the electrical angle of Equation (12) to $\Delta_A = \delta_A$, phase adjusting means 413 annuls the second term of the right side of equation 1(12).

Furthermore, a signal −esinωt, having the amplitude and phase of the AC voltage Esinωt adjusted therefor, is added to the above signal, thereby negating the residual carrier component.

The phase difference counter 443 measures the phase difference between signal $\theta_o$ having negated the carrier component and the excitation signal $\theta_1$ on a generated clock from clock generator 441. Since a 360° electrical angle of the excitation signal $\theta_1$ corresponds to one tooth pitch of rotor 290, the phase difference measured on the phase difference counter 443 corresponds to the rotational position within the one tooth pitch of rotor 290. A value of ROM, in which a sin value is loaded, is read with the measured phase difference as an address pointer, and the motor rotations, of which are detected by the magnetic resolver, is controlled for commutation on the read data.

A period counter 444 measures the period of the signal $\theta_o$ on a generated clock from clock generator 441.

Position computing means 471 computes the difference in period between the signal $\theta_o$ with the phase modulated and the excitation signal $\theta_1$, at every constant period according to a measured period of the period counter 444.

For the rotational angle $\theta$ of rotor 290 to be vt (wherein v is a constant), the modulated signal is transformed to $E\sin(\omega+v)t$. Thus, the period of the modulated signal varies according to the rotational angle $\theta$. Accordingly, the rotational position of rotor 290 during one rotation is obtainable from integrating the difference in period between the modulated signal $E\sin(\omega+v)t$ and the excitation signal $E\sin\omega t$.

For example, in case the number of clocks required for counting one period of the excitation signal $\theta_1$ is 4,096, and the number of rotor teeth of the magnetic resolver is 124, the position computing means 471 computes the frotational position as follows.

$$P = \sum_i (\text{DATA}i - 4{,}096)$$

wherein P is the rotational position; DATAi is the ith measured period. In this case, when the rotor rotates once, $124 \times 4{,}096 = 407{,}904$, clocks are detected.

Since the signal detection system is of phase modulation, a digital interface can be easily constructed, and position detection and commutation control of the motor are readily realized.

2-2 The Sensor is an Optical Resolver

Figure 30:
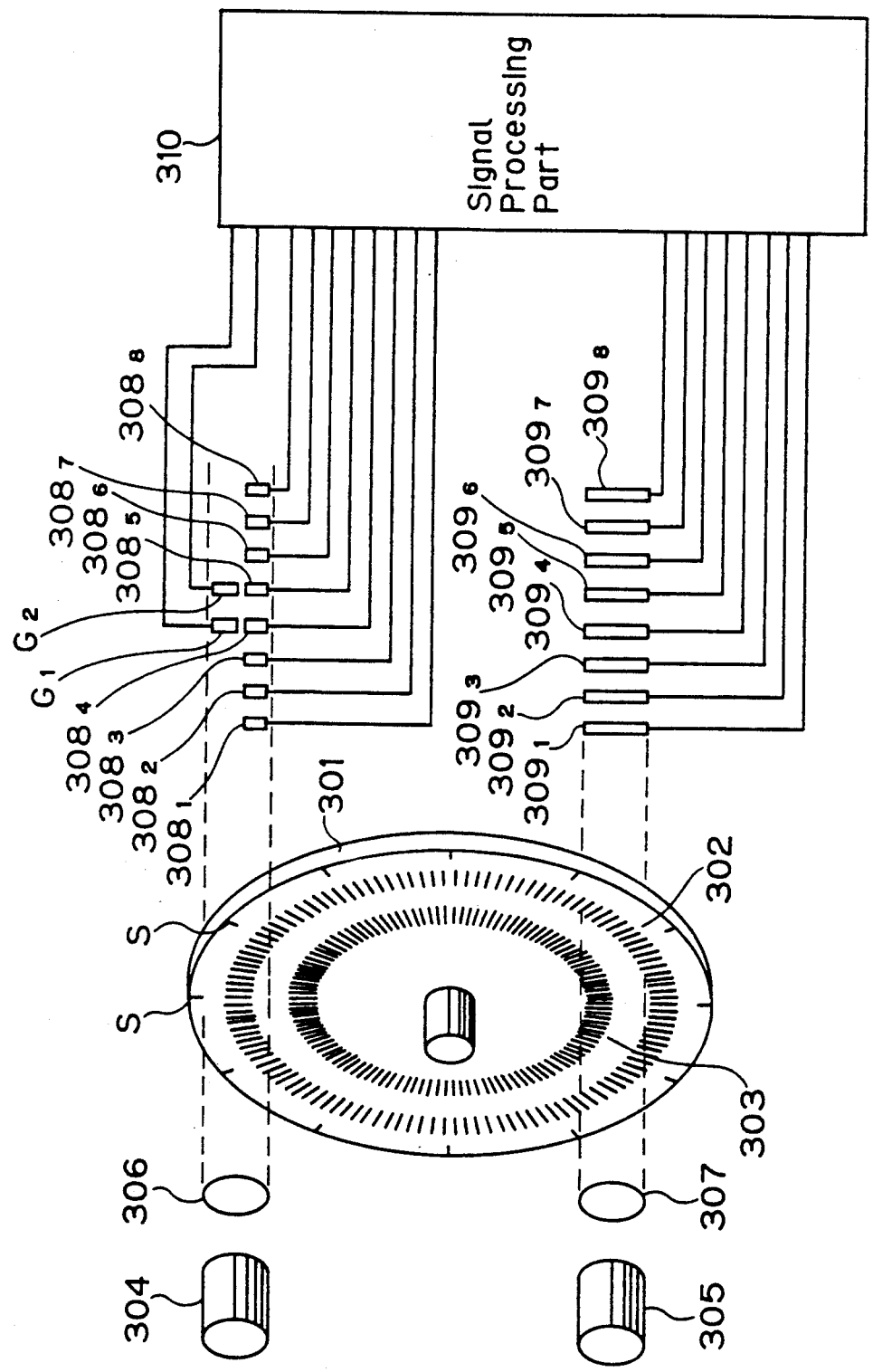
FIG. 30 depicts an optical resolver used as a sensor.

An example of an optical resolver used as the sensor is shown in FIG. 30, wherein a disk code plate 301 is provided having a light transmissive slit row in two stages with light transmissive slits arrayed at a predetermined pitch in the circumferential direction. An $m_1$ plurality of light transmissive slits 302 ($m_1$ being an integer) are provided on the outside slit row, and an $m_2$ plurality of light transmissive slits 303 ($m_2$ being an integer) are provided on the inside light transmissive slit row.

The difference in number of slits 303 and 302 is the same number as the rotor teeth of motor 1.

An origin detecting slit S is provided on the outside of slits 302 for detecting the rotational position of code plate 301. Code plate 301 is rotated concurrently with or by an output shaft of the motor.

Light sources 304,305 and lenses 306,307 are provided for producing parallel light beams. The light from source 304 passes through lens 306 and is incident on outside slits 302 and slit S. Light from source 305 passes through lens 307 and is incident on inside slits 303. An image sensor 308, comprising photodiodes $308_1$–$308_8$, receives the light (herein referred to as "slit image") passing through light transmissive slits 302. Photo diodes $G_1$ and $G_2$ are provided for detecting light passing through slit S.

Figure 31:
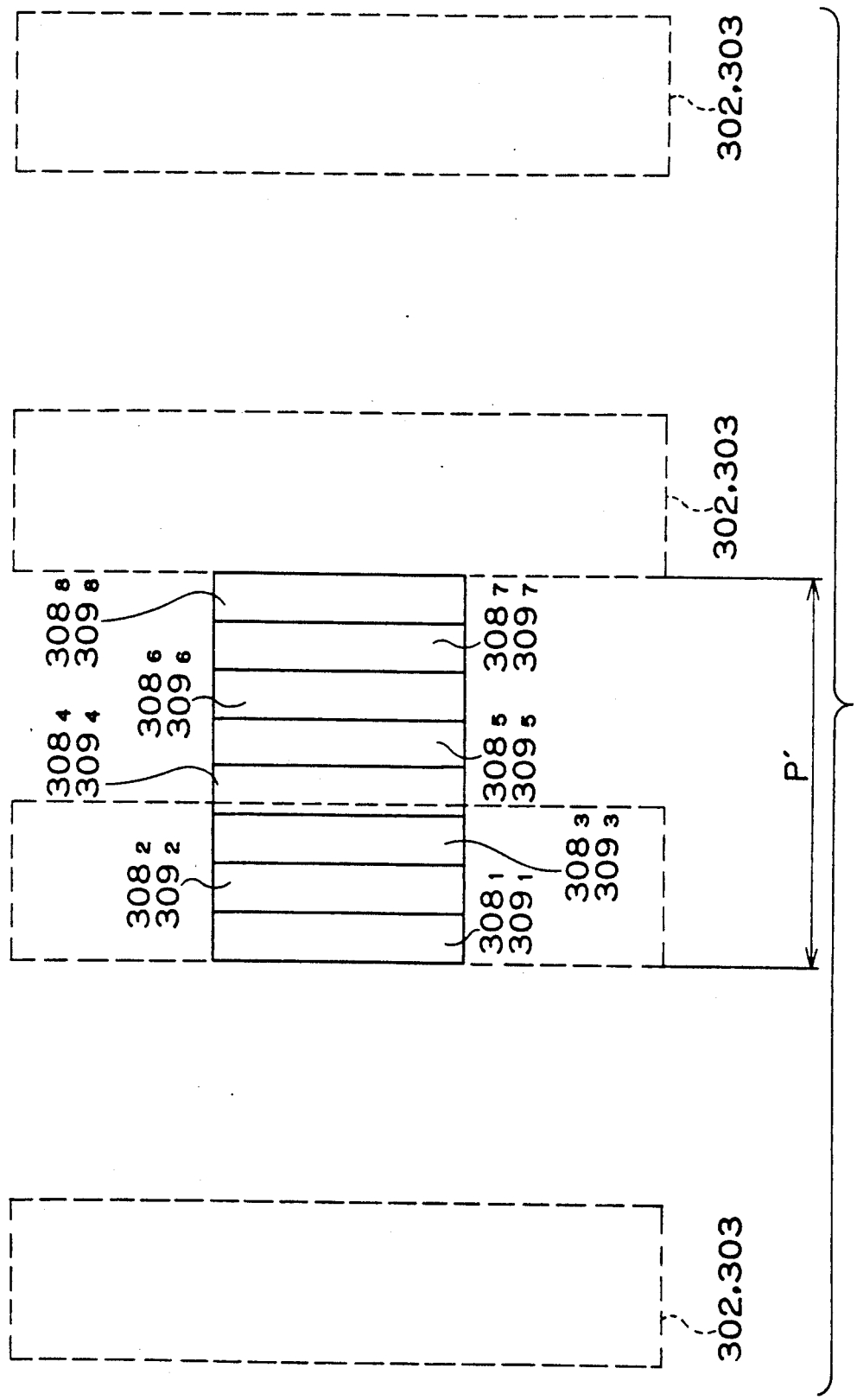
FIG. 31 depicts the slits of FIG. 30.

As shown in FIG. 31, photodiodes $308_1$–$308_8$ and $309_1$–$309_8$ are arrayed within one pitch P' of the light transmissive slits 302,303.

A signal processing circuit 310 is provided for computing the relative position of the rotor and stator teeth of the motor according to the detection signals from photodiodes $308_1$ to $308_8$ and $309_1$ to $309_8$, and for processing the origin detecting signals from photodiodes $G_1$ and $G_2$.

Figure 32:
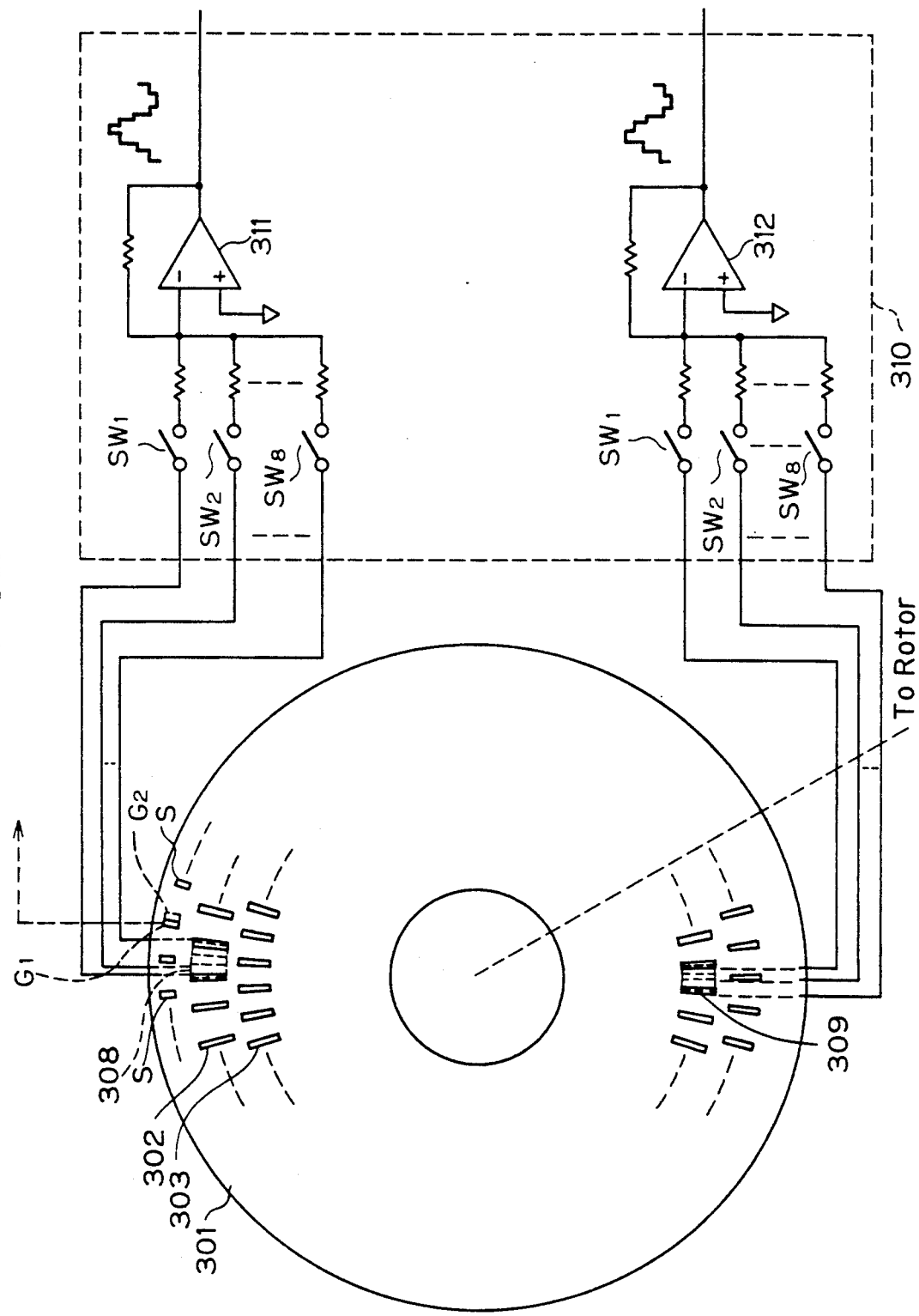
FIG. 32 depicts a control unit.

One example of a control unit is shown in FIG. 32, wherein switches $SW_1$–$SW_8$ extract signals from photodiodes $308_1$ to $308_8$ and $309_1$ to $309_8$, successively at a predetermined timing.

Operational amplifiers 311,312 amplify signals passed through switches $SW_1$ to $SW_8$. The output signals from operational amplifiers 311,312 are stepwise waveforms. The height of the waveform corresponds to the number of photodiodes having detected light impinging thereon.

Figure 33:
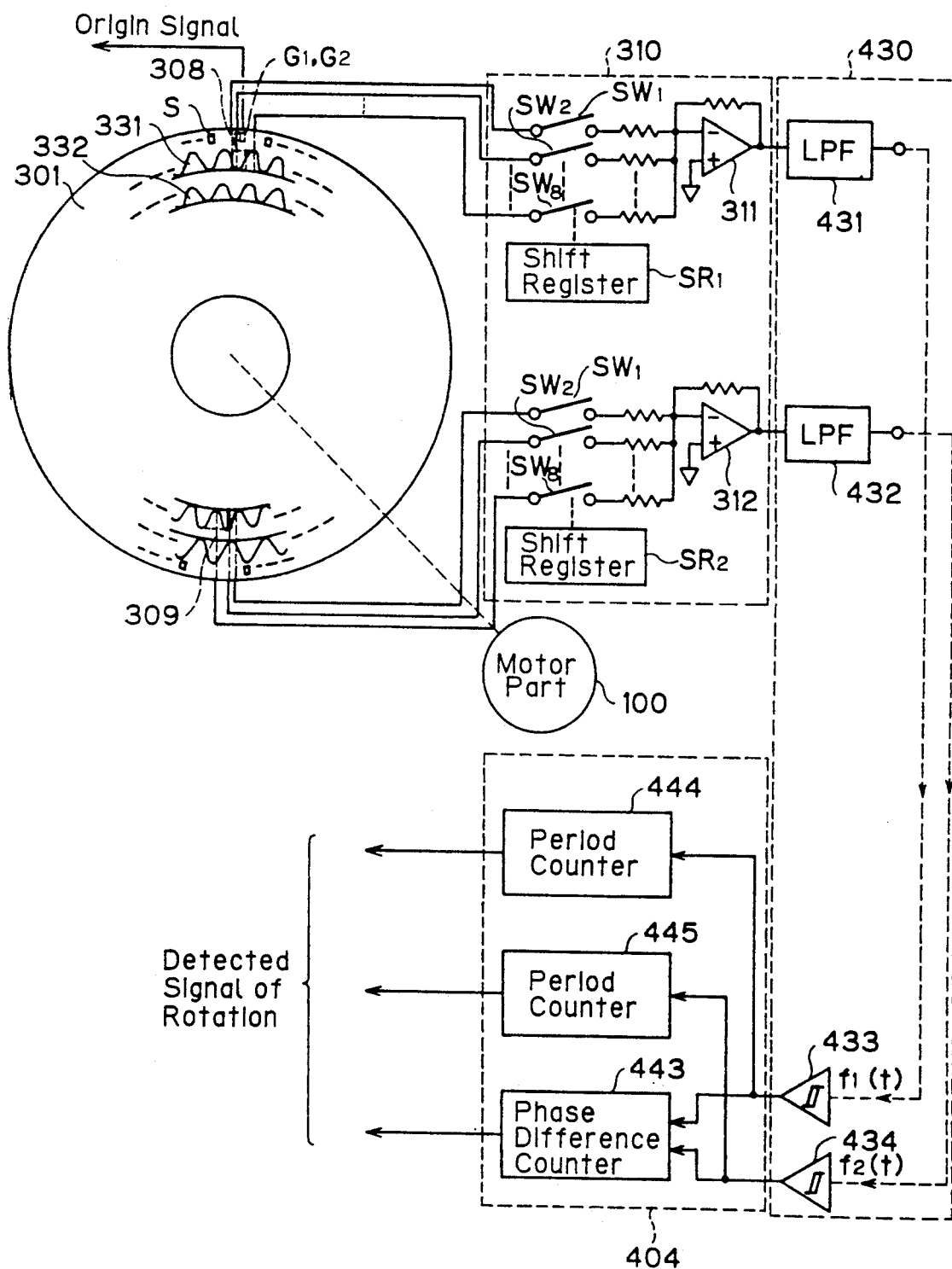
FIG. 33 depicts a rotational detection part of the control unit of FIG. 32.

An example of a rotation detecting part used in the invention is shown in FIG. 33, wherein the rotation detection part uses an encoder 301 provided with two rows of sine waveform position detecting light transmissive slits. An $m_1$ plurality of light transmissive slits 331 are provided on the outside slit row, and an $m_2$ plurality of light transmissive slits 332 are provided on the inside light transmissive slit row. $m_1$ and $m_2$ are integers.

In the encoder 301, the difference in number between the inside light transmissive slits and the outside light transmissive slits, is set to be the same in number as the number of rotor teeth of motor 1.

Shift registers $SR_1$ and $SR_2$ are provided for extracting outputs from the photodiodes $308_1$ to $308_8$ and $309_1$ to at a predetermined timing, by operating successively switches $SW_1$ to $SW_8$.

An optical resolver ID card 430 is provided and is shown also in FIG. 2. Card 430 comprises LPFs 431 and 432 for extracting a low frequency component from the output signals from operational amplifiers 311, 312 and comparators 433, 434 for shaping the output signals from LPFs 431 and 432.

A counter circuit 404, similar to that shown in FIG. 2, is provided comprising period counters 444 and 445 for counting the period of output waveforms of comparators 433, 434 and a phase difference counter 443 for counting the phase difference of the output waveforms of comparators 433 and 434.

Operation of the FIG. 33 circuit is as follows. A scan frequency of switches SW1 to SW8 is set to 8fs, wherein fs is the frequency of the output waveforms of LPFs 431 and 432. Light which is transmitted through light transmissive slits 331 is detected by photodiode array 308. Light which is transmitted through light transmissive slits 332 is detected by photodiode array 309. The detection signals produced by photodiode arrays 308 and 309 are scanned at a 8fs frequency rate and the signals $f_1(t)$, $f_2(t)$, which are passed through the LPFs 431, 432 are as follows.

$$f_1(t) = A_1 \sin(\omega t + M_1\theta) \tag{13}$$

$$f_2(t) = A_2 \sin(\omega t + M_2\theta) \tag{14}$$

wherein $A_1$ and $A_2$ are constants; $\theta$ is the rotational angle of the code plate, and $\omega = 2\pi fs$.

The phase difference $\phi$ between signals $f_1(t)$ and $f_2(t)$ is $$\phi = (M_1 - M_2)\theta \tag{15}$$

For example, where the number of outside slits $M_1$ (also designated interchangeably with $m_1$ in other embodiments) is 8 and the number of inside slits $M_2$ (also designated interchangeably with $m_2$ in other embodiments) is 6, the number of teeth M of the motor is set to be 2 from 8−6 calculation.

Figure 34:
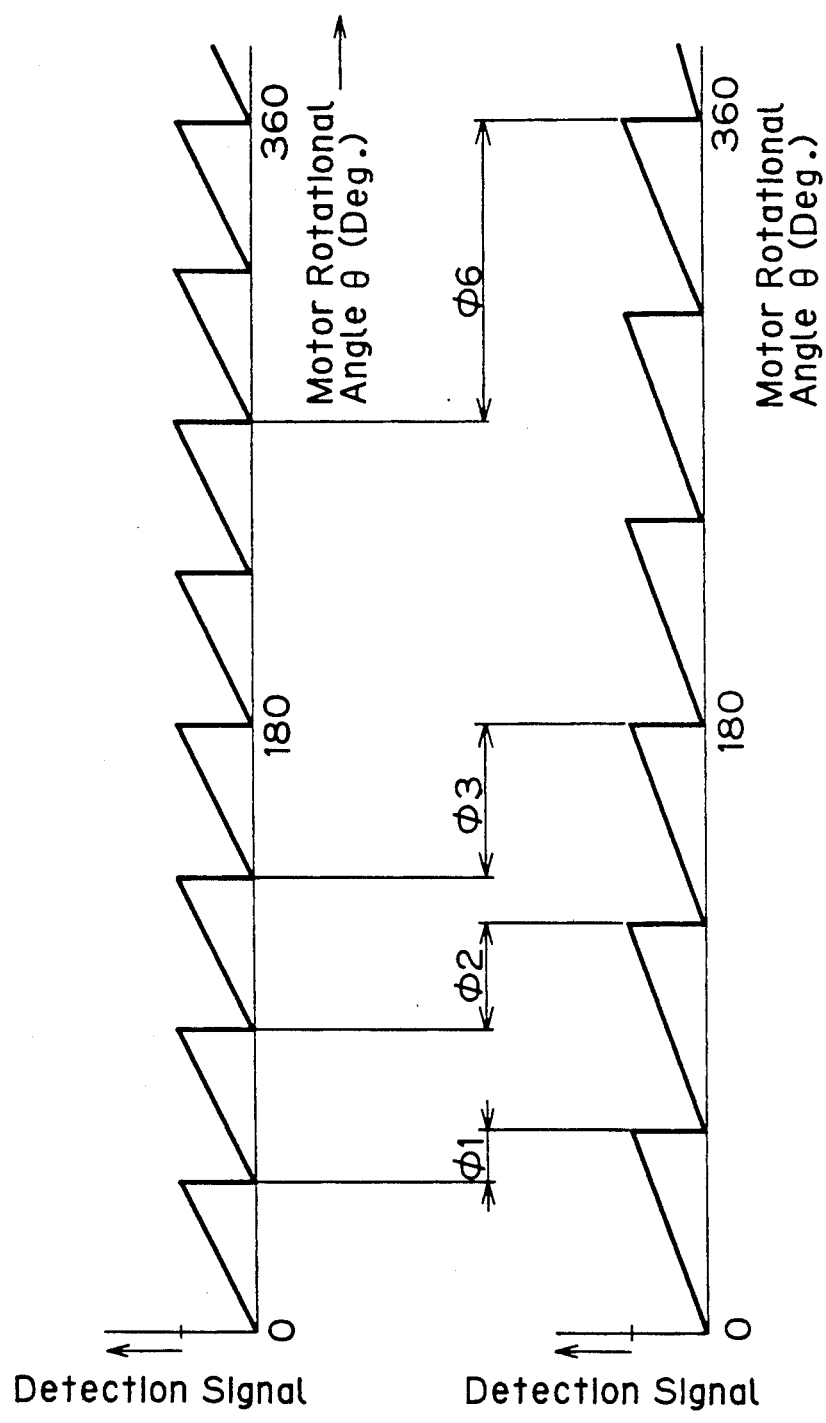
FIGS. 34(A) and 34(B) depict the relationship between detection signals and rotational angles.

The relation between the detection signals produced by photodiode array 308 and 309 and the rotational angle of the motor is depicted in FIG. 34(A) and 34(B), wherein the shift in electrical angles of the detection signals increases as $\phi_1$, $\phi_2$... in proportion to the actual rotational angle $\theta$ (i.e. mechanical angle) of the code plate 301.

The shift $\phi$ of both detection signals when the code plate turns by $\theta$ is as follows from Equation (15) with appropriate numbers being inserted, namely, $\phi = (8-6)\theta$.

On the other hand, when code plate 301 turns by a mechanical angle $\theta$, a rotor of the motor also rotates by a mechanical angle $\theta$. The number of teeth of the motor being two, the teeth of the rotor and stator of the motor is shifted by an electrical angle $2\theta$. That is, the phase difference $\phi$ detected on the phase difference counter 443 would coincide with the shift of electrical angle of the teeth of the rotor and stator of the motor. Thus, the phase shift of the teeth of the rotor and stator of the motor is detected directly, and the motor of the motor is detected directly, and the motor is accordingly subjected to commutation control.

Figures 35, 38:
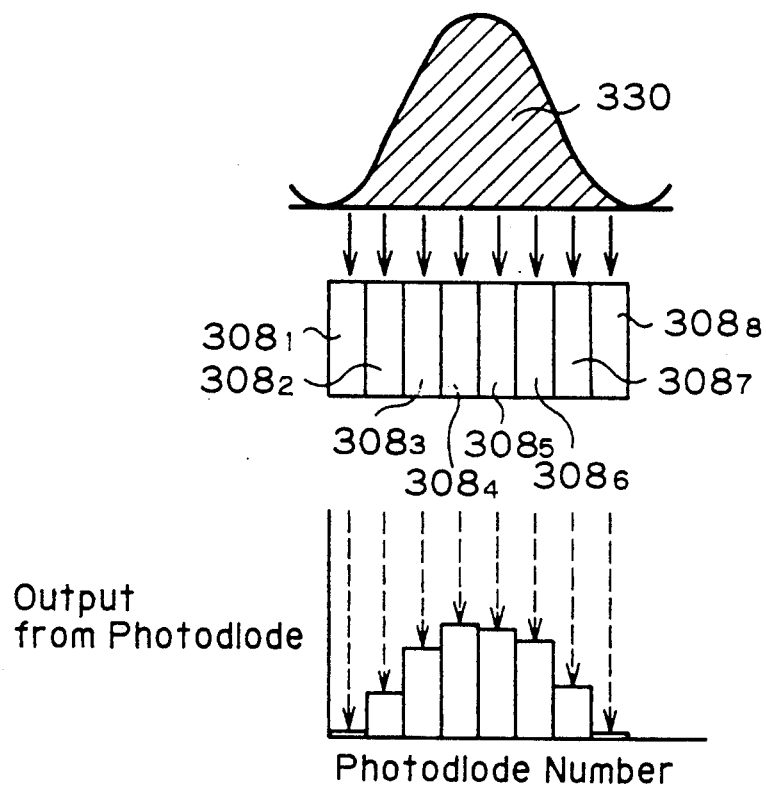
FIG. 35 depicts the output of the photodiodes.
FIG. 38 depicts a gain table.

In such a resolver, the slits have a sine waveform. Thus, light incident on the photodiode array is also shaped to be of a sine waveform. Since the photodiode generates an analog detection signal which changes continuously according to the area thereon where the light is incident. As depicted in FIG. 35, the detection signal from the resolver changes stepwise nearly as a sine wave representing a dominant wave along the array of the photodiodes $308_1$ to $308_8$. The detection signal from the displacement converter becomes a high precision signal free from any harmonic component.

Using such embodiment, including such resolver, to control the motor rotational speed results in the motor being rotated smoothly.

Each of the magnetic resolver or the optical resolver can be selectively connected to a motor drive system.

3. Sensor I/F Part

The description of the sensor, given with reference to FIGS. 29 and 33, has also referred to the sensor I/F part which will now be further described with reference to FIGS. 2(A), 2(B) and 2(C).

In sensor I/F part 401 of FIG. 2(C), magnetic resolver ID card 402 extracts a detection signal SIG0 from the phase modulated magnetic resolver and a reference signal SIG1 having the phase not yet modulated.

Optical resolver ID card 403 extracts light detection signals from the photodiode arrays disposed opposite to the outside slits and the inside slits of the code plate as signals SIG0 and SIG1, respectively.

In counter circuit 404, phase difference counter 443 counts the phase difference between signals SIG0 and SIG1. Period counters 444 and 445 coun the periods of signals SIG1 and SIG0.

A clock generated by clock generator 441 is divided by frequency divider 442 and is used as an excitation signal from the coils of the magnetic resolver and as a reference signal.

A phase shift of the teeth of the rotor and stator of the motor is detected by counting operation of the phase difference counter 443, and commutation control is carried out according to the phase shift detected as above. Then, by integrating the phase shift, the rotational position of the motor is computed, and the motor is accordingly controlled for rotational position. Furthermore, the motor rotational speed is detected from the frequency of the detection signal of the phase modulated sensor, and the motor rotational speed is controlled accordingly.

As described signals for position control, speed control and commutation control are detected concurrently in the sensor I/F part 401. Furthermore, signals used for these three controls may be detected for two kinds of sensors, such as a magnetic resolver and an optical resolver.

Figure 36:
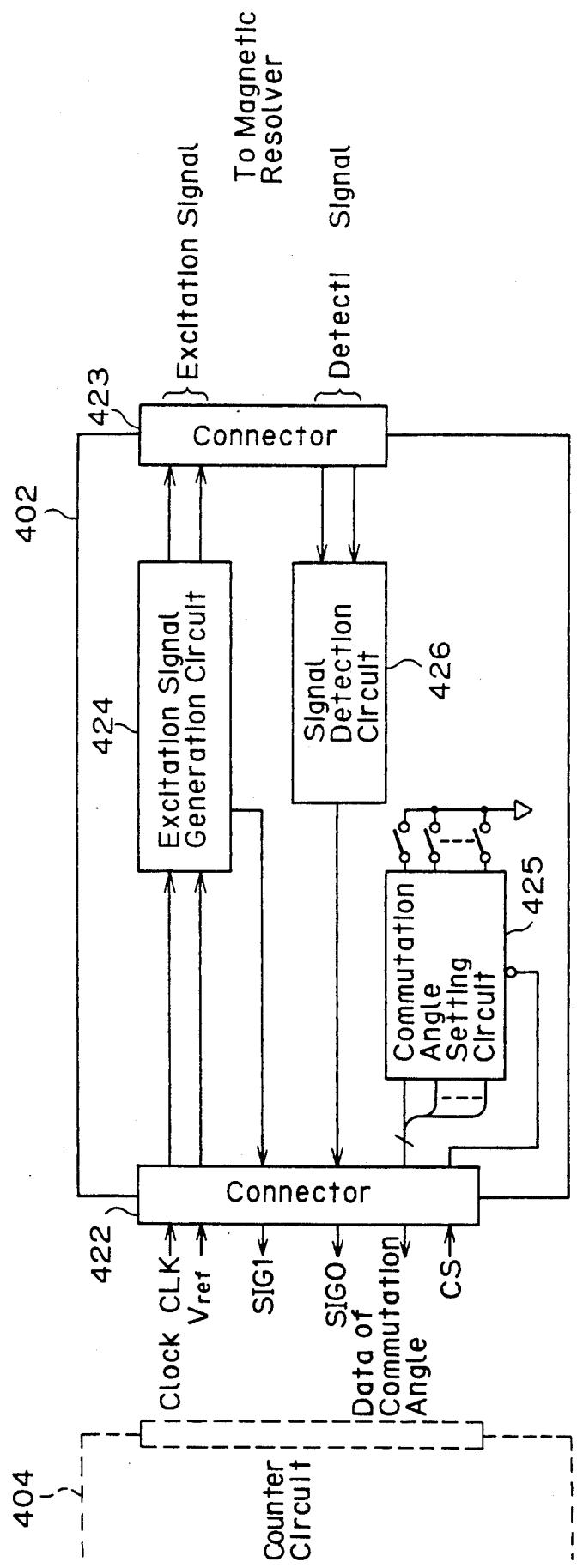
FIG. 36 depicts a magnetic resolver ID card.

Another example of a magnetic resolver ID card 402 is shown in FIG. 36, wherein ID card 402 comprises one substrate. Connectors 422 and 423 are provided for connecting ID card 402 to counter circuit 404 and to the magnetic resolver, respectively. An excitation signal generation circuit 424 is provided for dividing a clock provided from clock generator 441, shaping it to a sine wave signal through a band pass filter, and providing an excitation signal produced on the sine wave signal to the magnetic resolver by way of connector 423. The excitation signal is also provided to counter circuit 404 as a reference signal SIG1. A reference voltage $V_{ref}$ is used for determining the amplitude of the excitation signal.

The ID card 402 comprises a commutation angle setting circuit 425, comprising a dip switch and a buffer, for providing data, of the commutation angle set by the dip switch, to counter circuit 404. An I/F circuit in the commutation angle setting circuit is selected by a chip select signal CS.

A signal detection circuit 426 shapes a detection signal, provided through the connector 423 from the magnetic resolver, into a sine wave signal, and provides the shaped signal to counter circuit 404 as a detection signal SIG0.

Figure 37:
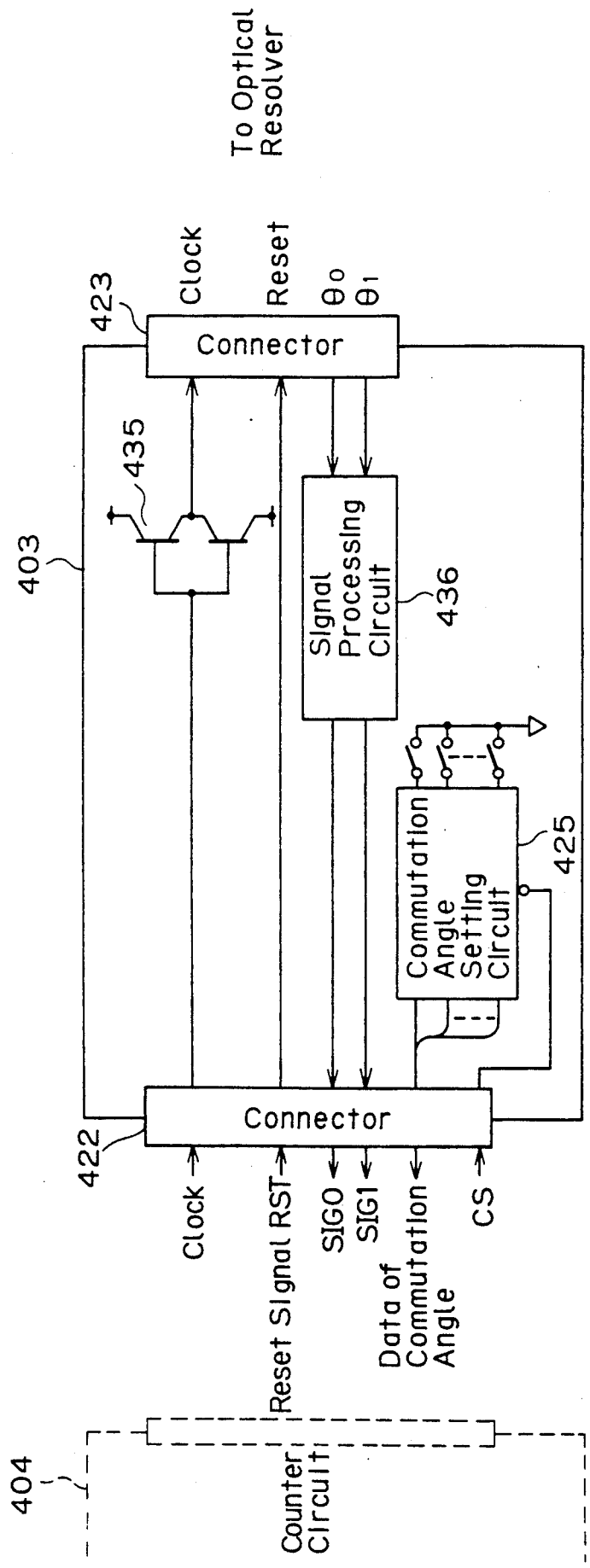
FIG. 37 depicts an optical resolver ID card.

FIG. 37 depicts an example of an optical resolver ID card 403, which comprises a single substrate. Connector 423 is connected to the optical resolver. A clock driver 435 is driven by a clock CLK provided from counter circuit 404 through connector 422 to generate a clock. The generated clock is provided to the optical resolver. A detection signal from each photodiode of the photodiode arrays of the resolver is scanned at the clock timing.

A signal processing circuit 436 shapes the light detection signals produced by the photodiodes disposed opposite to the inside and outside slits of the optical resolver, to sine wave signals SIG0 and SIG1 and sends signals SIG0 and SIG1 to counter circuit 404.

The following signals which are transmitted through connector 422 are of an electrical specification irrespective of whether a magnetic resolver ID card or an optical resolver ID card is used.

(A) Clock CLK. These are used for generation of excitation signals in the magnetic resolver ID card and are used for a scan signal of the photodiode in the optical resolver ID card.

(B) Signals SIG0 and SIG1. These are sine wave signals and the rotational angle of the motor is obtained through the phase difference therebetween.

(C) Data of commutation angle and chip select signal CS. These are inputted to and outputted from the commutation angle setting circuit 4 which is of the same construction in both the magnetic resolver ID card and the optical resolver ID card.

Also, a power source and a ground can be used for both the ID cards.

On the other hand, signals utilized independently by each of the magnetic resolver ID card and the optical resolver ID card are as follows.

(A) Reference voltage $V_{ref}$. These are used for determining the amplitude of the excitation signals of the magnetic resolver.

(B) Reset signal RST. These are used for initializing the scanning of the photodiode output signals of the optical resolver.

Connector 422 can be used for both the magnetic resolver ID card and the optical resolver ID card by using a connector of 30 or more pins. Also, counter circuit 404 which is connected to connector 422 can also be used for both types of ID cars.

When the commutation angle is changed by replacing the motor, advantageously, the commutation angle can be set without replacing the entire board of the counter circuit 404, by setting the ID card to the desired commutation angle after change of the motor.

According to the ID card constructed as just discussed, a setting function of the commutation angle data is provided on the ID card. Thus, only the ID card needs to be replaced when a motor having a different commutation angle is substituted. Accordingly, advantageously, the entire system need not be replaced.

Also, the optical resolver ID card and the magnetic resolver ID card use counter circuit connectors of a desire specification. Thus, when changing the kind of sensor, only the ID card needs to be replaced, and other portions of the motor drive system can still be used.

4. External I/F Part

Returning again to FIG. 2(A), three kinds of I/Fs are provided on the external I/F part. A host controller, which sends an analog speed command signal and an analog torque command signal, is connected to the speed/torque I/F 42.

The host controller, which sends a position command signal in a series of pulses, is connected to the serial pulse I/F 43. The I/F 43 provides the detection signal from sensor 2 to the host controller as a feedback pulse. The feedback pulse assumes the form of an up pulse and a down pulse, or phase A pulse and phase B pulse. The host controller subjects the motor to feedback control according to the transmitted command and the received feedback pulse.

The host controller, which provides a position command through an 8 bit microcomputer bus, is connected to 8 bit bus I/F 44. The interface I/F 44 comprises a pulse generation circuit $44_1$ for generating a number of pulses corresponding to the provided 8 bit data; and a feedback pulse counter 442 for counting the number of feedback pulses from sensor 2, and for providing data corresponding to the count through the 8 bit microcomputer bus to the host controller. The host controller is also capable of controlling the motor through serial pulse I/F 43 and 8 bit pulse I/F 44.

5. Position Control Part

Returning again to FIG. 2(A), position control part 470 comprises a position computing means 471 for obtaining the phase shift of the teeth of the rotor of the motor and the stator of the motor from the count of the phase difference counter 443, and then for integrating the phase shift to compute the rotational position of the motor. The results obtained through such operation act as a position feedback signal.

A commutation computing means 472 computes the phase shift of the teeth of the rotor and stator of the motor from the count of the phase difference counter 443, and generates a signal used for commutation control.

A sin table 473 stores coordinately the phase shift value and the sin value, and generates a signal of the sin value according to the computed results from the commutation computing means 472.

An origin processing circuit 474 processes an origin detection signal of the rotational position. A signal, detected by an origin detecting slit of the optical resolver, and other signals are provided to the origin processing circuit 474.

A position counter 475 counts the number of position command pulses provided from serial pulse I/F or 8 bit bus I/F 44.

A pulse generation circuit 476 is provided with a smoother function to smooth the feedback signal coming from sensor 2, into a signal having pulses arrayed at equalized intervals and to feed the resulting signal to the serial pulse I/F 43 and 8 bit bus I/F 44.

A switch 477 is provided for selecting the position command provided by the count of the position counter 475 or the position command provided by an output of a test signal generating means 478. The test signal is a pulse signal of a predetermined frequency to provide the position command, and is selected when a servo system of the position control part is adjusted to a test mode.

A subtractor 479 obtains the difference between the position command selected on switch 478 and the detection position computed by position computing means 471.

A position control means 480 is provided for feedback control of the rotational position of motor 1 according to the difference obtained by subtractor 479. Position control means 480 constitutes a tertiary servo system operating for I-PD (integral, proportion, differential) using suitable software.

A D/A (digital to analog) converter 481 converts the control signal which is produced by the position control means 480 into a digital to analog signal.

A gain table 482 is provided for storing the natural frequency fn of the motor position control system, the DC gain $G_{DC}$, the integral limiter value ILIM and the optimal control parameters $X_{11}$, $X_{12}$, $X_{13}$, etc., which correspond to those values coordinately therein, as shown, for example in FIG. 38. Position control means 480 operates by means of the control parameters read out from the gain table 482. The DC gain $G_{DC}$ and the integral limiter value ILIM will be described concurrently with the description hereinafter of the setting part 7. The gain table includes those values for integral operation, proportion operation and differential operation, which are used according to the type of control operation desired.

6. Speed Control Part

Returning again to FIG. 2(A), speed control part 490 comprises an F/V converter (frequency to voltage) 491 for generating an analog voltage signal according to the frequency of the rotation detection signal SIG0 of the sensor. The output acts as a speed feedback signal.

A switch 492 is connected to an output end of a D/A converter 481 for position control and is connected to speed/torque I/F 42 for speed control.

A subtractor 493 obtains the difference between the command signal selected by switch 492 and the speed feedback signal provided through F/V converter 491.

A multiplying digital/analog converter 492 (herein referred to as "MDA") sets the gain on the digital signal and amplifies the analog input signal. The analog input signal applied to MDA 494 is the difference signal provided by subtractor 493, and the digital gain setting signal provided by position control means 480 or the tuning part 7. For example, where the gain setting signal is an 8 bit signal, the gain of MDA 494 is set to 256 stages.

A limiter 495 is provided for limiting the current command value provided to power control part 48 (see FIG. 2(B)) by controlling the output voltage of MDA 494 within a predetermined upper bound or lower bound value.

Two other MDAs 496 and 497 are provided for outputting current command values $I \sin \theta_e$ and $I \sin (\theta_e + 120°)$ with the current amplitude I limited by the limiter 495 as the analog input signal and values $\sin \theta_e$ and $\sin (\theta_e + 120°)$ read out of the sin table 473 as the gain setting signal. The phases of the two command values are shifted by 120° due to the motor being 3 phase. Where the phase number varies from the 3 phase, the phase shift takes another value.

7. Power Control Part

Returning again to FIG. 2(B), power control part 48 comprises current detection circuits 501,502 for detecting currents flowing to each of the coils of the two phases of motor 1.

Subtractors 503 and 504 obtain differences between the current command signals from MDAs 496 and 497, and the detection current signals from current detection circuits 501,502.

A PWM (pulse width modulation) circuit 505 is provided for generating and outputting a pulse width modulation signal for feedback control of the excitation currents applied to the motor coils according to the differences obtained by the subtractors.

A driving circuit 506, comprising transistors, drives the transistors on PWM signals from the PWM circuit 505, to carry the excitation signals to the motor coils.

Figure 39:
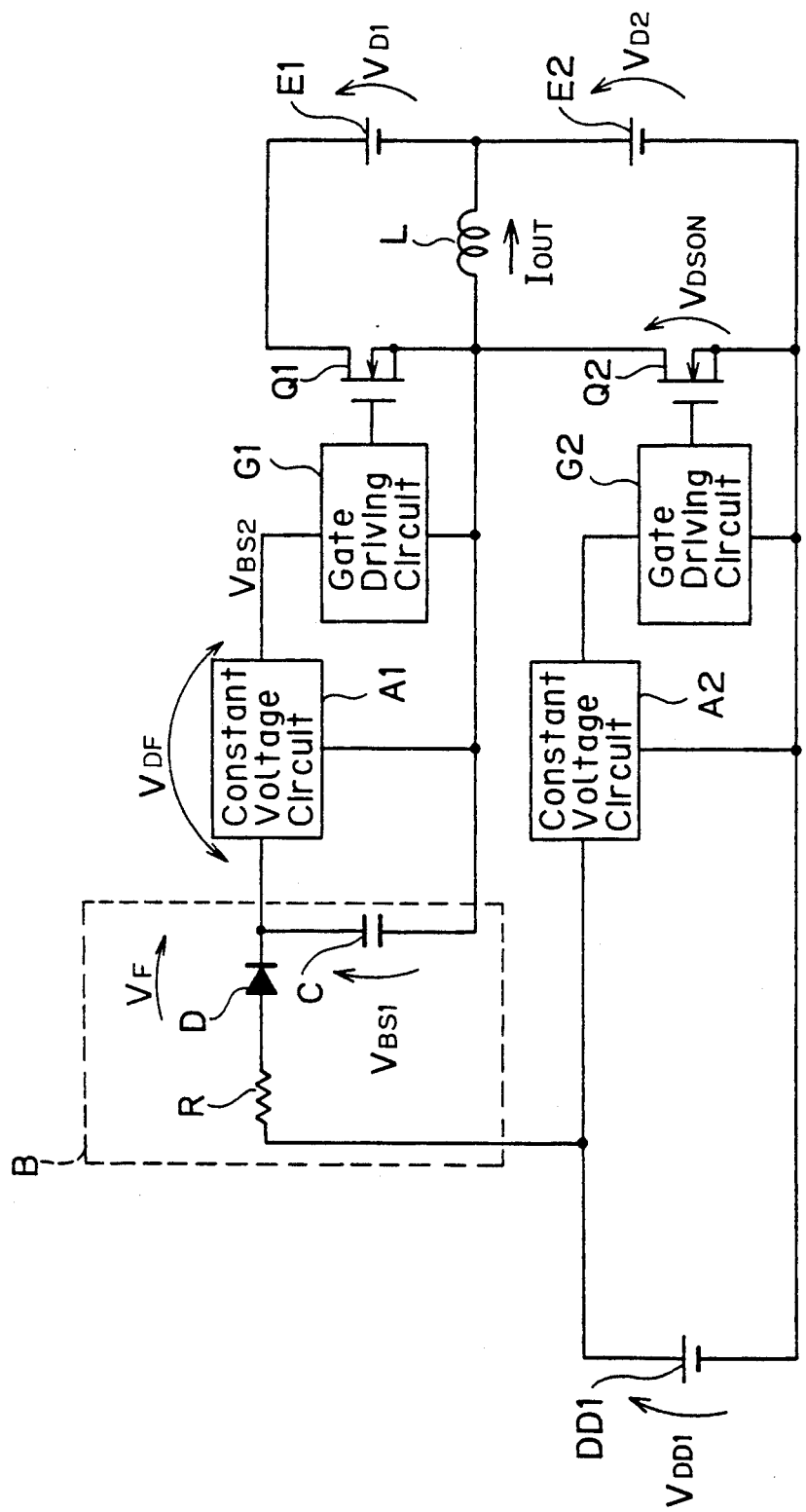
FIG. 39 depicts an example of a driving circuit.

FIG. 39 depicts an example of the driving circuit 506 of FIG. 2(B), wherein the circuit is a bridge type inverter circuit with the figure showing only a half of the bridge circuit for sake of convenience. The circuit comprises switching elements $Q_1$, $Q_2$ constituting a bridge circuit; a motor coil L; power sources E1, E2 for supplying a voltage to carry the current to coil L; gate driving circuits G1,G2 for driving switching elements Q1 and Q2 with the PWM signals; a power source DD1 for supplying a voltage to drive switching elements Q1 and Q2; a diode D provided in the path of the current flowing from power source DD1; a resistance R connected in series with diode D; a capacitor C; and constant voltage circuits A1,A2 for providing a constant voltage to gate driving circuits G1,G2. The resistance R, diode D and capacitor C together form a bootstrap circuit B.

In the apparatus, capacitor C is charged by power course DD1 to generate a voltage $V_{BS1}$. The voltage is stabilized by constant voltage circuit A1 to obtain a driving voltage $V_{BS2}$ of gate circuit G1. Voltage $V_{BS1}$ is provided by $$V_{BS1} = V_{DD1} - V_F - V_{DSON} \quad (16)$$

wherein $V_{DD1}$ is the generated voltage from power source DD1; $V_F$ is the forward voltage drop of diode D; and $V_{DSON}$ is the voltage drop when Q2 is turned ON.

Figure 40:
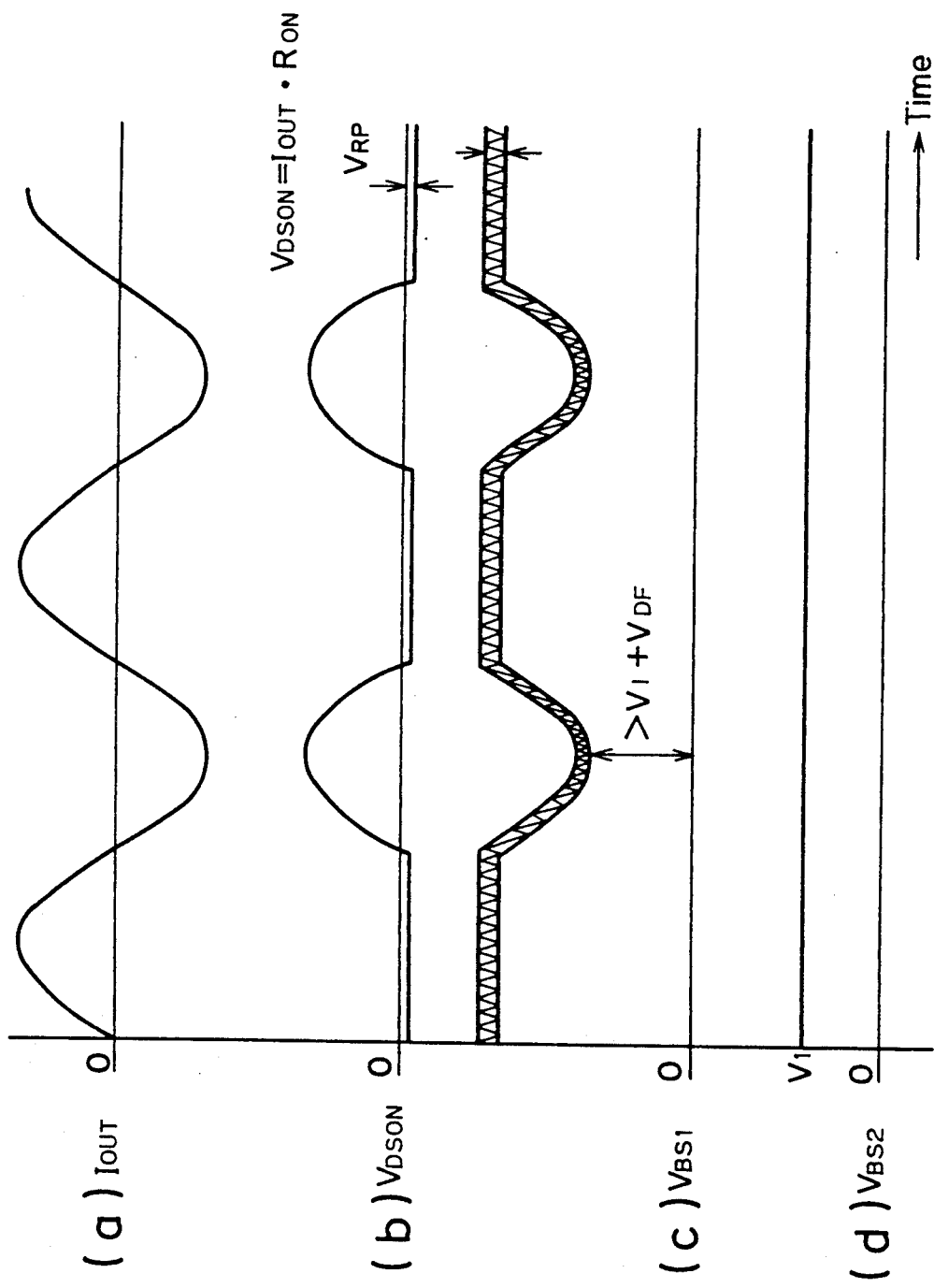
FIG. 40 depicts a time chart for the apparatus of FIG. 39.

FIG. 40, comprising lines (A)-(D), depicts a time charge of each signal of the apparatus of FIG. 39, wherein switching elements Q1 and Q2 are alternately turned ON. Thus, a current $I_{OUT}$ flowing to the motor coil L changes as shown in line (A). Voltage $V_{DSON}$ across switching element Q2 changes as shown in line (B). That is, when switching element Q2 is ON, $V_{DSON}$ changes according to $I_{OUT} \cdot R_{ON}$ ($R_{ON}$ being the resistance when Q2 is ON), but is held at $-V_F$ when switching element Q1 is ON. From such change of $V_{DSON}$, the voltage $V_{BS1}$ on capacitor C is as shown in line (C).

Where a minimum value of voltage $V_{BS1}$ is set to be larger than the sum of the constant voltage value $V_1$ of the constant voltage circuit A1 and the voltage drop $V_{DF}$, or $$V_{BS1} \geq V_1 + V_{DF} \quad (17)$$

The output of the constant voltage circuit A1 is kept constant, and $V_{BS2}$ holds a constant value, as shown in line (D).

By substituting Equations (16) for Equation (17) to take into consideration the ripple due to bootstrap operation, to satisfy the above $$V_{DD1} < V_1 + V_{DF} + V_F + V_{DSON} + V_{RP} \quad (18)$$

wherein $V_{RP}$ is the ripple voltage. The ripple voltage $V_{RP}$ is inversely proportional to the capacity of the capacitor C.

A voltage generated by power source DD1 is set to satisfy Equation (18).

Figure 41:
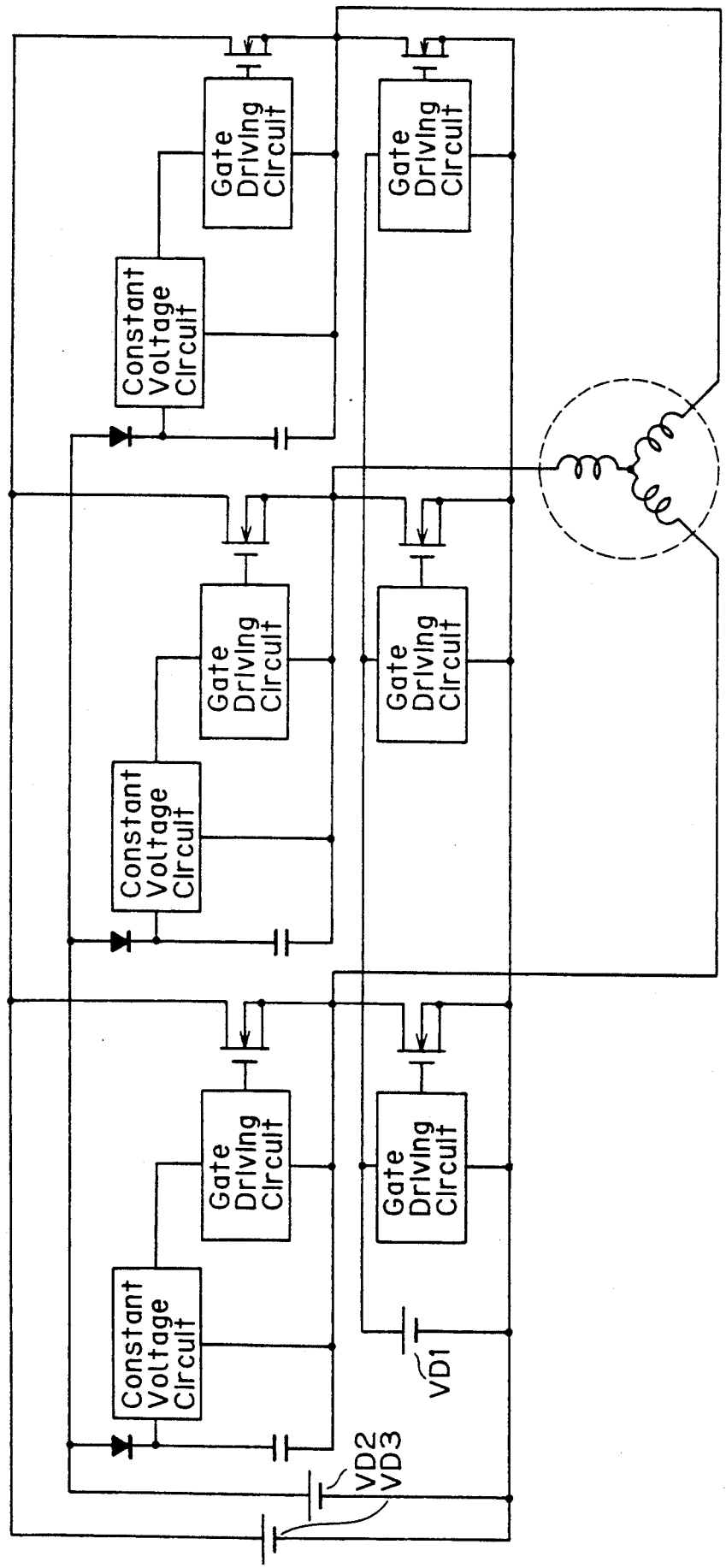
FIG. 41 depicts use of the invention in a 3-phase motor.

FIG. 41 depicts the case wherein the invention is applied to a three phase motor, wherein the three phase half bridge circuit is used. The circuit comprises means for generating a driving power $V_{D1}$ for the switching element; a power $V_{D2}$ for the bootstrap circuit; and a power $V_{D3}$ for carrying a current to the motor coils. The voltage generated by power source DD1 is set so as to hold a constant voltage value of the constant voltage circuit even when switching element Q2 is turned ON and a voltage working on the bootstrap circuit is minimized Thus, switching element Q2 may be a switching element which is large in $V_{DSON}$, and the degree of freedom of the switching element is expanded accordingly.

Since the voltage of power source DD1 is set to be sufficiently high, the discharge time of capacitor C becomes long, and the time for turning switching element Q2 OFF can be prolonged. Thus, the degree of freedom of operating conditions is expanded.

8. Setting Part

Returning again to FIG. 2(A), setting part 7 comprises servo tuning switches 71,72,73. Switch 71 is a natural frequency setting switch for setting the natural frequency fn of the position control system in a plurality of stages within a predetermined range. Switch 72 is a DC gain setting switch for setting DC gain $G_{DC}$ of MDA 94 in a plurality of stages. From setting DC gain to an optimal value, the setting time, when the speed of the motor is unified after start up, can be minimized. Switch 73 is an integral limited setting switch for setting limiter value ILIM of the output of a digital integrator in the sofware servo of the position control means 480 in a plurality of stages. By optimizing the limiter value, the setting time, when the motor arrives at a target position, can be minimized.

When the values of fn, $G_{DC}$ and ILIM are set on switches 71,72, and 73, an optimal control paramater value, corresponding to the set point, is read out of gain table 482. Position control means 480 sets the gain of MDA 494 according to the read out control parameter value. Values fn, $G_{DC}$, and ILIM may be set on an external controller rather than on switches 71,72,73. Furthermore, the control parameter may be read at least once, rather than all, upon setting fn, $G_{DC}$ and ILIM.

Input/output ports 74,75 (herein called "I/O ports") are connected to host controller 3.

An integral/proportion switching signal, for switching the control of position control means 480 to an integral operation or to a proportional operation, is outputted at I/O port 74. A gain setting signal, for setting the gain of MDA 494 directly, is outputted at I/O port 75.

A detailed example of the components described separately under headings (1) to (8) will now be described hereinbelow.

9. Origin Detection Unit

Figure 42:
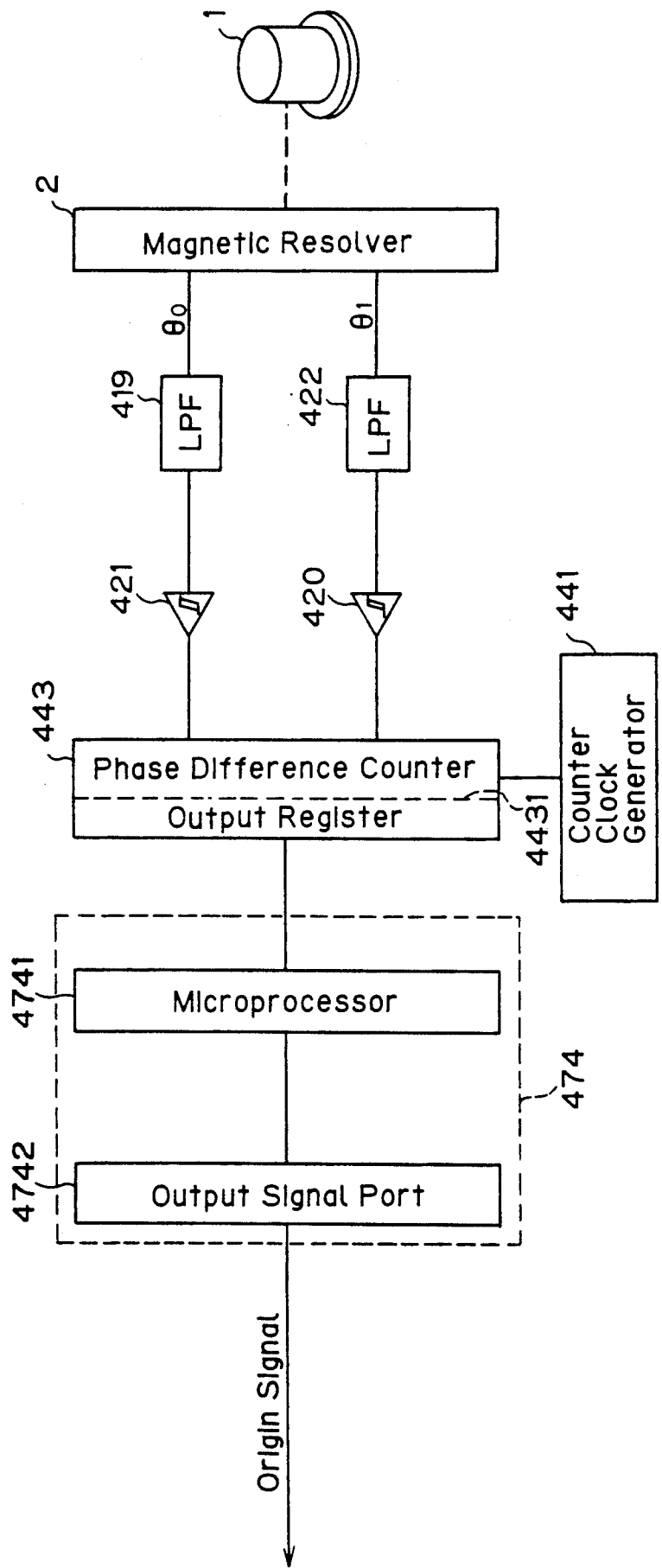
FIG. 42 depicts an apparatus for detecting the origin of the motor rotational position.

FIG. 42 depicts an example of a unit for detecting the origins of the motor rotational position, wherein magnetic resolver 2 generates a signal $\theta_o$, with the phase being modulated by the rotations of the motor, and a reference signal $\theta_1$ with the phase not being modulated. The signals are given by the following equation.

$$\theta_o = K \sin(\omega t + n_1 \theta)$$

$$\theta_1 = E \sin \omega t$$

wherein E is the amplitude of voltage and K is a constant, and $n_1$ is the number of teeth of the rotor of the magnetic resolver.

After passing through LPTs 419 and 422 and comparators 421 and 420 to produce shaping, signals $\theta_o$ and $\theta_1$ are provided in phase difference counter 443. Phase difference counter 443 measures the phase difference between the two signals thus provided on a clock generated by clock generator 441. The phase difference counter 443 has a carry when counting the phase difference corresponding to the rotational angle of n pitches, wherein n is an integer, of the rotor teeth of the motor 1. An output register 4431, in which the measured values are loaded, is provided on the phase difference counter 443.

A microprocessor 4741 reads the phase difference outputted by the output register 4431, and detects an origin of the rotational position of motor 1, from the carry step for counting the phase difference. The origin refers to the rotational position where the phases of the teeth of the rotor and stator of motor 1 coincide.

An output signal port 4742 outputs an ON or OFF origin signal according to the origin detected by microprocessor 4741. Microprocessor 4741 and output signal port 4742 are provided on the origin processor means 474 of FIG. 2(A).

Operation of the unit is as follows, with reference to FIG. 43, comprising lines (A)-(F), which depicts a time chart of each signal. Signals $\theta_o$ and $\theta_1$, shown in lines (A) and (B), are generated by magnetic resolver 2. Phase difference counter 443 measures the phase difference $(t_1 - t_o)$ of these signals on a clock from clock generator 441, shown in line (C), and stores the measured value m in the output register 4431. In this case, the set value of the output register 4431 changes, as shown in line (D).

Figure 44:
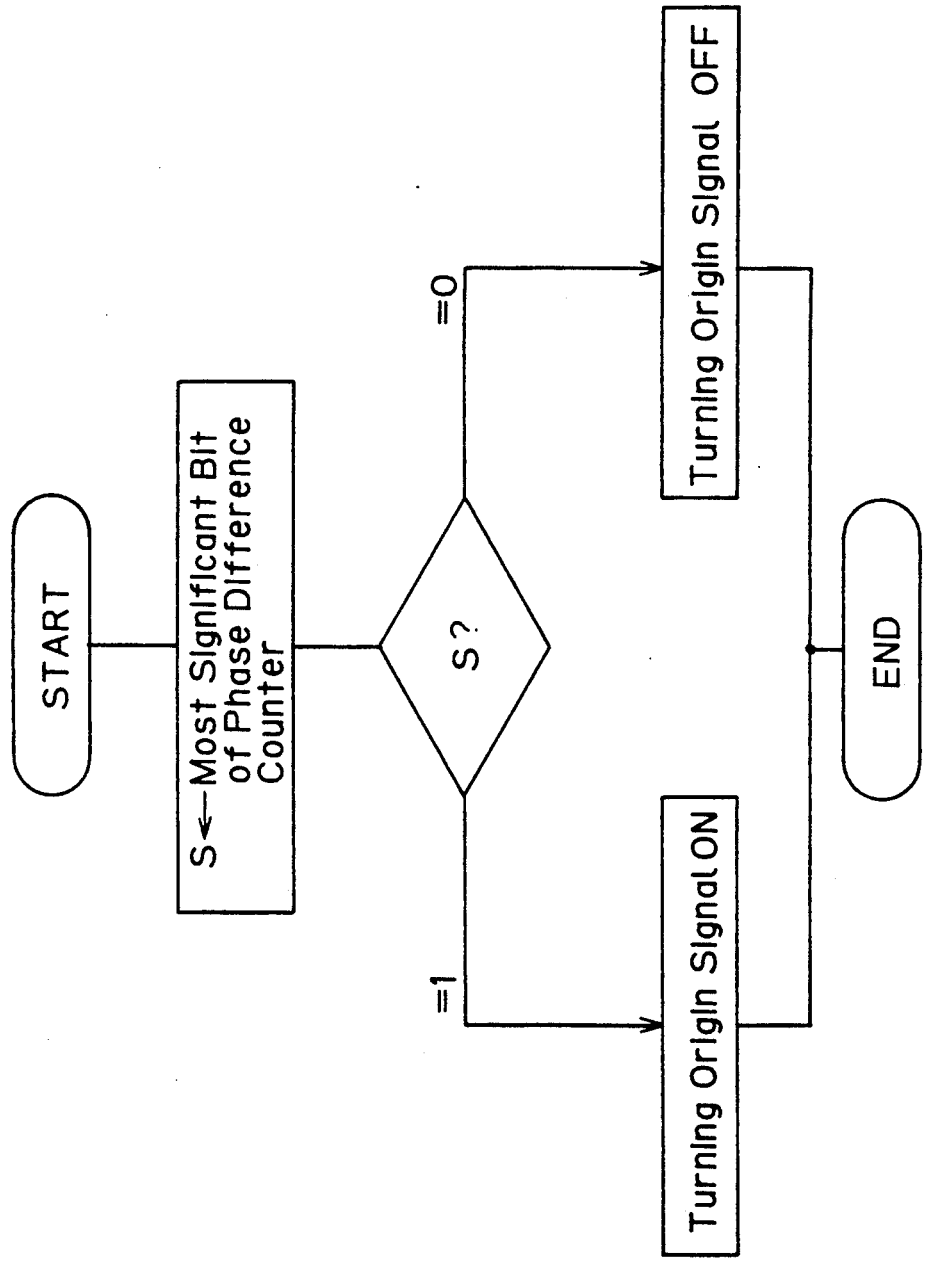
FIG. 44 a flow chart of the process of FIG. 42.

Microprocessor 4741 reads the set value of output register 4431 at a constant period, processes it, as shown in FIG. 44, and detects an origin of the rotational position of magnetic resolver 2.

The process depicted in FIG. 44 is as follows. Phase difference counter 443 has a carry to MSB (most significant bit) to count the phase difference for a one tooth pitch of the rotor of magnetic resolver 2. From the set value of output register 4431 read as above, microprocessor 4741 turns ON an origin signal when the contents of MSB is "1", and turns OFF the origin signal when it is "0". The origin signal is outputted by output signal port 4742.

Figure 43:
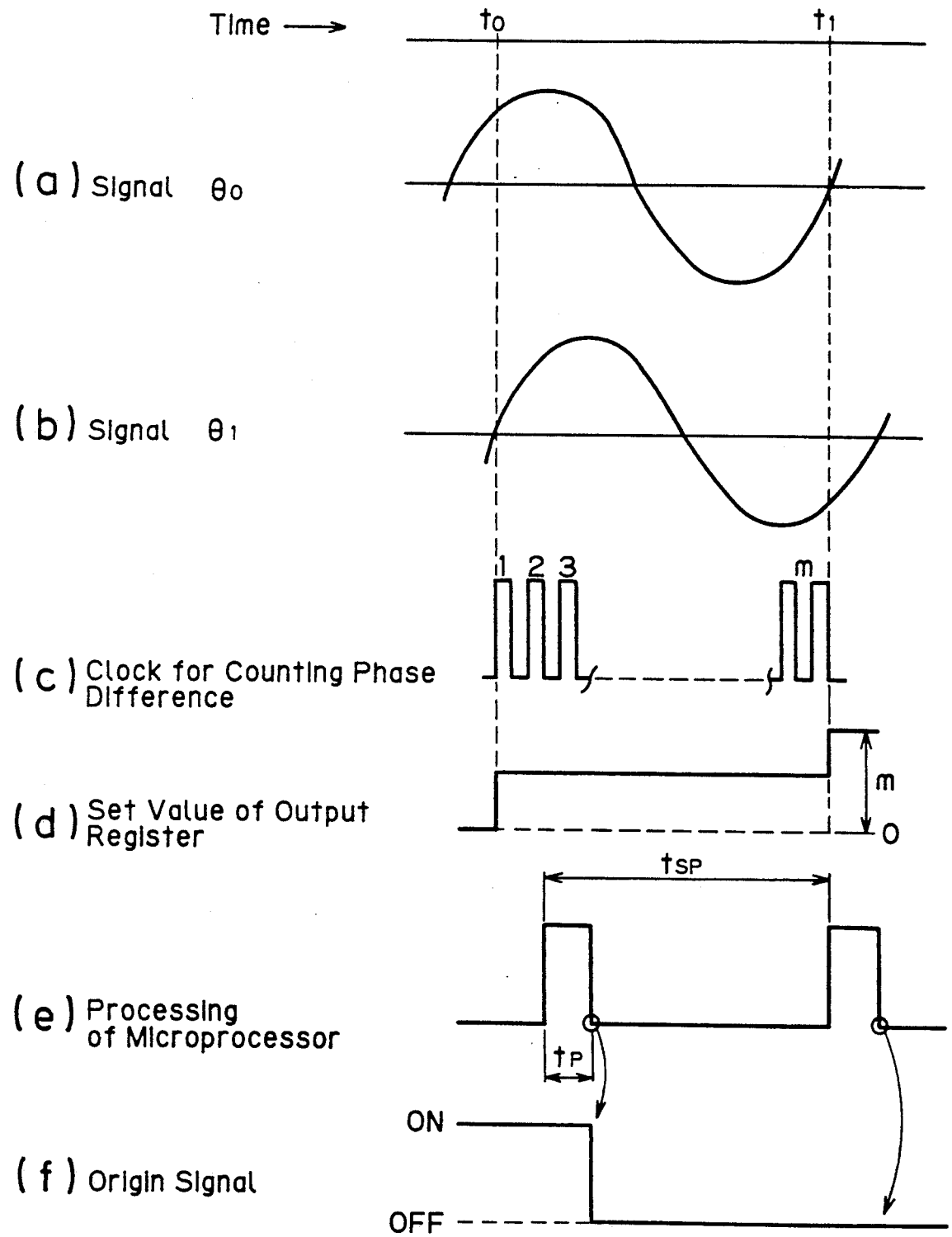
FIG. 43 comprising lines (a)-(f), depicts a waveform chart of signals formed in the FIG. 42 embodiment.

Processing on the microprocessor and the origin signal are shown in FIG. 43, lines (E) and (F), wherein $t_p$ is the processing time of the microprocessor; $t_{sp}$ is the processing period of the microprocessor.

Operation on the origin signal using an algorithm requires that rotational frequency N of motor 1 satisfy the following equation.

$$N < \tfrac{1}{2} n_p \cdot t_{sp}$$

wherein $n_p$ is the number of teeth of the rotor of the motor.

Phase difference counter 443 may be of a type that will have a carry to MSB when counting the phase difference for an arbitrary integral number of pitches other than one pitch of teeth of the rotor of the motor.

Furthermore, another construction is conceivable wherein the origin signal is operated according to a carry to MSB and to a carry to other components.

According to the just described origin detection unit, the following effects are obtained.

1. If the count on the phase difference counter, until a carry is brought to MSB, is represented by $C_o$, then the origin can be detected with a resolution $1/n_p \cdot C_o$, and the detection resolution can be enhanced by increasing the frequency of the clock for counting the phase difference. Thus, the origin can be detected at high precision.

2. Since processing on the microprocessor can be accomplished with use of the most parts, an origin signal can be generated at low cost. An application to a servo drive or the like with a microprocessor incorporated therein leads particularly to a favorable result.

10. Correcting Device for the Detection Signal

Figure 45:
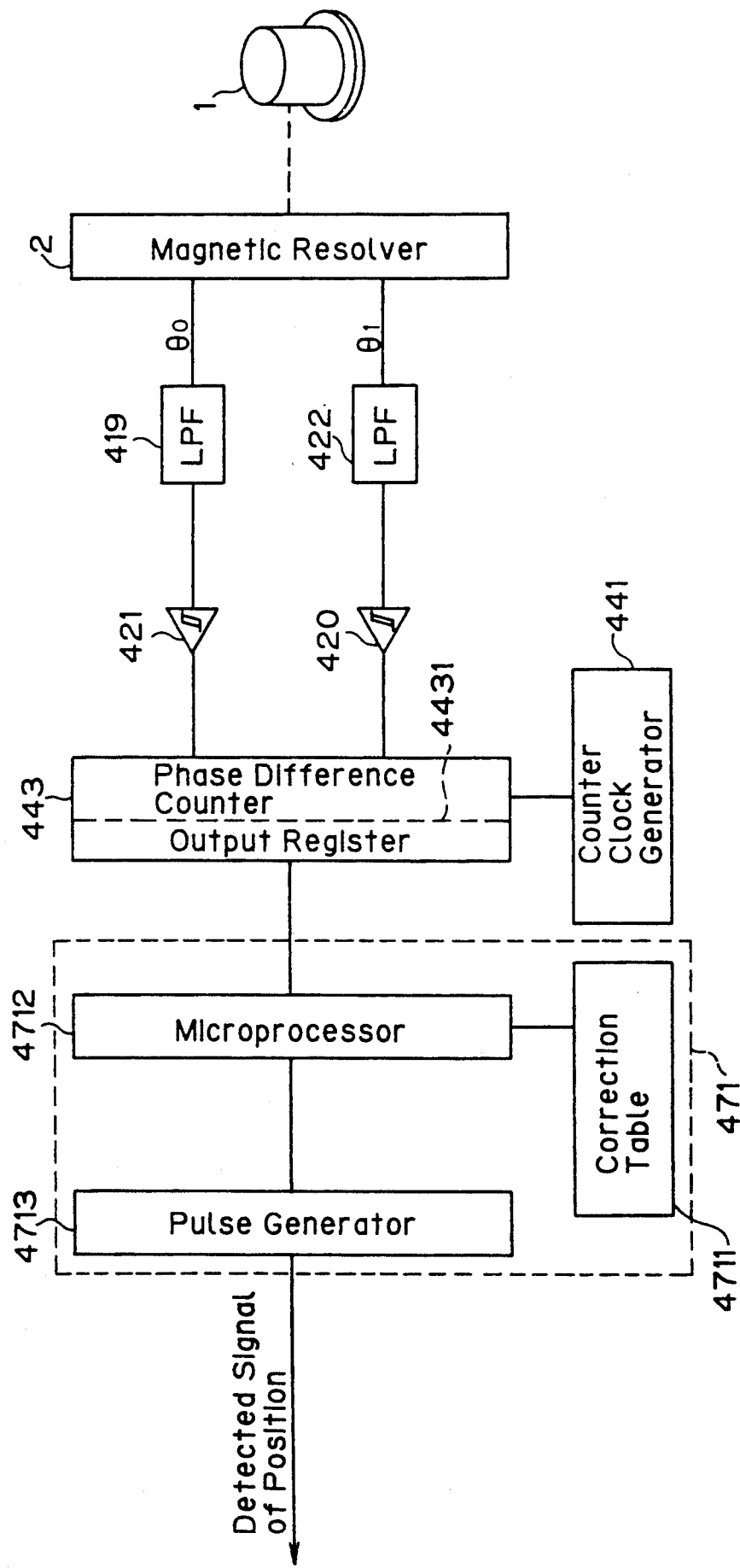
FIG. 45 an apparatus for correcting the detected rotational position of the motor.

FIG. 45 depicts an example of a device for correcting the detected rotational position of the motor, wherein a correction table 4711, which uses a ROM, stores predetermined angles 0° to 360° of $\theta$ in equation $\theta = K \sin(\omega t + n\theta)$ and augments each angle coordinately The augmenter corresponds to an augmenter of electrical angle at 360°, namely, an augmenter for one pitch of teeth of the rotor.

A microprocessor 4712 reads the phase difference set in output register 4431, and reads an augmenter out of correction table 4711 according to the phase difference. The computed rotational position is corrected by the augmenter according to the phase difference read as above.

A pulse generator 4713 receives a signal representing the position which is corrected by microprocessor 4712 and then converts the signal into a serial pulse signal for outputting. The output acts as a detection signal for the rotational position of motor 1.

Correction table 4711, microprocessor 4712 and pulse generator 4713 are provided on position computer means 471.

Figure 46:
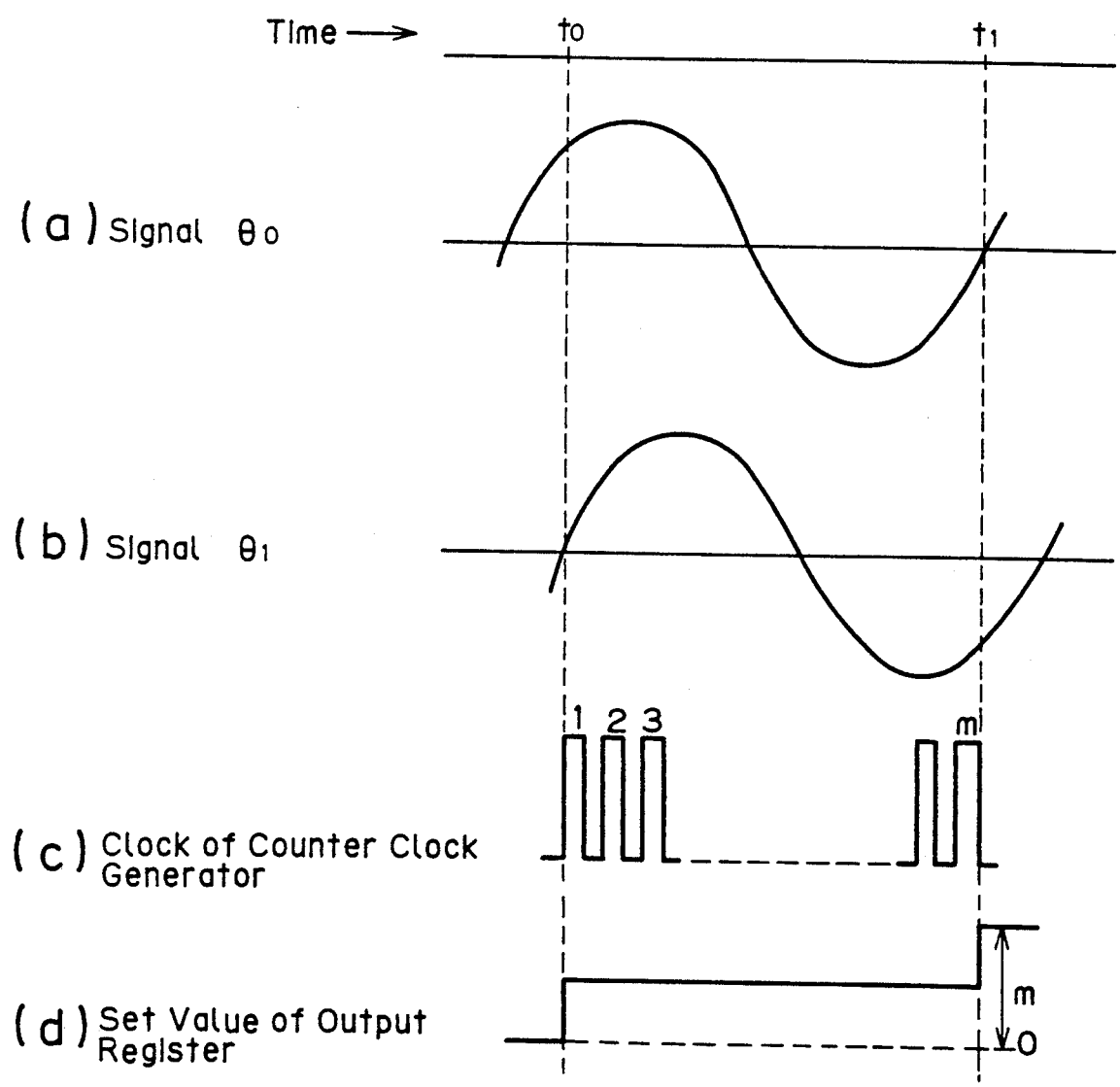
FIG. 46 comprising lines (a)-(d), depicts waveforms of the embodiment of FIG. 45.

Operation of the FIG. 45 device is described with reference to FIG. 46, comprising lines (A)-(D), which is a time chart of each signal. Signals $\theta_o$ and $\theta_1$ shown in lines (A) and (B), are generated by magnetic resolver 2. Phase difference counter 443 measures the phase difference of these signals $(t_{1-to})$ on a clock fc of clock generator 441 shown in line (C), and stores the measured value m in output register 4431. In this case, the value set in output register 4431 changes as shown in line (D).

Figure 47:
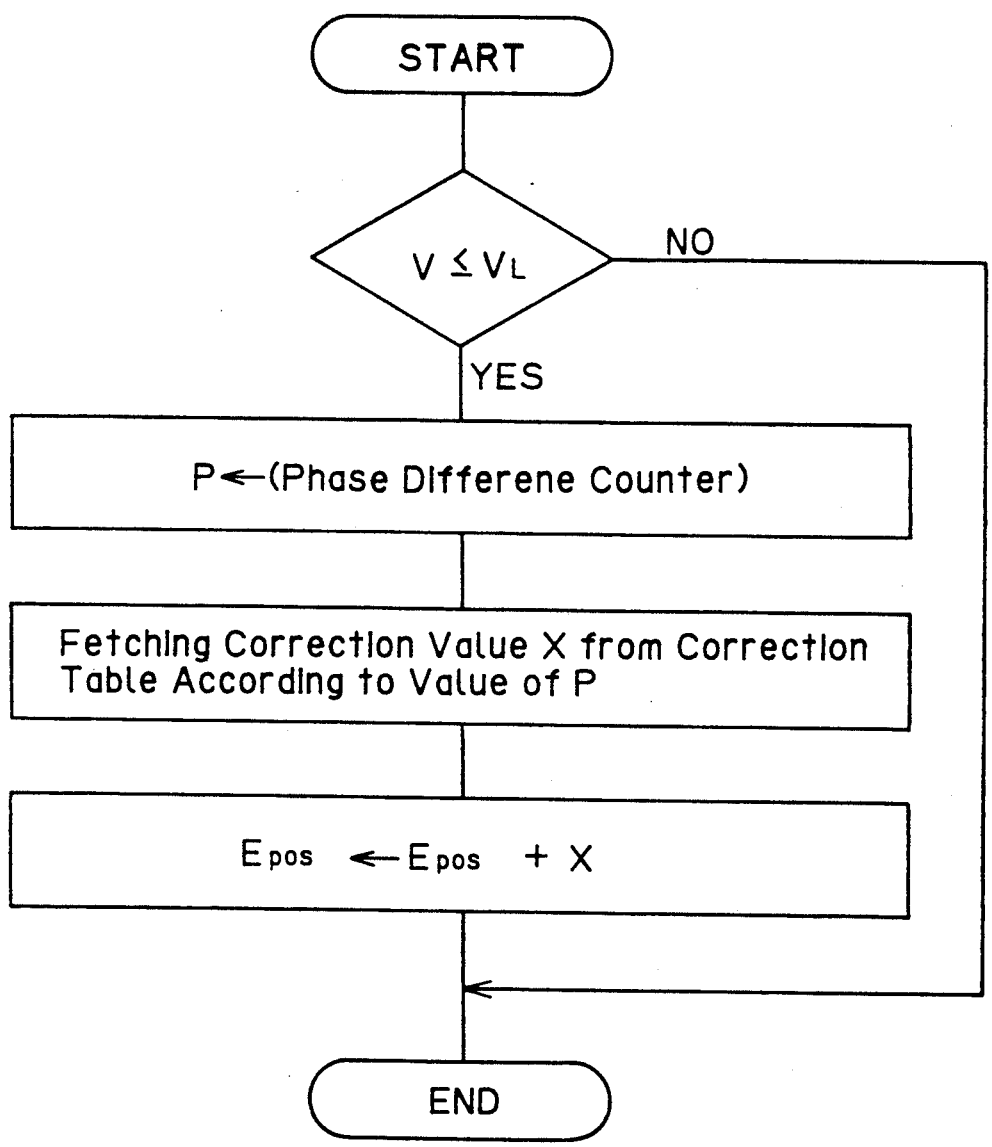
FIG. 47 depicts a flow chart of the process of FIG. 45.

Microprocessor 4712 reads the set value of output register 4431 at a constant period, operates for the process shown in FIG. 47, and computes the corrected rotational position of the motor. In FIG. 47, whether or not a motor rotational speed V is smaller than $V_L = $ (rated rotational speed) $\times 0.03$ is discriminated. Where the speed V is smaller than $V_L$, an augmenter is read out of correction table 4711 according to the set value of the output register 4431, and the rotational position computed from the set value of the output register 4431 is corrected by the augmenter. When V is greater than $V_L$, the rotational position of the motor changes largely when the corrected value is computed since the motor is rotating at high speed, and the corrected value is not readily available. Thus, correction is not made.

A variation of the motor rotational position for one period is thereafter set on pulse generator 4713. Pulse generator 4713 converts the variation into a serial pulse for outputting. The motor rotational position is thus detected. The rotational position is thus detected with high precision.

11. Limited for Motor Driving Current

FIG. 48 represents another example of a device for limiting the current fed to the motor coil, wherein a limiter 495 is provided for limiting the current command value $U_{in}$ by limiting the voltage of the current command value signal on a limit value provided from a limit value computing part 498.

A power control part 48 is provided for feeding the driving current to motor 1 according to the output of the limiter 495.

According to the embodiment of FIG. 2, the limit value computing part 498 (of FIG. 48) is provided between sensor 2 and limiter 495 (of FIG. 48) in the system of FIG. 2. Limit value computing part 498 comprises a nonvolatile memory (e.g. a ROM) 4981 in which the parameters of a voltage control curve are stored.

Volatile memory (e.g. a RAM) 4982 stores a voltage limit curve (herein called I-N curve) in the form of a table coordinating the maximum current value with a motor rotational frequency. The I-N curve indicates the relation between the rotational frequency and the limit value or the maximum current value, as depicted in FIGS. 49 and 50.

A microprocessor 4983 ($\mu$P) obtains the limit value, and comprises an arithmetic operation means 4984 and selects the I-N curve on a parameter P read out of ROM 4981, obtains a maximum current value $L_{im}$ (N) on the selected I-N curve and a motor rotational frequency N and stores these values in RAM 4982 in coordination.

A speed detector 4985 detects the rotational frequency N of the motor on the output signal of sensor 2. The current limit value $L_{im}$ (N) is read out of RAM 4982 on the detected rotational frequency N and is supplied to limiter 495.

Operation of the device of FIG. 48 is as follows. When power is applied, parameter P of the I-N curve is read out or ROM 4981, and a limit function f (P,N) is selected on the parameter. Then, the maximum current value $L_{im}$(N) in the value of each rotational frequency N is computed from $L_{im}(N) = f(P,N)$, and the computed value is stored in RAM 4982 coordinately. For such operation, the function f(P,N) and the range of the rotational frequency $-N_{max}$ to $+N_{max}$ are provided beforehand. One example of an I-N curve is shown in FIG. 50.

At the time of normal operation, first the speed detector 4985 detects the motor rotational frequency N on the output signal from sensor 2. Next, the maximum current value $L_{im}$(N) of the detected rotational frequency N is read out of RAM 4982, and the value is provided to limiter 495. Limiter 495 then limits the voltage of the signal of current command value $U_{in}$ as follows and generates a signal command value $U_{out}$.

When $|U_{in}| \leq Lim(N)$, $U_{out} = U_{in}$

When $|U_{in}| > Lim(N)$, $U_{out} = Lim(N)$

The power control part 48 (of FIG. 2(B)) feeds a current $I_{out}$, according to the voltage command value $U_{out}$ thus obtained, to motor 1.

The form of the limit function f(P,N) is determined in limiter simply from setting parameter P read out from ROM 4981 to specifications of an actuator on which the motor is used, and the I-N curve of the characterstic conforming to the specifications is obtained. Thus, advantageously, the limiter 495 is accommodative to actuators varying in specifications.

Since the limit function f(P,N) is generated in $\mu$P 4983, the driving current can be limited to various specifications using inexpensive means without providing a new complicated electronic circuit. Furthermore, the limit value is computed by $\mu$P 4983. Thus, the limit value is obtained with high precision.

12. Absolute Rotational Position Detection System

Figure 51:
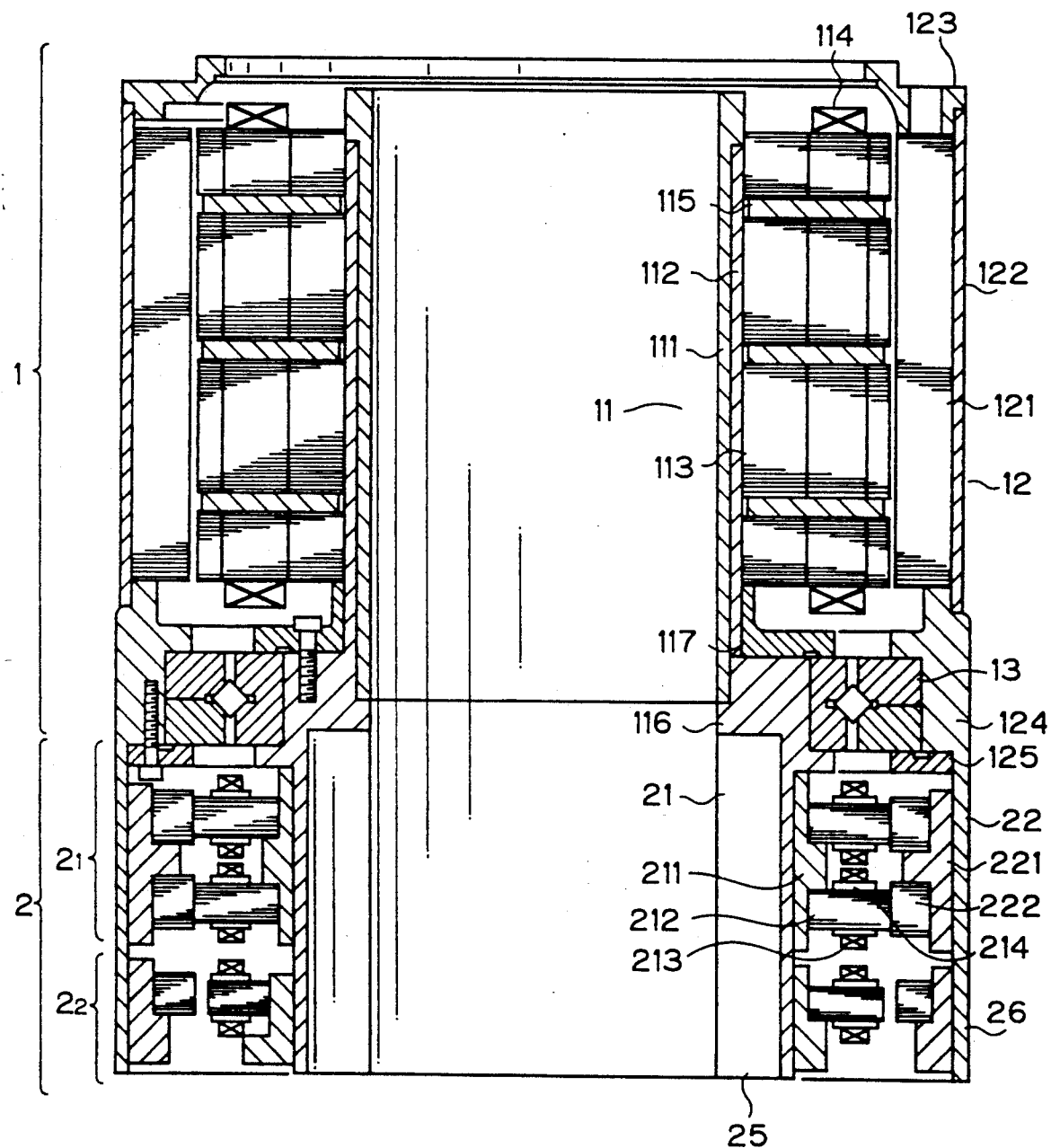
FIG. 51 is a sectional view of the mechanism part of the rotational position detection apparatus.

The system depicted in FIGS. 2(A)-2(C) functions to detect the absolute position. FIG. 51 depicts a mechanism part of such apparatus wherein an nX (n being an integer) $2_1$ having the phase of the detection signal changing from 0° to 360° whenever the motor 1 rotates $1/n$; and a 1X resolver 22 having the phase of the detection signal changing from 0° to 360° whenever motor 1 rotates one time, are provided as magnetic resolvers.

The 1X resolver $2_2$ detects the motor rotation with 1/n rotation as a resolution, and the nX resolver $2_1$ detects the motor rotational position within the detected 1/n rotation. The number of teeth formed on the rotor of the nX resolver is the same as the number of teeth formed on the rotor of motor 1. Other details of the mechanism part is identical to that shown in FIG. 26.

Figure 52:
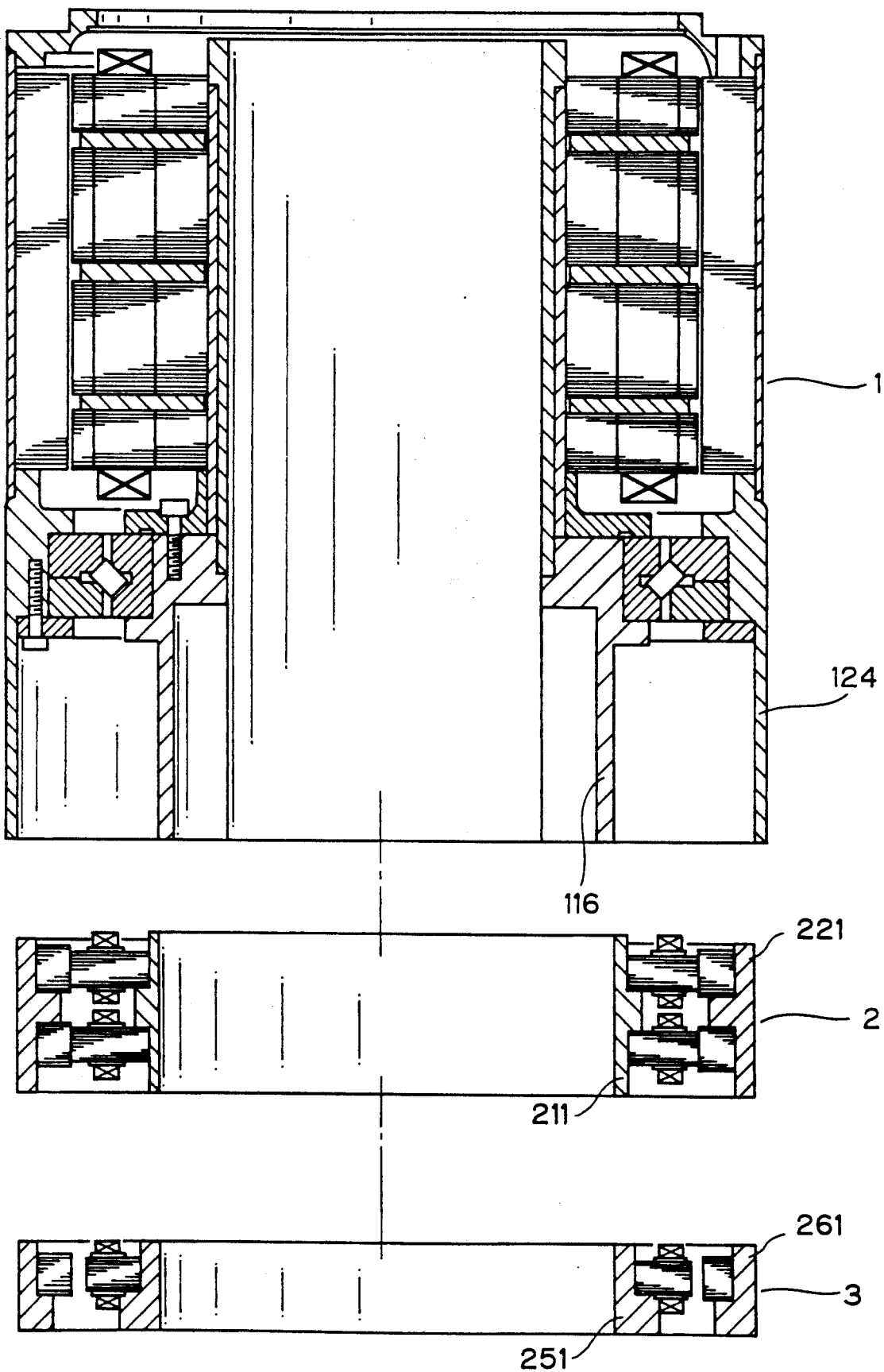
FIG. 52 depicts the motor and resolver part as being modularized.

As shown in FIG. 52, magnetic resolvers $2_1$ and $2_2$ are modularized and incorporated in the actuator when assembly is completed.

In case the motor drive system requires only an incremental system, only the nX resolver need be mounted. Where it is further required to detect the absolute rotational position, the 1X resolver is mounted optionally in addition to the nX resolver.

Figure 53:
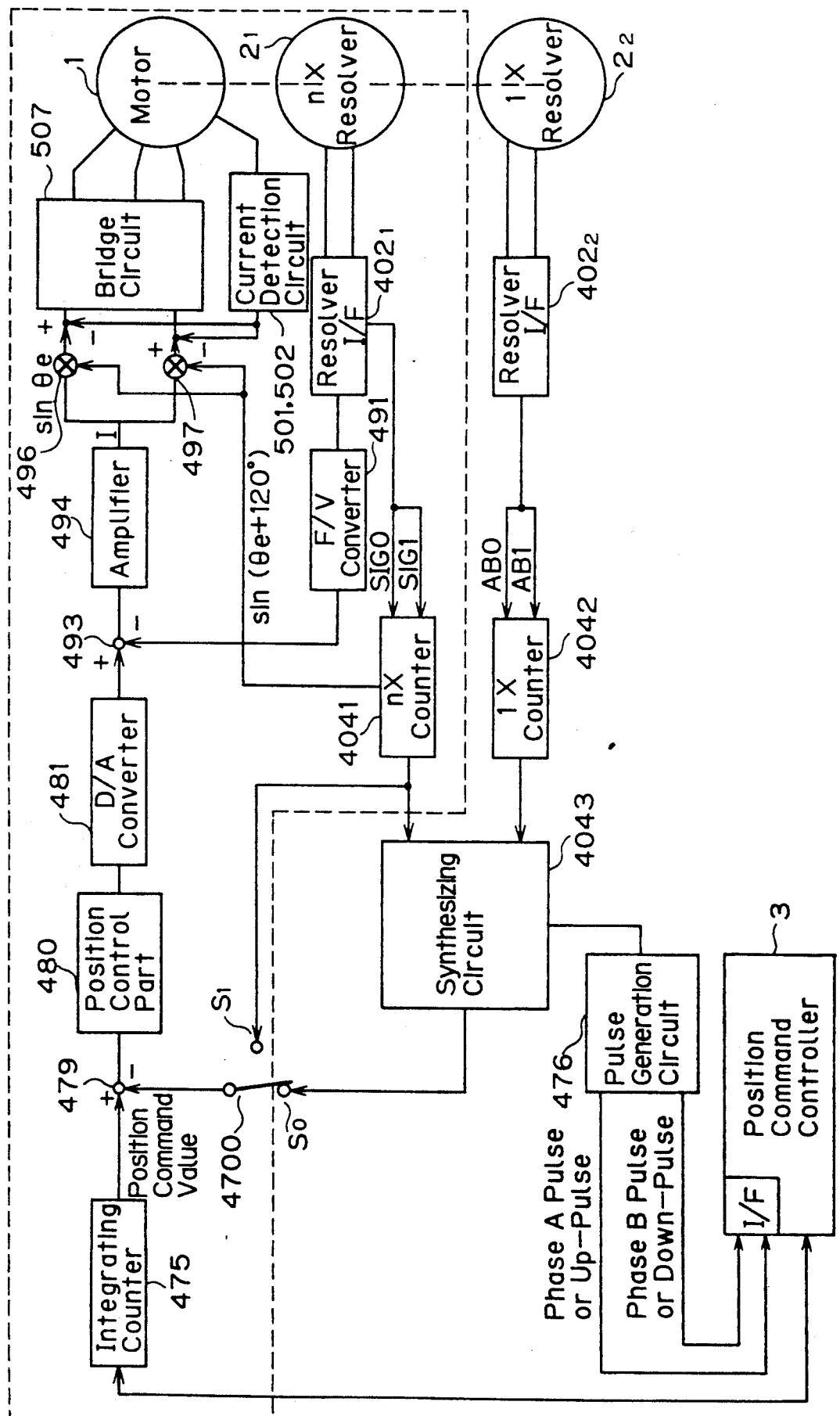
FIG. 53 depicts a system for detecting the absolute rotational position of the motor.

FIG. 53 depicts a system for detecting the absolute rotational position of the motor using detection signals of the magnetic resolvers comprising resolver I/Fs $402_1$ and $402_2$ to which the nX resolver $2_1$ and the 1X resolver $2_2$ are connected, respectively; an F/V converter 91 for feeding back a signal from resolver I/F $402_1$ as a speed detection signal of analog voltage; an nX counter 4041 for measuring the phase detected on the nX resolver from the phase difference between excitation signal SIG0 and output signal SIG1 of the nX resolver; a 1X counter 4042 for measuring the phase detected on the 1X resolver from the phase difference between excitation signal AB0 and an output signal AB1 of the 1X resolver $2_2$ which are sent from resolver I/F $402_2$.

A compound circuit 4043 is provided for computing the absolute rotational position of motor 1 using the measured values of the nX counter 4041 and 1X counter 4042. A switch 4700 is used for feeding back the output of the nX counter 4041 or the compound circuit 4043, selectively, as a position detection signal.

Components 4041, 4042 and 4043 are provided within counter circuit 404 of FIG. 2(C).

A pulse generation circuit 476 is provided for generating the absolute rotational position computed on the compound circuit 4043 as phase A pulse and phase B pulse or up pulse and down pulse. A position command controller 3 is provided for generating an incremental position command value signal in up/down pulses on the basis of an absolute rotational position provided by pulse generating circuit 476.

The circuit further comprises an integrating counter 475 for integrating the number of output pulses from command position controller 3; a subtractor 479 for obtaining a difference between the position command value and the position feedback value; a position control part 480 for feedback control of the rotational position of the motor 1 according to the difference; a D/A converter 481 for converting the control signal from position control part 480 into a digital/analog signal; a subtractor 493 for obtaining a difference between an output of the D/A converter 481 and a speed feedback value; and an amplifier 494 for amplifying the difference signal MDAs 496,497 are provided for generating signals of current command values $I\sin\theta_e$ and $I\sin(\theta_e+120°)$ through multiplying the amplitude I provided by amplifier 494, sine wave signals $\sin\theta_e$ and $\sin(\theta_e+120°)$ being provided by the phase difference count of nX counter 4041. The phases of the two sine wave signals are shifted by 120° because this motor is of three phase. Where the number of phases is different, the phase shift takes another value.

The circuit further comprises current detection circuits 501 and 502 for detecting and feeding back a current flowing to the coils of the motor 1; and a bridge circuit 507 driven by a PWM signal generated according to the difference between the current command value and the current feedback value to carry a current, and feeding the current to the coils of the motor. The current command value is generated by a count of nX counter 4041. Thus, the motor is subjected to commutation control by a detection signal of nX resolver $2_1$.

Figure 54:
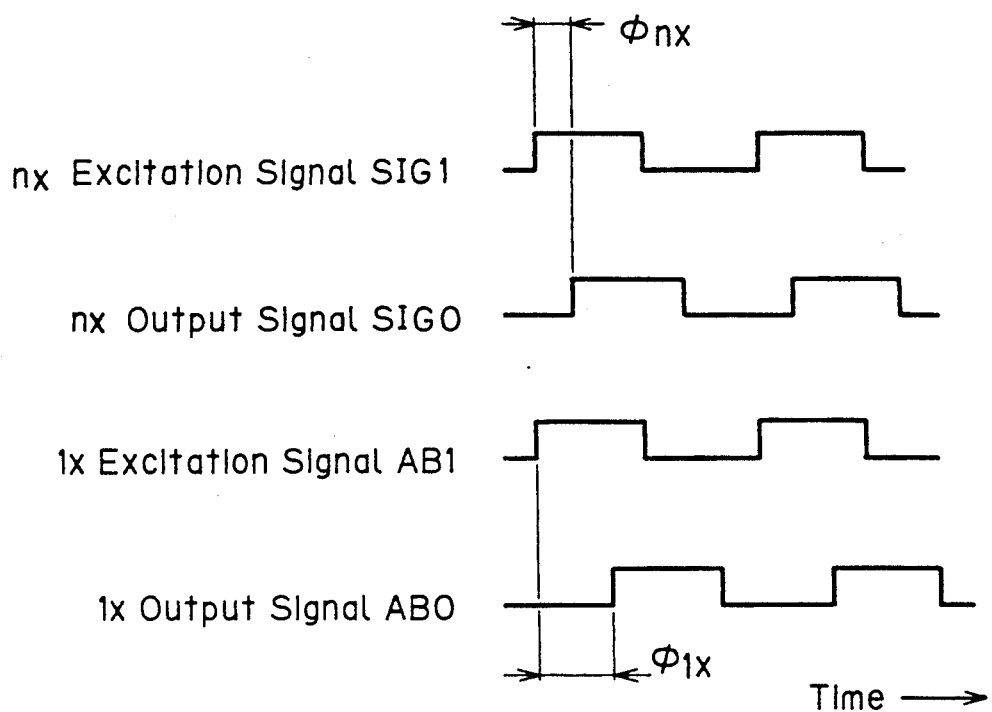
FIG. 54 is a time chart of the exciting signals and output signal from the magnetic resolver.

Operation of the FIG. 53 system is as follows. First, operation for detecting absolute rotational position is discussed with reference to FIG. 54, which is a time chart of the excitation signal and the output signal of the magnetic resolvers. The magnetic resolvers are of a phase modulation type. Thus, detection phases $\phi_{nx}$ and $\phi_{1x}$ of the nX resolver and the 1X resolver are obtained by measuring the phase difference between the excitation signal and the output signal on a counter.

Figure 55:
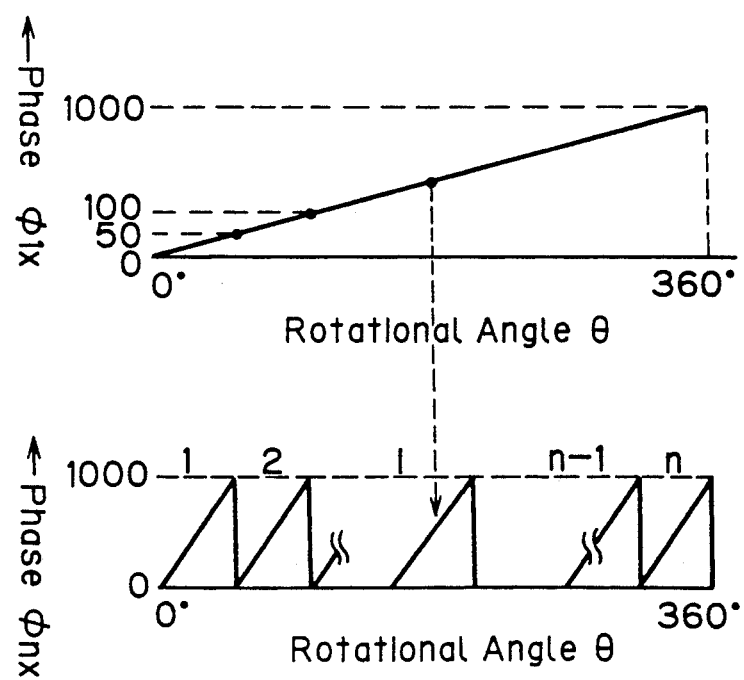
FIG. 55 depict changes in rotational angle with phase.

The changes of phases $\phi_{nx}$ and $100_{1x}$ when the motor rotates once is shown in FIG. 55. The rotational angle on a quadrature axis is a mechanical angle.

According to such relation, to which period of the detection phase $\phi_{nx}$ a detected position corresponds is detected from a value of the detection phase $\phi_{1x}$. An absolute rotational position A is obtained as follows from a detection number i and the value of $\phi_{nx}$.

$A=(i-1)\cdot P+\phi_{nx}$ wherein P is the count on nX counter when the phase is 360°, and $\phi_{nx}$ is the count on the nX counter.

For example, assuming that the frequency of SIG0 and SIG1 is 3 KHz; the frequency of the phase measuring clock of the counter 4041, 4042 is 3 MHz; the count of the 1X resolver when the phase is 360° is 1,000; n is 20; $\phi_{1x}$ is 390; $\phi_{nx}$ is 500; then the absolute rotational position Z is as follows.

The change in count on the 1X counter according to the detection signal for one period of the nX resolver is 1,000/20 or 50; P is 3 MHz/3 KHz or 1,000; i is INT (390/50)+1 or 8; A is (8−1)×1,000 +500 or 7,500 pulses.

In operation, the count of the pulse number is computed. However, since the pulse number is proportional to angle, the rotational position is obtained from the computed value.

The servo sequence is as follows. After power application, switch 4700 is connected to the $S_o$ side and the position servo is driven to compute an absolute rotational position, thereby holding position command value=absolute rotational position.

The value of the absolute rotational position is transmitted to the host position command controller 3 on phase A pulse and phase B pulse or up pulse and down pulse. Position command controller 3 turns the value of the absolute rotational position to an offset value and then generates an incremental position command value in a pulse signal. The position servo receives the position command value, connects switch 4700 to the $S_1$ side while operating, and feeds back to control the position with the count on the nX counter as a position feedback value. When the motor stops positioning, switch 4700 is changed to the $S_o$ side and the absolute rotational position is detected.

The following advantageous effects are produced by the invention.

1. In the motor mechanism part, construction is such that the nX resolver and the 1 X resolver are modularized. In case the motor drive system requires only an incremental system, only the nX resolver need be mounted. Where a function is needed to detect the absolute rotational position, the 1X resolver is mounted optionally in addition to the nX resolver. Thus, the invention motor drive system is capable of detecting the absolute rotational position by simply adding a requisite to the mechanism part of an incremental system.

2. The portion surrounded by a broken line in FIG. 53 indicates an incremental system configuration, and a motor drive system capable of detecting the absolute rotational position is realized simply by adding to this portion a signal processing circuit comprising the 1X resolver and a compound circuit for detecting detection signals from the two resolvers.

3. The absolute rotational position is detected when the motor is shut down, and the position is fed back and controlled by an incremental system with the detected absolute rotational position as an offset when the motor is rotating. Thus, the absolute rotational position can be detected as carrying out a position control using the incremental system.

Moreover, the motor drive system of the invention has the following advantages.

1. The components of the motor drive system, such as the external I/F part, the sensor I/F part, the main control part and the power control part are modularized. Each module comprises a card. Accordingly, various requirements can be satisfied simply by changing the cards.

2. Furthermore, the component units of the motor mechanism part are modularized Thus, output torque, size and other properties can be easily modified as desired. Various desired specifications can be flexibly attained.

3. The external I/F part can be connected to host controllers through any one of the serial pulse signal line, the 8 bit microcomputer bus, and the analog signal line. Thus, the motor drive system is capable of receiving command vlaues from various host controller, and the applicable range of the system is consequently further expanded.

4. The sensor I/F part can be readily used for interconnecting the magnetic resolver and the optical resolver. Thus, the optical resolver or the magnetic resolver can be selected according to whether precision or cost is of priority. Accordingly, various desired objectives can be easily attained.

5. A magnetic resolver or an optical resolver can be selected by selecting only a desired ID card with the other components of the system being the same. Thus, the magnetic resolver and the optical resolver can be sued selectively with modules constituting the other parts of the system.

6. A plurality of slits are provided in two rows in the optical resolver, wherein the difference in the number of outside slits and inside slits equals the number of teeth of the rotor of the motor.

In the case of the magnetic resolver, the number of teeth of the frotor of the magnetic resolver equals the number of teeth of the rotor of the motor.

In the ID card for the magnetic resolver, a rotation detection signal having the phase detected and a reference signal having the phase not modulated, are extracted. Furthermore, in the ID card for the optical resolver, light detection signals through the outside slits and the inside slits, are extracted.

Thus, with either ID card, the phase shift of the teeth of the rotor and stator in the motor can be detected by measuring the phase difference between the two extracted signals. Accordingly, a signal for commutation control is obtained by using a common phase difference counter.

Moreover, the rotational position of the motor can be readily computed by integrating the phase shift. Also, the rotational speed of the motor is easily detected from the frequency of the output signal from each sensor having the phase modulated.

The signals for position control, speed control and commutation control is concurrently detected by the sensor I/F part. Also, signals used for the control purposes just set forth is easily detected using the magnetic resolver or optical resolver.

7. The system for detecting the absolute rotational position comprises a 1X resolver and its control circuit added to a system using an incremental type magnetic resolver. Thus, a detection system for the absolute rotational position is realized inexpensively 8. In the system using an incremental type sensor, since an origin of the rotational position is detected by means of a carry of the phase difference counter, an origin can be detected at low cost on an existing counter.

As above described in detail, the motor drive system of the invention has many advantageous and is effective for various uses and applications.

The foregoing is illustrative of the invention. Numerous modifications and extensions thereof would be apparent to the worker skilled in the art. All such modifications and extensions are to be considered to be within the spirit and scope of the invention.

What is claimed is:

1. In a motor drive system operating for feedback control of a motor having one or more coils, the improvement comprising a first interface part comprising a plurality of interfaces according to the kind of host controller for generating command signals;

a sensor interface part comprising an interface of a sensor for detecting rotations of said motor and generating a detection signal;

a main control part for generating a control signal to effect feedback control of said motor according to a command signal received from said first interface part and a detection signal received from said sensor interface part; and a power control part for amplifying a current according to said control signal and for feeding the amplified current to said one or more coils of said motor; wherein said first interface part, said sensor interface part, said main control part and said power control part are separate and modularized as cards; and wherein said motor comprises a stator provided with a salient pole with a plurality of teeth formed on a tip thereof; and a rotor with a plurality of teeth formed at positions opposite to said plurality of teeth formed on said salient pole of said stator; and wherein a permanent magnet is provided and wherein said one or more coils and said permanent magnet together generate a magnetic field; and wherein each component of said motor is modularized.

2. The system of claim 1, wherein said motor is varied in output torque by changing the number of accumulated cores using members varying in length on a body.

3. The system of claim 1, wherein said sensor is a magnetic resolver.

4. The system of claim 1, wherein said sensor is a magnetic resolver of a phase modulation type and having a rotor and a stator, said rotor of said resolver being coupled to a rotor of said motor with the number of teeth thereof being the same as that of said rotor of said motor, said rotor and said stator of said resolver being of a double structure to have two rotor plates and stator plates placed one upon another or being or a single core structure to have one rotor plate and stator plate each, with a two phase coil being wound on a salient pole provided on said stator plate, and means for placing a negative or positive voltage across each phase coil to generate a single modulated phase detection signal.

5. The system of claim 3, wherein said motor rotates a fraction 1/n of a rotation to a multiple n rotations, wherein said sensor produces detection signal indicating rotation of said motor, and wherein said magnetic resolver comprises a 1X resolver wherein the phase of the detection signal changes from 0° to 360° whenever the rotor rotates once; and an nX resolver wherein the phase of the detection signal changes from 0° to 360° whenever the rotor rotates 1/n times; and wherein a detection circuit is provided for obtaining an absolute position of said motor by detecting a rotational position of said motor using the detection signal from said 1X resolver with the 1/n rotation as a resolution and also by detecting the rotational position of said motor in the 1/n rotation detected using the detection signal from said nX resolver; wherein n is an integer.

6. The system of claim 5, wherein said detection circuit comprises
 a 1X counter and an nX counter for counting the phases of detection signals from said 1X resolver and nX resolver in pulses;
 a compound circuit for obtaining an absolute rotational position of said motor by detecting a rotational position of said motor on a count of said 1X counter with the 1/n rotation as a resolution, for detecting a rotational position of said motor in the n/n rotation detected on a count of said nX counter, and by compounding these detected values;
 a switch for feeding back selectively an output of said compound circuit or said nX counter;
 a position command part for generating an incremental position command value with the absolute rotational position obtained through said compound circuit as a reference position;
 a position control part for feeding back an output of said compound circuit to said switch and for providing the output to said position command part to detect the absolute rotational position while said motor is shut down, feeding back an output of said nX resolver to said switch to control the motor rotational position in an incremental mode according to the position command value generated by the position command part when the motor is rotating.

7. The system of claim 5, wherein the number of teeth of a rotor of said nX resolver is the same as that of said rotor of said motor, and said motor is subjected to commutation control using a detection signal from said nX resolver.

8. The system of claim 1, wherein said sensor is an optical resolver.

9. The system of claim 8, wherein said optical resolver is a phase modulation type rotary resolver;
 a code plate is coupled to said rotor of said motor;
 a plurality of slits are formed in two rows in directions circumferential of said code plate with the difference in number between the inside slits and the outside slits being the same as the number of teeth of said rotor of said motor;
 photodiode arrays are provided at positions opposite each row of said slits, said photodiode arrays comprising a plurality of photodiodes arrayed in one pitch of said slits; and
 a rotation detection signal is obtained from scanning light detection signals generated by said photodiodes.

10. The system of claim 1, wherein a magnetic resolver or an optical resolver is selected as said sensor.

11. The system of claim 1, wherein said sensor interface part selectively connects a plurality of types of sensors.

12. The system of claim 1, wherein said sensor interface part selectively connects a magnetic resolver or an optical resolver as said sensor; and is provided with an optical resolver ID card for extracting light detection signals from photodiode arrays disposed opposite to outside slits and inside slits of said optical resolver, or a magnetic resolver ID card for extracting a phase modulated signal when the phase is modulated by rotations of a rotor of said magnetic resolver, and extracting a reference signal when the phase is not so modulated, a phase difference counter for counting the phase difference between two signals comprising the light detection signals from the outside slits and the inside slits extracted by said optical resolver ID card when said optical resolver is connected as said sensor, and counting the phase difference between two signals comprising the phase modulated signal and the reference signal extracted by said magnetic resolver ID card when said magnetic resolver is connected as said sensor.

13. The system of claim 12, wherein said main control part comprises commutation computing means for obtaining a phase shift of the teeth of the rotor and the stator of said motor from a count of said phase difference counter and for computing a signal for controlling commutation of said motor from said phase shift.

14. The system of claim 12, wherein said main control part comprises position computing means for computing a rotational position of said motor from integrating counts from said phase difference counter.

15. The system of claim 12, wherein said main control part comprises speed detecting means for detecting a rotational speed of said motor from a frequency of a phase modulated signal extracted by either one of said optical resolver ID card and said magnetic resolver ID card.

16. The system of claim 12, wherein said main control part comprises a position control part operating for feedback control of a rotational position of said motor according to a position command signal provided by said external interface part and a result of said position computing means.

17. The system of claim 12, wherein said main control part comprises a speed control part for feedback control of a rotational speed of said motor according to a speed command signal provided by said external interface part and to a detection signal of said speed detecting means.

18. The system of claim 12, wherein said phase difference counter comprises means for generating a carry when counting a phase difference for n pitches, n being an integer, of the teeth of said rotor of said motor; and wherein said main control part comprises origin detecting means for detecting an origin of the rotational position where the phases of said teeth of said rotor and stator of said motor coincide, from a carry of said phase difference counter.

19. The system of claim 12, wherein said sensor interface part extracts signals used for position control, speed control and commutation control of said motor concurrently according to the count of said phase difference counter and a phase modulated signal extracted by said optical or magnetic resolver.

20. The system of claim 12, wherein said sensor interface part measures a phase difference between two signals extracted by said magnetic resolver ID card or between two signals extracted by said optical resolver ID card, on a common phase difference counter, thereby extracting signals used for position control, and speed control, concurrently for the sensor of the magnetic resolver or the sensor of the optical resolver.

21. The system of claim 1, wherein a host controller is connected to a plurality of interfaces of said external interface part and sends command signals through a communication line, a serial pulse signal line, an analog signal line, and an n-bit microcomputer bus, wherein n is an integer.

22. The system of claim 1, wherein said main control part comprises a gain table for coordinating a natural frequency of said position control system of said motor, a DC gain of a speed control part provided in said main control part and an integral limiter value of the output of an integrator, on a position control part provided in said main control part with optimal control parameters according to said values.

23. In a motor drive system operating for feedback control of a motor, the improvement comprising
a first interface part comprising a plurality of interfaces according to the kind of host controllers for generating command signals;
a sensor interface part comprising an interface of a sensor for detecting rotations of said motor;
a main control part for generating a control signal for feedback control of said motor according to a command signal received from said first interface part and a detection signal received from said sensor interface part, and comprising a gain table for coordinating a natural frequency of the position control system of said motor, a DC gain of a speed control part provided in the main control part, and an integral limiter value of the output of an integrator on a position control part provided in the main control part with optimal control parameters according to said values;
a power control part for amplifying a current according to said control signal and for feeding the amplified current to coils of said motor; and
a tuning part comprising a natural frequency setting switch, a DC gain setting switch and an integral limiter value setting switch, wherein a natural frequency, a DC gain and an integral limiter value are set in a plurality of stages within a predetermined range, an optimal control parameter is read out from said gain table according to at least one of set natural frequency, DC gain and integral limiter value, for use in control of said main control part; wherein
said first interface part, said sensor interface part, said main control part, and said power control part are separate and modularized as cards.

* * * * *